(12) United States Patent
Uno et al.

(10) Patent No.: US 6,240,235 B1
(45) Date of Patent: *May 29, 2001

(54) OPTICAL FIBER FIXING MEMBER AND METHOD FOR MANUFACTURING THE SAME

(75) Inventors: Ken Uno; Masahiro Yoshida; Teruo Yamashita; Shinichiro Hirota; Yoshiatsu Yokoo, all of Tokyo (JP)

(73) Assignees: Hoya Corporation, Tokyo (JP); Hoya Precision Inc., Nagano (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,851

(22) Filed: Apr. 23, 1998

Related U.S. Application Data

(63) Continuation of application No. PCT/JP96/03120, filed on Oct. 25, 1996.

(30) Foreign Application Priority Data

| | | |
|---|---|---|
| Oct. 27, 1995 | (JP) | 7-281013 |
| Aug. 29, 1996 | (JP) | 8-228881 |

(51) Int. Cl.$^7$ ............... G02B 6/00; G02B 6/26; G02B 6/38; C03C 3/066
(52) U.S. Cl. ............... 385/137; 385/52; 385/65; 385/83; 501/79
(58) Field of Search ............... 385/137, 136, 385/52, 65, 83; 501/79, 77, 73

(56) References Cited

U.S. PATENT DOCUMENTS

| | | | |
|---|---|---|---|
| 4,123,863 | * 11/1978 | Becker | 40/152 |
| 4,297,141 | * 10/1981 | Tokunaga et al. | 501/67 |
| 4,904,221 | * 2/1990 | Taylor | 446/297 |
| 5,379,360 | * 1/1995 | Ota et al. | 385/59 |
| 5,425,118 | * 6/1995 | Sugihara et al. | 385/83 |
| 5,446,815 | 8/1995 | Ota et al. | 385/33 |
| 5,548,677 | 8/1996 | Kakil et al. | 385/92 |
| 5,737,138 | * 4/1998 | Someno | 385/83 |
| 5,835,659 | * 11/1998 | Ota et al. | 385/137 |

FOREIGN PATENT DOCUMENTS

| | | |
|---|---|---|
| 58-130310 | 8/1983 | (JP) . |
| 60-173509 | * 9/1985 | (JP) . |
| 62-226827 | 10/1987 | (JP) . |
| 62-269108 | 11/1987 | (JP) . |
| 63-75063 | 5/1988 | (JP) . |
| 63-191302 | 12/1988 | (JP) . |
| 2-14839 | 1/1990 | (JP) . |
| 2-256009 | 10/1990 | (JP) . |
| 3-048803 | * 3/1991 | (JP) . |
| 4-336509 | 11/1992 | (JP) . |
| 5-203839 | * 8/1993 | (JP) . |
| 6-94944 | 4/1994 | (JP) . |
| 7-35958 | 7/1995 | (JP) . |
| 7-5341 | 7/1995 | (JP) . |
| 7-315860 | 12/1995 | (JP) . |
| 8-59281 | 3/1996 | (JP) . |

* cited by examiner

Primary Examiner—Teresa M. Arroyo
Assistant Examiner—Quyen P. Leung
(74) Attorney, Agent, or Firm—Nixon & Vanderhye P.C.

(57) ABSTRACT

The optical fiber fixing member made of glass, especially optical fiber guide block, is conventionally produced by a mechanical processing. However, the mechanical processing has problems that a production cost becomes high and mass-production is difficult. The problems above can be solved by the present invention providing a method for producing an optical fiber fixing member comprising: disposing a glass shaping preform whose plane view resembles to the plane view of the molded article and whose faces to be positioned in the pressurizing direction during press-molding assumes planes or outwardly convex curved surfaces, in a mold having a cavity of a given shape; and heating the glass shaping preform up to a temperature at which the glass shaping preform can be mold-shaping and thereby press-molding it into a molded article having at least one edge formed of a free surface.

12 Claims, 17 Drawing Sheets

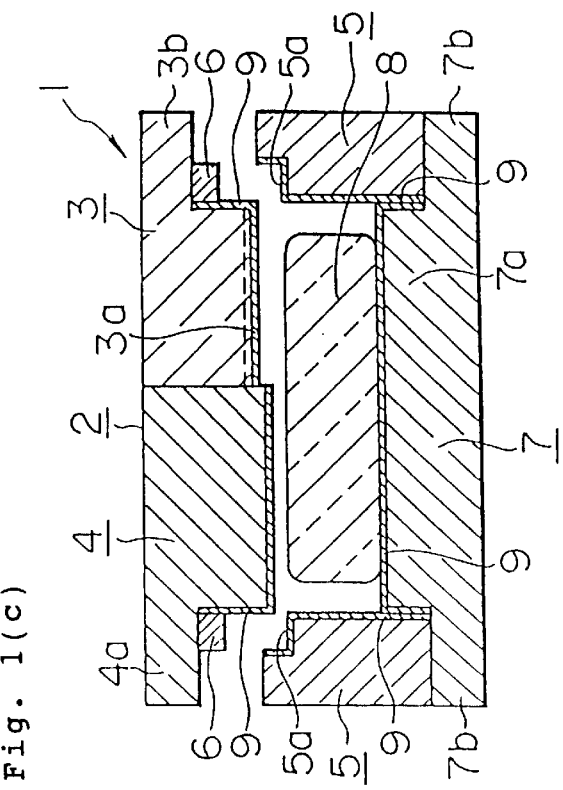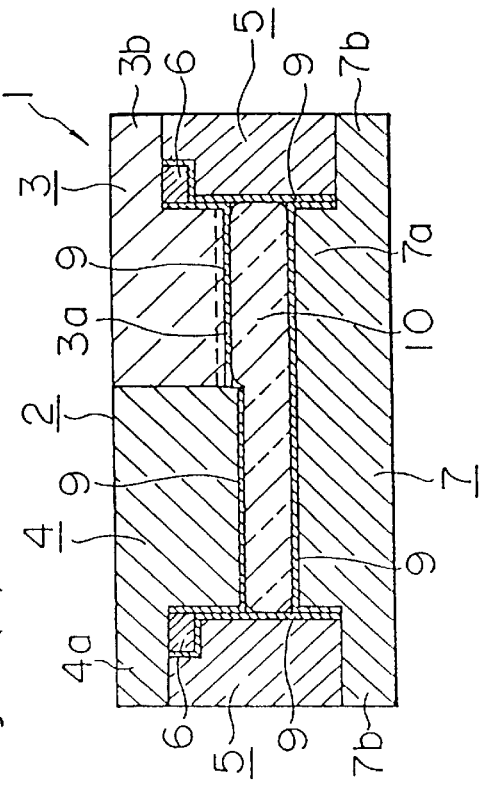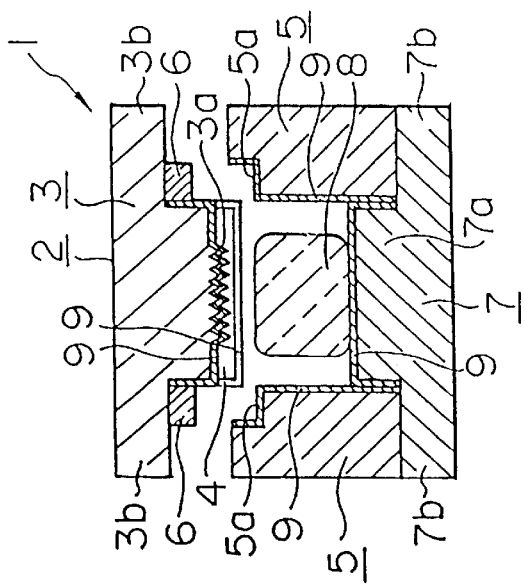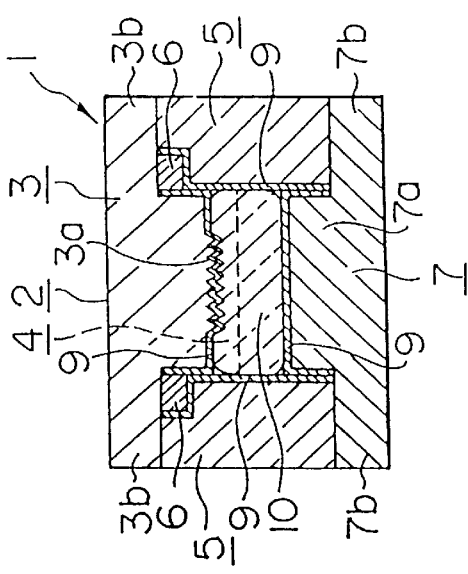

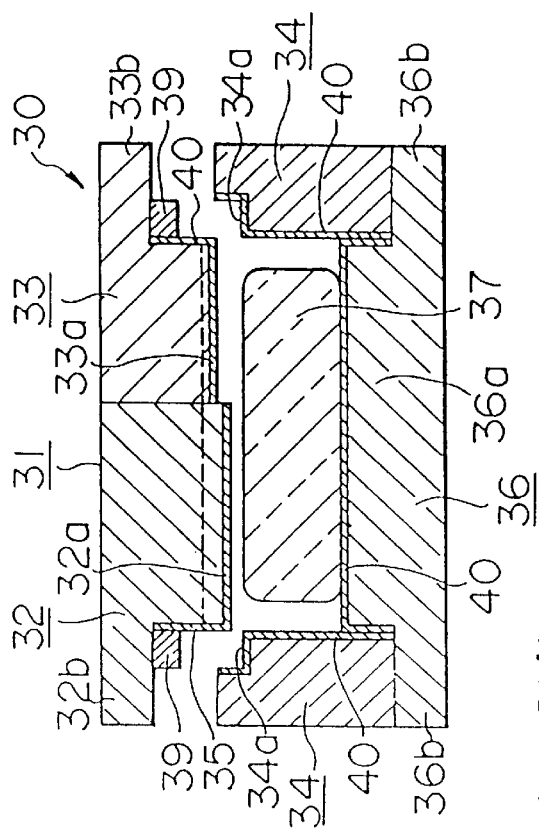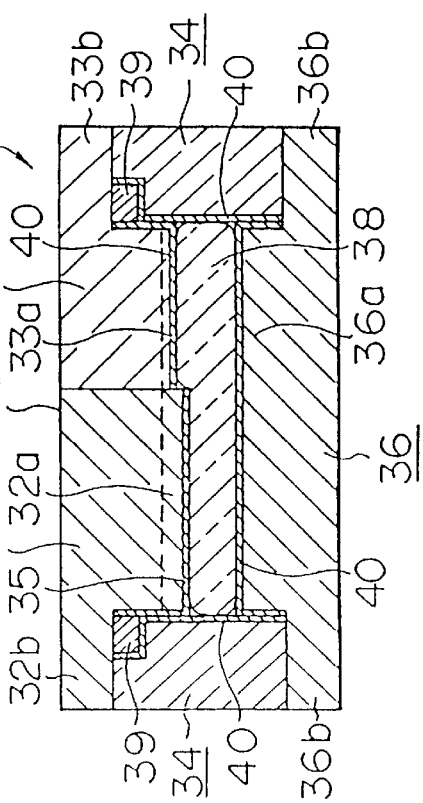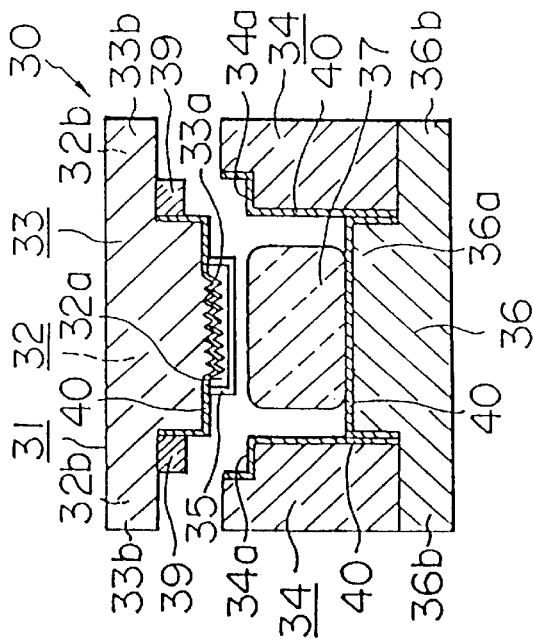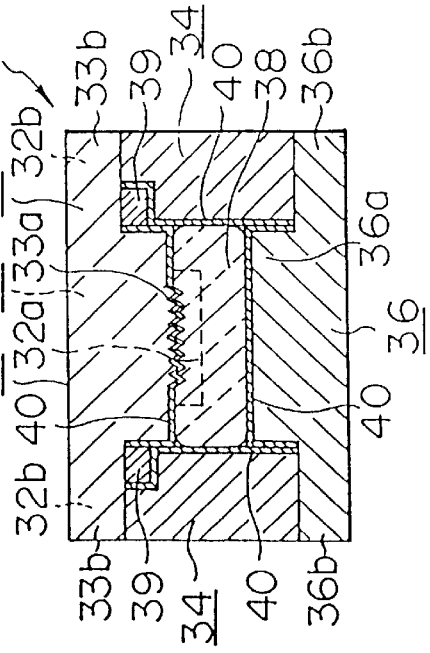
Fig. 5(a)
Fig. 5(b)
Fig. 5(c)
Fig. 5(d)

OPTICAL FIBER FIXING MEMBER AND METHOD FOR MANUFACTURING THE SAME

This is a continuation of PCT application Ser. No. PCT/JP96/03120, filed Oct. 25, 1996.

TECHNICAL FIELD

The present invention relates to an optical fiber fixing member made of a glass and a method for producing the same. The present invention also relates to a mold being suitable for molding an optical fiber array partly composed of the optical fiber fixing member described above, an optical module partly composed of this optical fiber array and an optical fiber guide block made of a glass.

BACKGROUND ART

Optical fibers for use in optical communication are usually fine fibers made of a glass, quartz-based single mode optical fibers for use in a long distance optical communication being composed, for example, of a core portion with an outer diameter of about 10 $\mu$m and a clad portion with an outer diameter of 125 $\mu$m for coating the core portion. Quartz-based multi-mode optical fibers are composed of a core portion with an outer diameter of 50 to 125 $\mu$m and a clad portion with an outer diameter of 125 $\mu$m for coating the core portion. Accordingly, when optical fibers are optically connected with each other (the phrase "optically connect" is referred to "optical interconnection" hereinafter) or optical fibers are optically connected with optical element(s) such as an optical waveguide, a lens, an light emitting element and a light acceptance element, a highly precise alignment is required for reducing connection loss at the optical interconnection part. Especially, in the optical interconnection of the quartz-based single mode optical fibers with each other and optical interconnection of the quartz-based single mode optical fiber with a quartz-glass-based single mode optical waveguide, an alignment with an accuracy of as high as about ±1 mm is required.

When optical fiber(s) is/are optically connected with other optical fiber(s) or optical element(s), the optical fiber(s) is/are previously fixed in an optical fiber fixing tool such as an optical connector or optical fiber array. The optical fiber array as used herein is at least provided with an optical fiber guide block comprising a thin plate on which optical fiber fixing engagement portion(s) for fixing (positioning) the optical fiber(s) is/are formed, optical fiber(s) engaged to the optical fiber fixing engagement portion(s) and a holding block comprising a thin plate for compression-fixing optical fiber(s) engaged to the optical fiber fixing engagement portion(s).

For example, Japanese Unexamined Patent Publication No. Hei 7-5341 discloses an optical fiber array fixing a tape fiber produced by protecting given strings of optical fiber disposed in parallel relation with each other with a coating material comprising a resin. As shown in FIG. 26, the optical fiber array 200 disclosed in the foregoing patent publication is provided with a thin plate of an optical fiber guide block 204 on which a given number of V-shaped grooves 203 as optical fiber fixing engagement portions for fixing optical fibers 202 exposed from a tape fiber 201, optical fibers 202 and a thin plate of an optical fiber holding block 205 for compression-fixing the optical fiber 202 engaged to the V-shaped grooves 203 described above. The optical fiber guide block 204 constituting this optical fiber array 200 has a pedestal 207 for fixing the coated optical fiber 206 in the tape fiber 201 besides the V-shaped grooves 203 described above, the pedestal 207 being formed by one step lower than the V-shaped grooves 203. The optical fiber array 200 is also provided with a coated optical fiber holding block 208 with a given cross sectional configuration for compression-fixing the coated optical fiber 206 fixed on the pedestal 207.

An active alignment using a precision stage has been applied in the optical interconnection of the optical fibers fixed in optical fiber fixing tools such as an optical connector or optical fiber array with each other, or in the optical interconnection of the optical fiber(s) fixed in the optical fiber fixing tool and optical element(s) with a high alignment accuracy as described previously. This active alignment is executed, for example, in the mutual connection of the optical fibers fixed in optical fiber arrays as follows.

After fixing one optical fiber array (referred to "optical fiber array A" hereinafter) on which optical fiber(s) is/are fixed to one holder on the precision stage, the other optical fiber array (referred to "optical fiber array B" hereinafter) on which optical fiber(s) is/are fixed is fixed to the other holder on the precision stage. Then, a light beam is allowed to irradiate the optical fiber fixed with the optical fiber array A from the tip of the optical fiber, positioned at an opposite end to the optical end face (of the side faces of an optical fiber array, a side face positioned at the optical interconnection side where the optical fiber array is connected to the other optical fiber array or optical element: the same hereinafter). An optical detector is provided at the end of the optical fiber positioned at the opposite side of the optical end face in the optical fiber array B. The precision stage is then scanned in a wide range to search the position where any faint optical power is detected with the optical detector (this stage is referred to "first step"). The precision stage is finely scanned thereafter so that the optical detector senses the maximum optical power level, thereby completing the desired high accuracy alignment (this stage is referred to "second step").

Since a long period of time is required for wide range scanning at the first step of the active alignment described above, it is desirable that the first step is substantially completed at the stage when the optical fiber fixing tools are fixed on the holders described above for making a highly precise alignment easy. Accordingly, it is desirable to precisely adjust the locational accuracy of the optical fiber fixing engagement portion(s), measured with reference to the bottom face or side face of the optical fiber fixing tool, to a degree of about 1/1 or less of the core diameter of the optical fiber fixed in the optical fiber fixing tool, along with precisely adjusting the dimensional accuracy of the optical fiber fixing engagement portion(s) for fixing optical fiber(s) in the optical fiber fixing tool. In the optical interconnection of the quartz-based single mode optical fibers with a core diameter of about 10 $\mu$m with each other or in the optical interconnection between the quartz-based single mode optical fiber and quartz-glass-based single mode optical waveguide, for example, the locational accuracy is desirably 10 $\mu$m or less and the alignment will be made more easily when this locational accuracy is 5 $\mu$m or less.

Optical interconnection by a passive alignment is made possible by adjusting the locational accuracy described above to about 1/10 or less of the core diameter of the optical fiber. The passive alignment refers to a method in which, with no need of irradiating an beam to optical fiber(s) or detecting an emission beam from optical fiber(s), an alignment of the optical fiber fixing tools with each other or an alignment between the optical fiber fixing tool and an optical element is carried out merely by a mechanical positioning by taking advantage of the bottom face or side face of the optical fiber fixing tool as a reference face.

The passive alignment may be possibly executed by providing alignment mark(s) with a high locational accuracy at desired position(s) of the optical fiber fixing tool, along with making use of a specified face of the optical fiber fixing tool as a reference face. Otherwise, a guide pin engagement portions with a high locational accuracy are provided at desired positions of the two members to be connected (optical fiber fixing tools with each other or an optical fiber fixing tool and an optical element) with each other, thereby the passive alignment can be carried out by an optical interconnection of the optical fibers with each other or by an optical interconnection between the optical fiber fixing tool and optical element using guide pin(s).

For the passive alignment using the alignment marks, the locational accuracy of the alignment marks is desirably adjusted to about 1/10 or less of the core diameter of the optical fiber to be optically connected, along with adjusting the dimensional accuracy of the optical fiber fixing engagement portions in the optical fiber fixing tools with a high precision. For the passive alignment using the guide pin(s), the locational accuracy of the guide pin(s) (guide pin(s) after engaging with the optical fiber fixing tools) is desirably adjusted to about 1/10 or less of the core diameter of the optical fiber to be optically connected, along with adjusting the dimensional accuracy of the optical fiber fixing engagement portions in the optical fiber fixing tools with a high precision.

Connection of the optical fiber fixing tools with each other using the guide pin(s) has been already proposed. For example, Japanese Unexamined Patent Publication No. Sho 62-269108 discloses an optical connector ferrule using guide pins. As shown in FIG. 27(*a*) and (*b*), guide pin holes (not shown) are formed on the optical connector ferrule 210 disclosed in the patent publication. In the optical interconnection of the optical connector ferrules 210 with each other after fixing the optical fibers 211 to them, one end of the guide pin 212 is inserted into guide pin hole formed on one of the ferrules 210 and two ferrules 210 are connected with each other by inserting the other end of the foregoing guide pin 212 into guide pin hole formed on the other ferrule 210. Two ferrules 210 connected with each other using the guide pins 212 are press-fixed by means of a clamp 213 and accommodated in a cylindrical housing.

Japanese Unexamined Patent Publication No. Hei 7-35958 also discloses an optical fiber array using guide pins. As shown in FIG. 28, the optical fiber array 220 disclosed in the patent publication is provided with an optical fiber guide block 222 on which a given strings of V-shaped groove 221 as optical fiber fixing engagement portions for fixing optical fibers are formed, and a holding block 223 for compression-fixing the optical fibers engaged to the V-shaped grooves 221 described above. Grooves with a given shape are provided on each optical fiber guide block 222 and holding block 223 so as to form guide pin grooves 224 opened toward the optical end face of the optical fiber array 220 when the optical fiber array 220 is assembled using these blocks.

Foregoing each optical fiber array illustrated in FIG. 26 and FIG. 28 is an optical fiber array for use in butt joint type connection by directly confronting the end face of the optical fibers with each other. In this type of optical fiber arrays, the optical end face 232 is generally polished backwardly so that an angle θ becomes about 6 to 45°, usually 8°, as shown in FIG. 29, in order to suppress the effect of backwardly reflected light at the optical interconnection site, said angle θ is an angle formed between one plane, a plane perpendicular to the optical axis of the optical fiber 231 to be optically connected, and the other face, an optical end face 232 at the optical fiber array 230.

Parts used for the members constituting the optical fiber fixing tools (referred to "optical fiber fixing member" hereinafter) such as an optical connector and optical fiber array described above include glasses, ceramics, silicon and resins. Of these optical fiber fixing member, the optical fiber guide block, in which the optical fiber fixing engagement portion(s) is required to have a high dimensional accuracy, has been produced by a mechanical processing of a glass block using a dicing saw or diamond grindstone.

While adhesion with adhesives or soldering, anode welding and heat welding have been conventionally used for fixing the optical fiber guide block and holding block or for connecting an optical fiber array with other optical fiber array or an optical element, use of ultraviolet curing adhesives is desired in recent years by the reasons of workability, etc. In accordance with this tendency, a glass having a good transmissivity to ultraviolet ray has been advantageously used for materials of the optical fiber array.

Recently, Pyrex glass (thermal expansion coefficient: $30 \times 10^{-7}/°$ C., "Pyrex" is a trade name of a low thermal expansion glass made by Corning Co.) has been preferably used for an optical fiber array for the optical interconnection between a quartz-glass-based (thermal expansion coefficient: $5 \times 10^{-7}/°$ C.) single mode optical waveguide and quartz-based single mode optical fiber by the following reasons: When the difference between the thermal expansion coefficient of a substrate of the quartz-glass-based single mode optical waveguide and that of the optical fiber array is large, the alignment accuracy will be lowered due to a positional shift caused at the optical interconnection site by a change in an ambient temperature, thereby causing an increased connection loss at the optical interconnection site, even if the quartz-glass-based single mode optical waveguide is optically connected to the quartz-based single mode optical fiber with an alignment accuracy of ±1 μm or less. Accordingly, it is preferable that the difference between the thermal expansion coefficient of a substrate of the quartz-glass-based single mode optical waveguide and that of the optical fiber array is as small as possible. Therefore, Pyrex glass having a small thermal expansion coefficient can be advantageously used for the material of the optical fiber array to be used as described above.

However, it is a problem in producing optical fiber fixing members, especially optical fiber guide blocks made of a glass, by a mechanical processing using a dicing saw or diamond grindstone, that their production cost becomes high and mass production is difficult.

While it is relatively easy to form optical fiber fixing engagement portion(s) with a high dimensional precision in producing an optical fiber guide block made of a glass by a mechanical processing, it is difficult to improve the locational accuracy of the optical fiber fixing engagement portion(s) to a degree so as to be able to substantially omit the first step in the active alignment. When the locational accuracy of the optical fiber fixing engagement portion(s), locational accuracy of the alignment mark(s) against the optical fiber fixing engagement portion(s) and locational accuracy of the guide pin against the optical fiber fixing engagement portion(s) are required to be so high as to enable an passive alignment, it is more difficult to produce an optical fiber guide block made of a glass by a mechanical processing.

Since a knife edge is formed at the corner of the optical fiber guide block made of a glass produced by a mechanical processing, the edge is liable to be broken when the optical fiber array using the optical fiber guide block is fixed on the precision stage, when the alignment is carried out or when the optical end face of the optical fiber array using the optical fiber guide block is polished.

There has been established an art for producing a spherical or non-spherical concave or convex lens from a spherical or marble-shaped glass shaping preform by means of a mold by applying a molding (hot-molding or press molding). Therefore, application of the above molding technology may be taken into consideration for mass production of the optical fiber fixing member made of a glass.

However, when one attempts to form a thin-plate like optical fiber fixing member such as an optical fiber guide block and holding block by the molding technology of a lens as described above, a precision molding becomes very difficult because protruding of a glass (molding fin) or an insufficient transfer accuracy may be often caused. Accordingly, it is very difficult to obtain a practical optical fiber fixing member by the molding method as described above.

While protruding of a glass may be solved by using a side-free mold, that is, a mold of the type in which there is no side walls in the mold viewed along the direction of pressurizing in molding, the problem of an insufficient transfer accuracy arising from shortage of the filled glass volume can not be solved. Therefore, it is difficult to obtain an optical fiber fixing member by which an alignment with a high precision is made easy. There will be occurred another new problem that scattering of accuracy among the molded articles becomes large when such side-free mold is used.

The glass with a low thermal expansion coefficient represented by foregoing Pyrex glass has molding temperature of far more higher than 600° C., so that there arise a problem that a mold and its mold release film tend to be damaged greatly when such glass is molded.

DISCLOSURE OF INVENTION

The object of the present invention is to provide an optical fiber fixing member made of a glass capable of mass-production, a method for producing the optical fiber fixing member, an optical fiber array partly composed of the optical fiber fixing member, an optical module partly composed of the optical fiber array and a mold being suitable for molding the optical fiber guide block made of a glass.

The optical fiber fixing member for attaining the foregoing object according to the present invention comprises a thin-plate like molded article made of a glass having at least one edge formed of a free surface, wherein the molded article is used as a constitution member of an optical fiber array for optically connecting optical fibers with each other or optical fiber(s) with optical element(s).

The method for producing the optical fiber fixing member to attaining the foregoing object according to the present invention comprises: disposing a glass shaping preform, which has a plane view approximately corresponding to the plane view of the molded article and whose face positioned in the pressurizing direction in the press-molding assumes a flat face or an outwardly convex curved face, into a mold having a cavity with a given shape; heating the glass shaping preform up to a temperature capable of molding; and press-molding a thin-plate like molded article having at least one edge formed of a free surface.

The optical fiber array for attaining the foregoing object according to the present invention is characterized by providing an optical fiber guide block which is a parts of the optical fiber fixing member of the present invention described above and optical fiber(s).

The another optical fiber array for attaining the foregoing object according to the present invention is characterized by providing a holding block which is a parts of the optical fiber fixing member of the present invention described above and optical fiber(s).

The optical module for attaining the foregoing object according to the present invention is characterized by providing the optical fiber array of the present invention described above and optical element(s) or optical fiber(s) optically connected to optical fiber(s) fixed in the optical fiber array.

The mold for attaining the foregoing object according to the present invention is characterized by having a first molding part for molding the optical fiber fixing engagement portion(s) and a second molding part for molding pedestal(s) for fixing coated optical fiber(s) protected by the coating portion so that the pedestal is positioned in the same plane as that of the optical fiber fixing engagement portion in the plane view, wherein the first and second molding parts are formed of different parts with each other and these different parts are mechanically integrated with each other by a fixing means.

The optical fiber fixing member according to the present invention comprises a thin-plate like glass molded article having at least one edge formed of a free surface. Since this optical fiber fixing member can be mass-produced by the method according to the present invention, enabling the optical fiber fixing member to be readily mass-produced with a low production cost, it is made possible to provide the optical fiber array and optical module with a low production cost by using this optical fiber fixing member.

BRIEF DESCRIPTION OF DRAWINGS

FIG. 1a–1d are illustrative cross-sections of a mold used in Example 1.

FIG. 5a–5d are illustrative cross-sections of the mold used in Example 9.

FIG. 23(a) is a top view illustrating the optical module obtained in Example 26 while

FIG. 27a–27d are side views showing how to connect the conventional optical connector ferrules with each other.

BEST MODE FOR CARRYING OUT THE INVENTION

Figure 2:
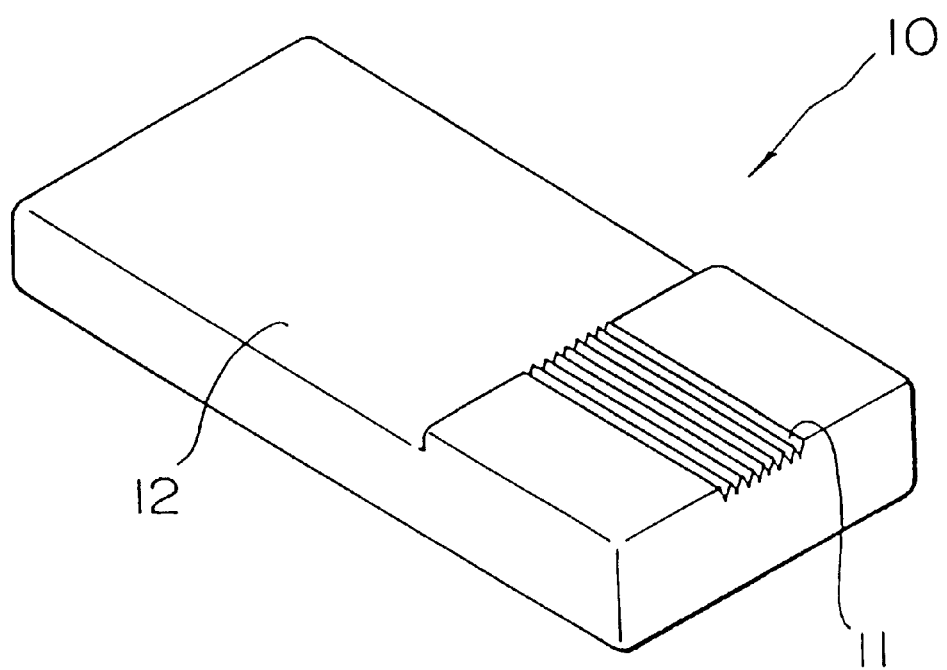
FIG. 2 is a illustrative perspective view of the optical fiber guide block obtained in Example 1.

The present invention will now be described by way of embodied illustrations.

The optical fiber fixing member according to the present invention comprises, as hitherto described, a thin-plate like molded article made of a glass having at least one edge formed of free surface.

"An edge formed of a free surface" as used herein means an edge molded so that the corner portion of the mold is not completely filled with the glass. The corner portion means following (1), (2), etc.

(1) A boundary space (clearance) between the upper mold member and lower mold member, an edge between two inner side faces of a mold member corresponding to the female mold member or an edge between the inner side face and bottom face of the mold member corresponding to the female mold member when the mold is composed of a upper mold member and lower mold member (one is male mold member and the other is female mold member).

(2) A boundary space (clearance) between the upper mold member and sleeve mold member, a boundary space (clearance) between the lower mold member and sleeve mold member or an edge between the two inner faces of the sleeve mold member when the mold is composed of a upper, lower and sleeve mold member.

The "edge formed of a free surface" is molded without making a contact with the inner wall of the mold (the mold release film when the mold has a mold release film; the same meaning hereinafter), assuming an outwardly convex curved face. When the glass has made a contact with the inner wall of the mold, fine traces of mechanical processing or polishing inevitably present on the inner wall of the mold are transferred to the surface of the molded articles. However, the "free surface" as described above can be easily distinguished from the surface formed by making contact with the inner wall of the mold in molding since the foregoing traces of mechanical processing or polishing are not transferred to the free surface.

The optical fiber fixing member according to the present invention having at least one edge formed of a free surface described above is used for a constitution member of the optical fiber array, for example an optical fiber guide block or a holding block, in the optical interconnection of the optical fibers with each other or in the optical interconnection between the optical fiber and optical element.

This optical fiber fixing member is a thin-plate like member with a thickness of 0.5 to 10 mm having a bottom face, side faces and a top face confronting to the foregoing bottom face, provided the optical fiber fixing member be either an optical fiber guide block or holding block. One of the side faces of this optical fiber fixing member (except the coated optical fiber holding block to be described later) is positioned at the optical end face when an optical fiber array is assembled, the side face to be situated at the optical end face confronting to one of the other side face.

It is preferable for obtaining an optical fiber fixing member with high dimensional and form accuracies to be described later that at least one edge surrounding a side face (this side face may be referred to "rear side face" hereinafter) confronting to the side face to be positioned at the optical end face is composed of "an edge formed of a free surface". Especially, all the edges surrounding the rear side face as described above are preferably composed of "edges formed of free surfaces". It is also preferable for obtaining an optical fiber fixing member with high dimensional and form accuracies and being easily attached to a jig that edges extending from the side face to be positioned at the optical end face to the rear side face described above, and surrounding the bottom face are made to be "edges formed of free surfaces", as well as at least one edge of the edges surrounding the rear side face.

When the optical fiber fixing member according to the present invention is an optical fiber guide block, the bottom face substantially assumes a flat face. On the top face confronting to the bottom face, at least optical fiber fixing engagement portion(s) to be described later is/are formed. Pedestal(s), side wall portions, guide pin engagement portion(s), engaging means engaging to the desired position (s) of a holding block and alignment mark(s), all to be described later, is/are formed on the top face, if necessary. While the side face may usually form a substantially perpendicular plane to the bottom, the side face to be positioned at the optical end face after assembled into the optical fiber array may be inclined to the plane perpendicular to the optical axis of the optical fiber to be optically connected as described later. The side faces except the side face to be positioned at the optical end face described above may be outwardly or inwardly convex curved face. While the plane view of the optical fiber guide block may be usually a rectangle or approximately a rectangle, the plane view of the rear side face may assume an outwardly or inwardly convex curved line.

The phrase "plane view is approximately a rectangle" as used in the present invention with respect to the optical fiber guide block and the holding block to be described later means that the shape of the optical fiber guide block or holding block overlooked along the normal line of the bottom face of the optical fiber guide block or holding block assumes a rectangle except that its corner(s) is/are rounded.

When the optical fiber fixing member is a holding block, the top face (the face to be a top face of the optical fiber array in use) substantially assumes a plane, and at least an optical fiber engaging means for compression-fixing the optical fiber(s) engaged to the optical fiber fixing engagement portion(s) of the optical fiber guide block and/or a coated optical fiber engage means for compression-fixing the coated optical fiber(s) fixed on the pedestal of the optical fiber guide block, is formed on the lower face confronting to the top face. Guide pin engagement portion(s) and engage means for engaging to the desired position(s) of the optical fiber guide block, all to be described later, is/are formed on the lower face, if necessary. While the side face may usually form a substantially perpendicular plane to the lower face, the side face to be positioned at the optical end face after assembled into the optical fiber array may be inclined to the plane perpendicular to the optical axis of the optical fiber(s) to be optically connected as described later. The side faces except the side face to be positioned at the foregoing optical end face may be outwardly or inwardly convex curved face. While the plane view of the optical fiber guide block may be usually a rectangle or approximately a rectangle, the plane view of the rear side face may assume an outwardly or inwardly convex curved line.

The optical fiber fixed in the optical fiber array can be roughly classified into a single mode optical fiber with a core diameter of about 10 $\mu$m and a multi-mode optical fiber with a core diameter of 50 to 500 $\mu$m. The degree of the alignment accuracy for the optical interconnection differs depending on the sort of the optical fibers to be optically connected, accompanying a different dimensional accuracy required for the optical fiber fixing member. Accordingly, the dimensional accuracy of the optical fiber fixing member of the present invention can be properly selected depending on the sort of the optical fiber to be fixed with the optical fiber fixing member.

It is preferable, for example, that the dimensional accuracy of the optical fiber fixing member used for the optical interconnection of the quartz-based single mode optical fiber that requires a high alignment accuracy is within ±1/10, more preferably within ±1/20, of the core diameter of the quartz-based single mode optical fiber to be fixed with the optical fiber fixing member. It is also preferable that the dimensional accuracy of the optical fiber fixing member to be used for the optical interconnection of the multi-mode optical fiber is within ±1/5, more preferably within ±1/10, of the core diameter of the multi-mode optical fiber to be fixed with the optical fiber fixing member.

The term "dimensional accuracy of the optical fiber fixing member" as used in the present invention refers to the following three dimensional tolerances as described below when the optical fiber fixing member is an optical fiber guide block having a plurality of optical fiber fixing engagement portions ("dimensional tolerance" itself means the dimensional tolerance defined in JIS B 0401; the same meaning hereinafter):

(1) dimensional tolerance (referred to "single pitch accuracy" hereinafter) of the distance between the centers of two vertical cross sections (a vertical cross section along the direction perpendicular to the longitudinal direction of the optical fiber: the same meaning hereinafter) of the optical fibers in adjacent relation with each other when each optical fiber having the same outer diameter is engaged to respective optical fiber fixing engagement portion ;

(2) dimensional tolerance (referred to "accumulated pitch accuracy" hereinafter) of the distance between the center of the vertical cross section of the optical fiber, which is engaged to the optical fiber fixing engagement portion positioned at the outermost right or left side in the transverse direction, and the center of the vertical cross section of the other optical fiber, wherein, in assembling an optical fiber array, an optical fiber is engaged to an optical fiber fixing engagement portion, positioned at the outermost right or left side in the transverse direction when the optical fiber guide block is viewed from the side face to be positioned at the optical end face, and an another optical fiber having the same outer diameter with the foregoing optical fiber is engaged to the other optical fiber fixing engagement portion; and (3) dimensional tolerance (referred to a depth accuracy hereinafter) of each vertical distance between the center of the vertical cross section of each optical fiber when the optical fibers having the same outer diameter with each other are engaged to each optical fiber fixing engagement portions, and a top face containing either an edge positioned at the left side in the transverse direction or an edge positioned at the right side in the transverse direction of the optical fiber fixing engagement portion when the optical fiber guide block is viewed from the side face to be positioned at the optical end face after being assembled into an optical fiber array.

When the optical fiber fixing member corresponds to an optical fiber guide block having merely one optical fiber fixing engagement portion, "dimensional accuracy of the optical fiber fixing member" as used in the present invention means a dimensional tolerance (depth accuracy) of the vertical distance between the center of the vertical cross section of the optical fiber when the optical fiber is engaged to the optical fiber fixing engagement portion, and a top plane containing either an edge positioned at the left side in the transverse direction or an edge positioned at the right side in the transverse direction of the optical fiber fixing engagement portion when the optical fiber guide block is viewed from the side face to be positioned at the optical end face after being assembled into an optical fiber array.

When the optical fiber fixing member is a holding block, "the dimensional accuracy of the optical fiber fixing member" as used in the present invention corresponds to the following three definitions:

(1) dimensional tolerance of the width when the holding block is viewed from the side face to be positioned at the optical end face when the optical fiber array is assembled;

(2) dimensional tolerance of the thickness of the part where a holding plane for the optical fiber is formed when the holding block has a holding plane for compression-fixing the optical fiber(s) engaged to the optical fiber fixing engagement portion(s) of the optical fiber guide block; and (3) dimensional tolerance of the thickness of the part where a holding plane for the coated optical fiber(s) is formed when the holding block has a holding plane for the coated optical fiber for compression-fixing from above the coating portion(s) of the coated optical fiber(s) fixed on the pedestal of the optical fiber guide block.

The form accuracy of the optical fiber fixing member of the present invention is preferably within 1/1 of the core diameter of the optical fiber to be fixed, regardless the optical fiber to be fixed be either a quartz-based single mode optical fiber or a multi-mode optical fiber. More preferably, the form accuracy is within ½ of the core diameter of the optical fiber to be fixed, an accuracy of within 1/10 being most preferable. When the form accuracy of the optical fiber fixing member is within 1/1 of the core diameter of the optical fiber to be fixed with the optical fiber fixing member, the foregoing first step in the active alignment can be substantially omitted while, when the accuracy is within ½ of the core diameter of the optical fiber to be fixed with the optical fiber fixing member, active alignment is made more easy. Moreover, when the form accuracy of the optical fiber fixing member is within 1/10 of the core diameter of the optical fiber to be fixed with the optical fiber fixing member, a passive alignment is made possible.

When the optical fiber fixing member is a optical fiber guide block, the "form accuracy of the optical fiber fixing member" as used in the present invention refers to at least one of the following three locational tolerances (the "locational tolerance" itself has the same meaning as defined in JIS B 0021):

(1) locational tolerance (referred to the "locational accuracy I of the center of the optical fiber") of the center(s) of the vertical cross section(s) of the optical fiber(s) measured with reference to the bottom or side face of the optical fiber guide block when the optical fiber(s) is/are engaged to the optical fiber fixing engagement portion(s) for;

(2) locational tolerance (referred to the "locational accuracy II of the center of the optical fiber" hereinafter) of the center of the vertical cross section of each optical fiber measured with reference to a center of the vertical cross section of a guide pin engaged to a groove-shaped guide pin engagement portion when the optical fiber guide block has groove-shaped guide pin engagement portion(s) to engage to the guide pin(s), wherein each optical fiber having the same outer diameter as all of the optical fiber fixing engagement portion(s) (including the case where the total number of the optical fiber fixing engagement portion is one) is engaged to respective engage means; and (3) locational tolerance (referred to the "locational accuracy III of the center of the optical fiber" hereinafter) of the center of the vertical cross section of each optical fiber measured with reference to a desired position in an alignment mark or a desired position on the alignment mark when the optical fiber guide block have alignment mark(s), wherein each optical fiber having the same outer diameter as all of the optical fiber fixing engagement portion(s) (including the case where the total number of the optical fiber fixing engagement portion is one) is engaged to respective engage means.

When the optical fiber fixing member is a holding block, the "form accuracy of the optical fiber fixing member" as used in the present invention corresponds to any one of the following four tolerances (the "flatness tolerance", "rectangular tolerance" and "tolerance of parallelism" themselves correspond to the geometrical tolerance defined in JIS B 0021):

(1) flatness tolerance of the holding plane when the holding block has either the optical fiber holding plane or the coated optical fiber holding plane, or flatness tolerance of each plane when the holding block has both holding planes ("flatness tolerance" may be merely referred to "flatness" hereinafter);

(2) rectangular tolerance of the angle between the holding plane and side face (right side face or left side face of the holding block viewed from the side face to be positioned at the optical end face after being assembled in the optical fiber array) when the holding block has either the optical fiber holding plane or the coated optical fiber holding plane, or rectangular tolerance of the angle between each holding plane and side face (right side face or left side face of the holding block viewed from the side face to be positioned at the optical end face after being assembled in the optical fiber array) when the holding block has both of the optical fiber holding plane and the coated optical fiber holding plane ("rectangular tolerance" may be merely referred to "degree of rectangle" hereinafter);

(3) tolerance of parallelism of at least one group of the three groups comprising a group of the right side face and left side face of the holding block viewed from the side to be positioned at the optical end face in the assembled optical fiber array; a group of the holding plane and top face when the holding block has either the optical fiber holding plane or the coated optical fiber holding plane and a group of each holding plane and top face when the holding block has both of the optical fiber holding plane and the coated optical fiber holding plane ("tolerance of parallelism" may be merely referred to "parallelism" hereinafter); and (4) tolerance of parallelism of the optical fiber holding plane and guide pin holding plane(s) when the holding block has the optical fiber holding plane and the guide pin holding plane(s).

Since the optical fiber fixing member according to the present invention comprises a molded article made of a glass, the optical fiber fixing member is preferably composed of a glass having a sag temperature of 600° C. or less, more preferably 540° C. or less, for preventing the mold from being damaged during molding.

With respect to the optical fiber fixing member to be used for the optical interconnection between the optical waveguide, formed on a substrate of quartz glass or silicon having a small thermal expansion coefficient, and quartz-based single mode optical fiber, it is preferably composed of a glass having a small thermal expansion coefficient in order to reduce the connection loss due to temperature changes at the optical interconnection site. The inventors of the present invention have ascertained that the upper limit of the mean thermal expansion coefficient (a mean thermal expansion coefficient from the room temperature to 400° C.) of the optical fiber fixing member capable of suppressing the connection loss due to temperature changes in the optical interconnection between the optical waveguide, formed on a substrate of a quartz glass or silicon, and quartz-based single mode optical fiber is $70 \times 10^{-7}/°$ C. Accordingly, it is preferable to mold the optical fiber fixing member with a glass having a mean thermal expansion coefficient at room temperature to 400° C. of $70 \times 10^{-7}/°$ C. or less when the optical fiber fixing member according to the present invention is used for the applications as hitherto described. While the optical fiber fixing member composed of such glass naturally has a mean thermal expansion coefficient of $70 \times 10^{-7}/°$ C. or less at room temperature to 400° C., the mean thermal expansion coefficient of the optical fiber fixing member from −50 to +100° C. is also $70 \times 10^{-7}/°$ C. or less. The temperature range of −50 to +100° C. corresponds to the ambient temperature range for use of the optical fiber array.

For the purpose of obtaining a high workability in adhering the optical fiber fixing members with each other for assembling the optical fiber array or in adhering the optical fiber array with other optical fiber array or an optical element, it is preferable to use an ultraviolet curing adhesive. The inventors of the present invention has confirmed that the optical fiber fixing member should be molded with a glass which transmits 30% or more, preferably 60% or more, of ultraviolet ray having an wavelength of 350 nm when it has a thickness of 2 mm, or a glass which transmits 60% or more of ultraviolet ray having an wavelength of 300 nm when it has a thickness of 2 mm. Accordingly, it is preferable that the optical fiber fixing member according to the present invention comprises a glass which transmits 30% or more, preferably 60% or more, of ultraviolet ray having an wavelength of 350 nm when it has a thickness of 2 mm, or a glass which transmits 60% or more of ultraviolet ray having an wavelength of 300 nm when it has a thickness of 2 mm.

The glass having a sag temperature of 600° C. or less, a mean thermal expansion coefficient of $70 \times 10^{-7}/°$ C. (a mean thermal expansion coefficient at −50 to +100° C.) at a temperature of room temperature to 400° C. and a transmittance of 30% or more to ultraviolet ray with an wave length of 350 nm at a thickness of 2 mm can be obtained by using, for example, $SiO_2$, $B_2O_3$ and ZnO as glass components.

Examples of the glass as described above contains, as glass components, 1 to 30% by weight of $SiO_2$, 15 to 40% by weight of $B_2O_3$, 40 to 60% by weight of ZnO (excluding 40% by weight), 0 to 15% by weight of MgO, 0 to 10% by weight of Cao, 0 to 10% by weight of SrO, 0 to 10% by weight of BaO and 0 to 20% by weight of PbO with a combined content of ZnO, MgO, CaO, SrO, BaO and PbO of 40 to 60% by weight (excluding 40% by weight), in addition to 0 to 10% by weight of $Al_2O_3$ (excluding 0% by weight), wherein the combined content of the glass components described above is 75% by weight or more (this glass is referred to "a first class glass" hereinafter).

It is especially preferable that this first class glass contains 3 to 30% by weight of $SiO_2$, 20 to 40% by weight of $B_2O_3$, 40 to 55% by weight of ZnO (excluding 40% by weight), 0 to 15% by weight of MgO, 0 to 10% by weight of CaO, 0 to 10% by weight of SrO, 0 to 10% by weight of BaO and 0 to 20% by weight of PbO with a combined content of ZnO, MgO, CaO, SrO, BaO and PbO of 40 to 55% by weight (excluding 40% by weight) in addition to 0.5 to 10% by weight of $Al_2O_3$ and 0 to 7% by weight of $Li_2O$ (this glass is referred to a second class glass hereinafter).

The first and second class glasses may further contain 0 to 10% by weight of $GeO_2$ (wherein the combined content of $SiO_2$ and $GeO_2$ is 3 to 30% by weight), 0 to 20% by weight of $La_2O_3$, 0 to 10% by weight of $Y_2O_3$, 0 to 10% by weight of $Gd_2O_3$ (wherein the combined content of $La_2O_3$, $Y_2O_3$ and $Gd_2O_3$ is 0 to 20% by weight), 0 to 10% by weight of $Nb_2O_5$, 0 to 10% by weight of $Ta_2O_5$ (wherein the combined content of $Nb_2O_5$ and $Ta_2O_5$ is 0 to 10% by weight), 0 to 5% by weight of $ZrO_2$ and 0 to 3% by weight of $TiO_2$. For the purpose of obtaining improved degassing and decoloring, one or a plurality of the compounds of $As_2O_3$, $Sb_2O_3$, SnO and $Sno_2$ may be added to the glass as additive agents. However, since an addition of more than 4% by weight of $As_2O_3$, $Sb_2O_3$, SnO and $SnO_2$ do not improve the effect of degassing and decoloring, it is desirable to use these components in a combined amount of 0 to 4% by weight. An appropriate amount of F, $Bi_2O_3$, $Yb_2O_3$ and $WO_3$, and a trace amount of $Na_2O$ and $K_2O$ may be added in a range not to deteriorate optical characteristics of the glass.

The optical fiber guide block as one of the optical fiber fixing member according to the present invention, and the holding block as one of the optical fiber fixing member according to the present invention will be described hereinafter, respectively.

One example of the optical fiber guide block, one of the optical fiber fixing member according to the present invention, has optical fiber fixing engagement portion(s) on its top face. One end along the longitudinal direction of the optical fiber fixing engagement portion(s) reaches to a side face, of the side faces of the optical fiber guide block, to be positioned at the optical end face of the optical fiber array, while the other end reaching to the rear side face (when the optical fiber guide block possesses a pedestal to be described later, the side face forming a boundary face with this pedestal).

The optical fiber fixing engagement portion may be formed so as to allow the optical fiber to be engaged thereto so that the outside surface of the optical fiber is at the same level or lower than the level of the upper end face of the optical fiber fixing engagement portion. Further, it is preferable to form the optical fiber fixing engagement portion so as to allow the optical fiber to be engaged thereto so that the outside surface of the optical fiber is slightly protruded from the upper end face of the engagement portion for accurately positioning and fixing the optical fiber engaged to the optical fiber fixing engagement portion by using the holding block.

The optical fiber fixing engagement portion may be, for example, linear or curved with a V-, U-, arc or ⌴-shaped vertical cross section (a vertical cross section with respect to the direction perpendicular to the longitudinal direction). The optical fiber fixing engagement portion may comprise concave groove or may be formed by forming convex portions with a given cross sectional configuration to form side faces of a optical fiber fixing engagement portion. Of these shapes, a vertical cross section comprising a V-shaped concave groove (referred to "V-groove") is especially preferable. When the optical fiber fixing engagement portion is v-groove, the optical fiber can be fixed with a high precision because the optical fiber is supported with three points of both side faces of the V-groove and holding block. Moreover, the optical fiber fixing engagement portion can be precisely transferred from the mold because injection of glass into the mold at molding and release of the molded article after molding are easy.

Numbers of the optical fiber fixing engagement portion are not specifically limited but they may be desired numbers of one or more depending on the application of the optical fiber guide block in concern. When a plurality of the optical fiber fixing engagement portion are formed, these optical fiber fixing engagement portions may be in parallel relation with each other or may not be parallel, their disposition being appropriately selected depending on the application of the optical fiber guide block in concern.

The optical fiber guide block may have only the optical fiber fixing engagement portion as described above. However, the optical fiber to be engaged to the optical fiber fixing engagement portion usually constitutes an optical transmission medium such as an optical fiber code (mono-core) or tape fiber (multi-core) in which the optical fiber(s) is/are protected by a coating portion comprising a resin and the like with its terminal end being exposed in a desired length. Accordingly, it is preferable that pedestal(s) for fixing the coated optical fiber(s) is/are formed in adjoining relation to the optical fiber fixing engagement portion(s) in the optical fiber guide block described above.

Examples of the Pedestal are:
(1) a pedestal whose surface is formed at a lower position than the upper end surface of the optical fiber fixing engagement portion(s), whose side face in the transverse direction (the transverse direction viewed from the side face to be positioned at the optical end face after assembling the optical fiber array; the same hereinafter) forming the side face in the transverse direction of the guide block (the transverse direction viewed from the side face to be positioned at the optical end face after assembling the optical fiber array; the same hereinafter); and (2) a pedestal whose surface is formed at a lower position than the upper end surface of the optical fiber fixing engagement portion(s), whose width being prescribed to be equal or slightly larger than the width of the coated optical fiber to be fixed by the side wall portions (with a height higher than the pedestal) formed at the side (a side viewed from the surface to be positioned at the optical end face after assembling the optical fiber array) of the pedestal.

"A pedestal whose surface is formed at a lower level than the upper end surface of the optical fiber fixing engagement portion" as used in the present invention means that the level difference between the surface of the pedestal and the upper end surface of the optical fiber fixing engagement portion(s), and the surface configuration of the pedestal are suitable for substantially horizontally fixing the optical fiber(s) that constitute the optical fiber code and tape fiber from the optical fiber fixing engagement portion(s) to the pedestal.

When the foregoing coated optical fiber is fixed to the pedestal (2) described above with an adhesive such as an ultraviolet curing adhesive, or when an optical fiber array is assembled by adhering the optical fiber guide block having the pedestal (2) described above and holding block (a coated optical fiber holding block or a dual-purpose holding block to be described later) with an adhesive such as an ultraviolet curing adhesive, the adhesive can be prevented from being overflowed to the transverse direction of the optical fiber guide block by virtue of the side wall portions described above. Positioning for fixing the coated optical fiber is made easy in the optical fiber guide block having a pedestal (2) described above since the width of the pedestal is limited by the foregoing side face. When the optical fiber code or tape fiber remained to be bent due to being allowed to be coiled for preservation, or when the optical fiber code or tape fiber is deformed during exposing work of the optical fiber(s), the configuration of such optical fiber code or tape fiber can be reformed with the foregoing side wall portions in the optical fiber guide block having a pedestal (2) described above, whereby making it possible to precisely and easily guide the exposed optical fiber(s) to the optical fiber fixing engagement portion(s).

When the height of the foregoing side wall portions are adjusted higher than the height of the lower face of the optical fiber holding block, after compression-fixing the optical fiber(s) engaged to the optical fiber fixing engagement portion(s) with the optical fiber holding block to be described later, positioning of the optical fiber holding block along the direction of depth is made easy since the side wall portions serves as a stopper with respect to the depth direction of the optical fiber holding block (the depth direction viewed from the side face to be positioned at the optical end face after assembling the optical fiber array).

Positioning of the holding block can be easily carried out by forming engage means to engage to the desired position (s) of the holding block on the optical fiber guide block. "To form engage means to engage to the desired position(s) of the holding block on the optical fiber guide block" as used in the present invention means that the optical fiber guide block is engaged to a given position of the holding block when the optical fiber(s) is/are not engaged to the optical fiber fixing engagement portion(s) of the optical fiber guide block, and the optical fiber guide block can be engaged to a given position of the holding block or to the given position of the holding block with a slight gap from the holding block in the given position when the optical fiber(s) is/are engaged to the optical fiber fixing engagement portion(s) of the optical fiber guide block.

For example, positioning along the transverse direction of the holding block (transverse direction viewed from the side face to be positioned at the optical end face after assembling the optical fiber array; the same hereinafter) is made easy by forming engage means comprising concave portion(s), convex portion(s), step(s) or inclined face(s) at the side portion(s) in the transverse direction of the lower face of the holding block, along with forming engage means comprising convex portion(s), concave portion(s), step(s) or inclined face(s) with a given configuration to engage to the foregoing engage means (provided on the holding block) at the side portion(s) of the top face of the optical fiber guide block (including the edge(s) of the side wall portion(s) at the pedestal side when the optical fiber guide block have side wall portions as described previously). When an optical fiber holding block is used in combination with the optical fiber guide block having a pedestal described in (1), besides providing the side wall portions to the optical fiber guide block, positioning of the optical fiber holding block along the direction of depth can be easily carried out by the following method: The length of the optical fiber holding block along its depth direction is made longer than the length along the depth direction of the optical fiber fixing engagement portion(s) of the optical fiber guide block having a pedestal in described in (1), and convex part(s) disposed in contact relation to the step between the optical fiber fixing engagement portion(s) in the optical fiber guide block and the pedestal is provided at the side portion in the transverse direction of the lower face of the optical fiber holding block.

At least that edge(s) of the engage means positioned at the outermost side in the transverse direction of the optical fiber guide block may be "edge(s) formed of free surface(s)" described above when the engage means is/are formed on the optical fiber guide block. Similarly, at least that edge(s) of the engage means positioned at the outermost side in the transverse direction of the holding block may be the above described "edge(s) formed of free surface(s)" when the engage means as previously described is/are formed on the holding block. When the engage means having "edge(s) formed of free surface(s)" with a length (the length along the depth direction (the depth direction viewed from the side face to be positioned at the optical end face after assembling the optical fiber array) of the optical fiber guide block) equal to or more of the length along the depth direction of the holding block is formed on the optical fiber guide block, wherein the engage means as described previously (the engage mean having "an edge formed of a free surface" described above) to engage to the engage means is formed over the total length along the depth direction of the holding block, the adhesive can be easily prevented from being overflowed to the transverse direction (the transverse direction viewed from the optical end face) of the optical fiber array by the following reasons in assembling an optical fiber array by adhering an optical fiber guide block to the holding block using an adhesive such as an ultraviolet curing adhesive.

Adhesives can be readily prevented from being overflowed because a space is formed between two edges, one being an edge formed of a free surface at the outermost position in the transverse direction of the optical fiber guide block and the other being an edge formed of a free surface at the outermost position in the transverse direction of the holding block, and this space serves as an adhesive pool.

Use of guide pin(s) is desirable in connecting the optical fiber arrays with each other or in connecting the optical fiber array with the optical element for easily alignment with a high precision. It is preferable for this purpose that the optical fiber guide block described above has groove-shaped guide pin engagement portion(s) to engage to guide pin(s). The number of the groove-shaped guide pin engagement portion may be a desired number of one or more depending on the guide pin numbers to be used. The guide pin numbers to be used is one or more, and two pins being usually used. Accordingly, it is preferable that the optical fiber guide block has two groove-shaped guide pin engagement portions.

The groove-shaped guide pin engagement portion preferably comprises concave groove with a desired cross sectional configuration, the vertical cross sectional configuration (a vertical cross section along the direction forming a right angle to the longitudinal direction; the same hereinafter) being able to be appropriately selected depending on the vertical cross sectional configuration (a vertical cross section along the direction forming a right angle to the longitudinal direction; the same hereinafter) of the guide pin to be sued. In obtaining an optical fiber array to be used for the guide pin(s) having a circular vertical cross section, for example, the vertical cross sectional configuration of the groove-shaped guide pin engagement portion formed on the optical fiber guide block that is a constitution member of the optical fiber array may be V-shaped, U-shaped, arc or ⊔-shaped. Of these configurations, like the optical fiber fixing engagement portion, a concave groove whose vertical cross section assumes a V-shaped configuration (V-groove) is especially preferable.

Although the position for forming the groove-shaped guide pin engagement portion is not especially limited, it is preferable that the center of the vertical cross section of the guide pin when the guide pin is engaged to the groove-shaped guide pin engagement portion is formed so as to be linearly aligned with the center of the vertical cross section of the optical fiber(s) when the optical fiber(s) is/are engaged to the optical fiber fixing engagement portion(s) described above for obtaining an optical fiber array capable of connecting with the optical connector. It is also preferable that the center of the vertical cross section of each guide pin after engaging each guide pin to these groove-shaped engage means is formed so as to be linearly aligned with the center of the vertical cross section of the optical fiber(s) when the optical fiber(s) is/are engaged to the optical fiber fixing engagement portion(s) when a plurality of groove-shaped guide pin engagement portions are formed on the right and left sides of the optical fiber fixing engagement portion(s) (left side and right side viewed from the side face to be positioned at the optical end face after assembling to the optical fiber array), respectively.

The "locational accuracy II of the center of the optical fiber" previously described for the optical fiber guide block is preferably within 1/1, more preferably within ½ and most preferably within 1/10 of the core diameter of the optical fiber to be fixed when the optical fiber block has groove-shaped guide pin engagement portion(s) as described above. The "locational accuracy I of the center of the optical fiber" previously described for the optical fiber guide block is, on the other hand, not necessarily within 1/1 of the core diameter of the optical fiber to be fixed, since alignment is performed with guide pin(s). However, since the guide pin can be easily inserted when the guide pin is inserted into the optical fiber array while the side face or bottom face of the optical fiber array is pressed to a jig, the "locational accuracy I of the center of the optical fiber" is also preferably within 1/1, more preferably within ½ and most preferably within 1/10 of the core diameter of the optical fiber to be fixed.

A high precision alignment is made possible by using an optical fiber guide block marked with alignment mark(s) for an optical interconnection besides using guide pin(s). While the alignment mark(s) may be formed after molding the optical fiber guide block without forming the alignment mark(s), it is more preferable to form the alignment mark(s) together with molding the optical fiber guide block.

Examples of the configuration of the alignment mark include convex or concave mark with a plane view of a cross, circle, two concentric circles or a triangle. The position of the alignment mark should be favorable for confirming with an optical microscope in connecting two optical fiber arrays, each having an optical fiber guide block marked with the alignment mark(s) as a constitution member, with each other or the optical fiber array having an optical fiber guide block marked with the alignment mark(s) as a constitution member with optical element(s). An example of such positions includes an outer side position of the optical fiber fixing engagement portion(s) at the same side with the face where the optical fiber fixing engagement portion(s) is/are provided, or a side face positioned in the transverse direction on the optical fiber guide block. The number of the alignment mark is not specifically limited but a desire number of one or more is allowed. However, two marks are usually sufficient.

Detection of the alignment mark with an optical microscope is possible from any direction through top, bottom and side faces in connecting two optical fiber arrays, each having an optical fiber guide block marked with the alignment mark(s) as a constitution member, with each other or the optical fiber array having an optical fiber guide block marked with the alignment mark(s) as a constitution member with an optical element because the convex or concave alignment mark has a thickness (a positive or negative thickness). Accordingly, an alignment from the direction of thickness in addition to an alignment from the direction of width is made possible, enabling an easy alignment with a high precision. When the alignment mark described above is molded simultaneously with other part of the optical fiber guide block, the locational accuracy of the alignment mark to the optical fiber fixing engagement portion(s) can be made so high that an alignment with a high precision is more easily performed. Automated alignment by taking advantage of an image recognition technology is also possible by forming the alignment mark(s) on the optical fiber guide block. Directional degree of freedom for observing by an image recognition technique becomes high since the alignment mark(s) is/are detectable from any directions through the top, bottom and side faces.

When the optical fiber guide block has alignment mark(s) described above, the "locational accuracy III of the center of the optical fiber" regarding to the foregoing optical fiber guide block is preferably within 1/1, more preferably within ½ and most preferably within 1/10 of the core diameter of the optical fiber to be fixed. While the "locational accuracy I of the center of the optical fiber" regarding to the foregoing optical fiber guide block may not be within 1/1 of the core diameter of the optical fiber to be fixed, the "locational accuracy I of the center of the optical fiber" is preferably within 1/1, more preferably within ½ and most preferably within 1/10 of the core diameter of the optical fiber to be fixed for the purpose of enabling a easy and prompt detection of the alignment mark(s) by making the scanning range for bringing the alignment mark(s) in the optical microscope's vision as small as possible.

Figure 29:
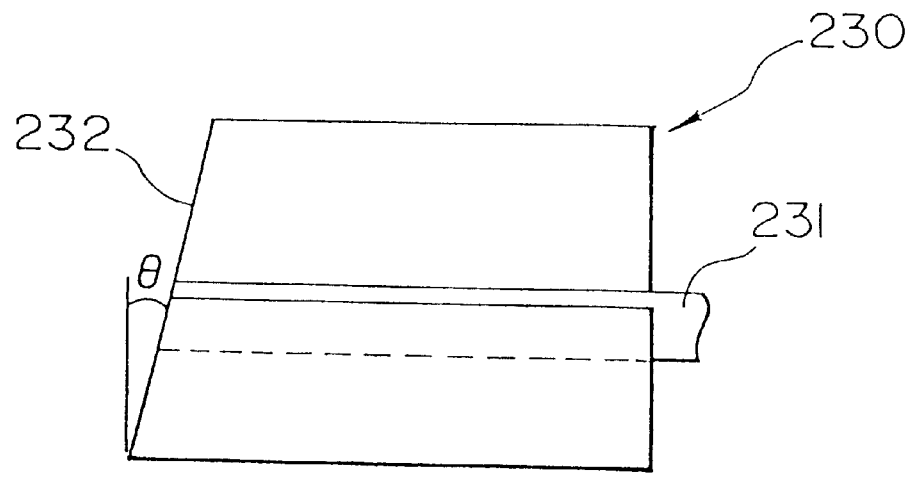
FIG. 29 is a side view for describing inclined pattern of the optical end face in the conventional butt joint type optical fiber array.

The optical fiber guide block as one of the optical fiber fixing member may be either a constitution member of an optical fiber array for an enlarged beam connection or a constitution member of an optical fiber array for a butt joint. It is preferable for obtaining an optical fiber array for a butt joint with a small reflection loss that, as usual, the optical end face in the optical fiber array is inclined relative to the plane perpendicular to the optical axis of the optical fiber fixed in the optical fiber array. The phrase "the optical end face in the optical fiber array is inclined relative to the plane perpendicular to the optical axis of the optical fiber fixed in the optical fiber array" as used herein means that, in the side view of the optical fiber array, the optical end face is inclined so that the angle θ between the plane perpendicular to the optical axis described above and the optical end face becomes 6° or more (see FIG. 29).

The angle θ above can be appropriately selected depending on the refractive index of the core of the optical fiber fixed in the optical fiber array, or refractive index of the core of the optical waveguide when the object of optical interconnection is an optical waveguide. For example, when the optical fiber fixed in the optical fiber array is a quartz-based single mode optical fiber, it is preferable that the angle θ is 8° or more since the refractive index of the optical fiber core is about 1.5. The reflection loss in this case will account for −55 dB or less.

It is preferable for readily obtaining an optical fiber array for butt joint with little connection loss that, in the optical fiber guide block as described above, the angle between the side face, to be positioned at the optical end face after assembled into the optical fiber array, and a plane perpendicular to the optical axis of the optical fiber, which is engaged to the optical fiber fixing engagement portion, is the angle described above or within the angle described above ±0.2°.

The end face to be positioned at the optical end face of the optical fiber should be eventually polished to form the same angle with the optical end face of the optical fiber array to obtain an optical fiber array in which the plane perpendicular to the optical axis of the optical fiber to be optically connected and the optical end face of the optical fiber array cross at a desired angle, even if an optical fiber guide block and a holding block having an angle between the side face, positioned at the optical end face of the optical fiber array, and a plane perpendicular to the optical axis of the optical fiber is a desired angle are used.

However, polishing efficiency will be improved when an optical fiber guide block and holding block, in which the side face to be positioned at the optical end face and the plane perpendicular to the optical axis of the optical fiber cross at a desired angle, or at an angle within ±0.2° from this angle, are used, because a small amount of polishing margin is required. Furthermore, edges of the optical fiber guide block and holding block are prevented from being cracked since the face to be polished makes a face-contact with a polishing board throughout the polishing work, thereby preventing the polished face, especially the polishing face of the optical fiber, from being damaged with polishing flaws or the polishing board from being broken. Consequently, an optical fiber array for butt joint can be easily obtained. When the edge of the face making a contact with the polishing board is an edge formed of a free surface in the optical fiber block and holding block to be described later, generation of cracks at the edge can be more effectively prevented.

While the optical fiber guide block for the optical fiber array belongs to one of the optical fiber fixing member of the present invention has been hitherto described, the holding block for the optical fiber array also belongs to one of the optical fiber fixing member of the present invention. The holding block as one of the optical fiber fixing member will be described hereinafter.

The holding block described above may be merely for compression-fixing the optical fiber(s) engaged to the optical fiber fixing engagement portion(s) of the optical fiber block (this block is referred to "optical fiber holding block" hereinafter), or merely for compression-fixing the coated optical fiber fixed on the pedestal of the optical fiber guide block from above the coating portion of the coated optical fiber (this block is referred to "coated optical fiber holding block" hereinafter), or for compression-fixing the optical fiber(s) engaged to the optical fiber fixing engagement portion(s) of the optical fiber guide block along with compression-fixing the coated optical fiber fixed on the pedestal of the optical fiber guide block from above the coating portion of the coated optical fiber (this block is referred to "dual-purpose holding block" hereinafter).

The optical fiber holding block should have an optical fiber engage means for compression-fixing the optical fiber(s) engaged to the optical fiber fixing engagement portion(s) of the optical fiber guide block. Examples of this optical fiber engage means include groove(s) having a V-shaped, U-shaped, arc or ⌴-shaped vertical cross section when the vertical cross section is viewed by placing the face on which the optical fiber engage means is/are provided upwardly, or a plane. Of these shapes, a plane is preferable considering easiness of processing and compatibility with the optical fiber fixing engagement portion(s) formed on the optical fiber guide block (this plane is referred to "optical fiber holding plane" hereinafter).

The optical fiber holding block as described above may have a function to press-fix all the optical fibers engaged to the optical fiber fixing engagement portions with the foregoing optical fiber engage means. While the optical fiber holding block may have a length along the transverse direction enough for forming the optical fiber engage means, the preferable length for practical purposes is a length equal to or slightly shorter than the length along the transverse direction of the optical fiber guide block to be used in combination with the holding block (the length at the top face where optical fiber fixing engagement portion(s) is/are provided when the length along the transverse direction of the optical fiber guide block is different at the bottom face and at the top face). The preferable length along to the depth direction for practical purposes is a length equal to the length along the depth direction of the optical fiber fixing engagement portion(s) formed on the optical fiber guide block to be used in combination with the holding block (the length along the depth direction viewed from the side face to be positioned at the optical end face after assembling into an optical fiber array).

At least one of the flatness of optical fiber holding plane and degree of the rectangle between the optical fiber holding plane and side face (right or left side face viewed from the side face to be positioned at the optical end face assembled into the optical fiber array) in the optical fiber holding block is preferably within 1/1, more preferably within ½ and most preferably within 1/10 of the core diameter of the optical fiber to be fixed when the optical fiber holding block has an optical fiber holding plane. Although the parallelism between the side faces of the optical fiber holding block (right side face and left side face viewed from the side face to be positioned at the optical end face assembled into the optical fiber array) and the parallelism between the optical fiber holding plane and top face of the optical fiber holding block may not necessarily be within 1/1 of the core diameter of the optical fiber to be fixed, at least one of the tolerances (two kinds of foregoing parallelisms) is preferably within 1/1, more preferably within ½ and most preferably within 1/10 of the core diameter of the optical fiber to be fixed.

The coated optical fiber holding block should have a coated optical fiber engage means for compression-fixing the coated optical fiber(s) fixed on the pedestal of the optical fiber guide block from above the coating portion(s) of the coated optical fiber(s). This coated optical fiber engage means may be usually a plane (referred to "coated optical fiber holding plane" hereinafter).

The coated optical fiber holding block may have a function to press-fix the coated optical fiber fixed to the pedestal of the optical fiber guide block with the coated optical fiber engage means at least in a range of the total length along the transverse direction of the coated optical fiber(s). Accordingly, while the coated optical fiber holding block may have a length enough for forming a coated optical fiber engage means along its transverse direction, the preferable length along the transverse direction for practical purposes is a length equal to or slightly shorter than the length along the transverse direction of the optical fiber guide block to be used in combination with the holding block (the length on the surface (top face) when the length along the transverse direction of the pedestal differs at the bottom and surface (top face) of the pedestal).

At least one of the flatness of coated optical fiber holding plane and the degree of rectangle between the coated optical fiber holding plane and side face (left or right side face viewed from the side face to be positioned at the optical end face assembled into the optical fiber array) in the coated optical fiber holding block is preferably within 1/1, more preferably within ½ and most preferably within 1/10 of the core diameter of the optical fiber in the coated optical fiber to be fixed. Although the parallelism between the side faces of the optical fiber holding block (right side face and left side face viewed from the side face to be positioned at the optical end face assembled into the optical fiber array) and the parallelism between the coated optical fiber holding plane and top face of the coated optical fiber holding block may not necessarily be within 1/1 of the core diameter of the optical fiber to be fixed, at least one of the tolerances (two kinds of foregoing parallelisms) is preferably within 1/1, more preferably within ½ and most preferably within 1/10 of the core diameter of the optical fiber to be fixed.

The foregoing optical fiber holding block and coated optical fiber holding block are integrated in the dual-purpose holding block as described previously, its function and configuration being also integrated ones of the foregoing optical fiber holding block and coated optical fiber holding block. This dual-purpose holding block can be obtained by molding a block having a combined configuration of the optical fiber holding block and coated optical fiber holding block.

In the dual-purpose holding block, at least one of the three kinds of tolerances of the flatness of the optical fiber holding plane and coated optical fiber holding plane, the degree of rectangle between the optical fiber holding plane or coated optical fiber holding plane and a side face (left or right side face viewed from the side face to be positioned at the optical end face assembled into the optical fiber array), and the parallelism between the optical fiber holding plane or coated optical fiber holding plane and top face of the dual-purpose holding block (the flatness, the degree of rectangle and the parallelism) is preferably within 1/1, more preferably within ½ and most preferably within 1/10 of the core diameter of the optical fiber to be fixed.

It is preferable that the optical fiber holding block, coated optical fiber holding block and dual-purpose holding block as hitherto described have engage means to engage to desired position(s) of the optical fiber guide block in order to make the positioning easy. The term "engage means to engage to desired position(s) of the optical fiber guide block" as used in the present invention refers to engage means to engage in a manner as described previously to the foregoing engage means formed to make positioning of the holding block easy in the optical fiber guide block according to the present invention. Detailed description of this engage means will be omitted herein since it has been already explained.

It is also preferable that the optical fiber holding block and dual-purpose holding block have guide pin engagement portion(s) to engage to guide pin(s), when the optical fiber holding block and dual-purpose block are for use in combination with an optical fiber guide block on which foregoing groove-shaped guide pin engagement portion(s) is/are formed on the face at the same side as the optical fiber fixing engagement portion(s). Examples of the guide pin engagement portion(s) include groove(s) having V-shaped, U-shaped, arc or ⌴-shaped vertical cross section when the vertical cross section is viewed by placing the face on which the guide pin engagement portion(s) is/are provided upwardly, or plane(s) (referred to "guide pin holding plane(s)" hereinafter).

Of these shapes, the guide pin holding plane(s) is/are preferable with respect to easiness of processing and compatibility with the optical fiber fixing engagement portion(s) formed on the optical fiber guide block. Flatness of the guide pin holding plane(s) is/are preferably 1 $\mu$m or less, especially 0.5 $\mu$m or less, in order to uniformly hold the guide pin(s). The parallelism (one of the form accuracy on the holding block according to the present invention) between the optical fiber holding plane(s) and guide pin holding plane(s) is/are, as hitherto described, preferably within 1/1, more preferably within ½ and most preferably within 1/20 of the core diameter of the optical fiber to be fixed.

It is preferable for the purpose of obtaining an optical fiber array for use in the butt joint type connection with a small connection loss that the optical fiber holding block or dual-purpose holding block described above has, like the optical fiber guide block according to the present invention, a side face to be positioned at the optical end face after assembled into the optical fiber array, that is inclined at an angle of 6° or more, or within the angle ±0.2°, relative to the plane perpendicular to the optical axis of the optical fiber to be press fixed with the optical fiber holding block or dual-purpose holding block.

While the optical fiber guide block and holding block as optical fiber fixing member have been hitherto described in detail, these optical fiber guide block and holding block may have groove-shaped optical element engage portion(s) for positioning and fixing the optical element(s) such as an light emitting element, a light-acceptance element, a lens, a prism and a filter. The optical fiber fixing member according to the present invention can be mass-produced with a low production cost, for example, by the method for producing the optical fiber fixing member according to the present invention to be described later.

An optical fiber array can be obtained by a combination of the foregoing optical fiber guide block according to the present invention, the foregoing holding block(s) according to the present invention or conventional holding block(s), and optical fiber(s). Similarly, an optical fiber array can be obtained by a combination of the foregoing optical fiber guide block or conventional optical fiber guide block, the foregoing holding block(s) according to the present invention, and optical fiber(s). All of these optical fiber array belongs to the optical fiber array according to the present invention. For the purpose of optical interconnection of optical fibers with each other or optical interconnection of optical fiber(s) with optical element(s) with as high an alignment accuracy as possible, it is preferable to obtain an optical fiber array by a combination of the optical fiber guide block according to the present invention, the holding block according to the present invention and optical fiber(s).

The foregoing optical fiber array according to the present invention includes the foregoing optical fiber guide block according to the present invention and/or the foregoing holding block according to the present invention as constitution member(s), which can be readily mass-produced with a low production cost. Accordingly, the optical fiber array according to the present invention can be also produced with a lower production cost than conventional ones.

The optical fiber array according to the present invention comprising the foregoing optical fiber guide block according to the present invention, foregoing holding block according to the present invention and optical fiber(s) can be obtained as follows:

A given length of one end of optical fiber(s) is/are first exposed from an optical communication medium such as an optical fiber code or a tape fiber prepared by protecting optical fiber(s) by coating portion comprising a resin, followed by engaging the exposed optical fiber(s) to the optical fiber fixing engagement portion(s) of the optical fiber guide block. The optical fiber fixing engagement portion(s) is/are previously coated with an adhesive such as an ultraviolet curing type adhesive or a heat curing type adhesive. When the optical fiber guide block has a pedestal, the coated optical fiber described above (the portion of the optical communication medium where optical fiber(s) is/are not exposed) is fixed to the pedestal using an adhesive along with engaging the exposed optical fiber(s) to the optical fiber fixing engagement portion(s) of the optical fiber guide block.

Then, an adhesive is coated to the optical fiber(s) engaged to the optical fiber fixing engagement portion(s) and to its periphery, the foregoing optical fiber holding block being covered thereon with pressing so that the optical fiber engage means formed on the optical fiber holding block is/are engaged to the optical fiber(s), thereby adhering the optical fiber holding block by curing the adhesive. When the optical fiber guide block has a pedestal, the optical fiber holding block is adhered as described above along with coating an adhesive on the coating portion of the optical communication medium fixed on the pedestal, wherein the foregoing coated optical fiber holding block is mounted thereon with pressing so that the coated optical fiber engage means formed on the coated optical fiber holding block engages to the coating portion, thereby adhering the coated optical fiber holding block by curing the adhesive. Otherwise, an adhesive is coated on the optical fiber(s) engaged to the optical fiber fixing engagement portion(s) and its periphery, and on the coated optical fiber fixed on the pedestal and its periphery, wherein the dual-purpose holding block is mounted thereon with pressing so that the optical fiber engage means formed on the dual-purpose holding block engages to the optical fiber, or the coated optical fiber engage means formed on the dual-purpose holding block engages to the coating portion, thereby adhering the dual-purpose holding block by curing the adhesive. An optical fiber array can be thus obtained by adhering the optical fiber guide block with the holding block via at least optical fiber(s).

The optical module according to the present invention will be described hereinafter.

The optical module according to the present invention is characterized, as described above, by being provided with the foregoing optical fiber array according to the present invention, and optical element(s) or optical fiber(s) optically connected to the optical fiber(s) fixed in the optical fiber array.

When the optical module according to the present invention is provided with the optical fiber array, and optical fiber(s) optically connected to the optical fiber(s) fixed in the optical fiber array, the optical fiber(s) optically connected to the optical fiber(s) fixed in the optical fiber array may be fixed in other optical fiber array or fixed with other optical fiber fixing tool.

When the optical module according to the present invention is provided with an optical fiber array and optical element(s) optically connected to the optical fiber(s) fixed in the optical fiber array, the optical element(s) described above may be disposed on the optical fiber guide block constituting the optical fiber array, or may be disposed on a substrate different from the optical fiber array. The kind of the optical element may be appropriately selected depending on the application purposes of the optical module. Examples of the optical elements as constitution member of the optical module include a light emitting element such as a semiconductor laser or a light emitting diode, a light acceptance element such as a photo-diode, a micro-lens, an wave plate, a thin plate filter, an optical amplifier and an optical waveguide.

The optical module according to the present invention includes the foregoing optical fiber array according to the present invention as a constitution member, this fiber array being composed of the foregoing optical fiber fixing member made of a glass according to the present invention as a constitution member. The optical fiber fixing member made of a glass according to the present invention can be mass-produced with a low production cost. Accordingly, the optical module according to the present invention can be also produced with a lower production cost than conventional ones.

The method for producing the foregoing optical fiber fixing member according to the present invention will be described hereinafter.

The method for producing the optical fiber fixing member according to the present invention is characterized by comprising the steps of: disposing a glass shaping preform whose plane view configuration resembles to the plane view configuration of the molded article and whose face positioned in the pressurizing direction in press-molding assumes a plane or an outwardly convex curved surface in a mold having a desired cavity configuration; heating the glass shaping preform up to a temperature to enable molding; and press-molding a thin-plate like molded article having at least one edge formed of a free surface.

It is not impossible to use a marble-shaped glass for the glass shaping preform described above irrespective of the configuration of the desired molded article. However, it is preferable to use a material having a similar plane view configuration with the plane view configuration of the desired molded article for the purpose of obtaining a molded article with high dimensional and form accuracies. Use of a glass shaping preform assuming a plane view of rectangle or approximately rectangle is preferable for any one of the optical fiber guide block and holding block according to the present invention as intended molded article. The plane view configuration of the glass shaping preform may be one of the following configurations: (a) substantially a rectangle, (b) a rectangle except that one or a plurality of corners are rounded; (c) substantially a trapezoid; (d) substantially a trapezoid except that one or a plurality of corners are rounded; (e) a polygon having a pair of confronting side lines, the width from one of this pair of side lines to the confronting side line being stepwisely decreased; and (f) a polygon described in (e) except that one or a plurality of edges are rounded.

"The face positioned in the pressurizing direction in press-molding" as used in the present invention refers to two faces of the faces of the glass shaping preform, one is the face making a contact with the molding face of a mold element (upper or lower mold member; referred to "movable mold member" hereinafter.) traveling along the pressurizing direction in molding, and the other is a face confronting to the face. Accordingly, the glass shaping preform is a three dimensional material having two faces positioned in the pressurizing direction at molding and side faces.

It is made possible to allow the glass to be substantially uniformly spread into the mold by making the configuration of the glass shaping preform to resemble to the configuration of the desired molded article as described above, especially by taking the configuration described in (a) or (b) above, thereby enabling to effectively prevent the molded article from being locally molded, burrs from being generated or transfer accuracy from being insufficient. When a glass shaping preform whose overall dimension is able to form substantially uniform gaps between the inner side faces of the mold is used and this glass shaping preform is disposed for press-molding in the mold so that substantially uniform gaps are formed between the glass shaping preform and inner side faces of the mold, the glass is substantially uniformly spread in the mold during press-molding, thereby each end face of the glass can be substantially simultaneously reached to the inner side faces of the mold. Consequently, molding burrs are prevented from being generated besides the transfer accuracy is also prevented from being insufficient.

Preferably at least one edge of the edges surrounding the rear side face of the optical fiber fixing member is "an edge formed of a free surface" for obtaining an optical fiber fixing member with high dimensional and form accuracies. More preferably, all the edges surrounding the rear side face are "edges formed of free surfaces". It is also preferable, from the same point of view, that edges extending from the side face confronting to the rear side face (a side face to be positioned at the optical end face after assembling into the optical fiber array) to the rear side face of the edges surrounding the bottom face are "edges formed of free surfaces". As hitherto described, all the edges in the molded article are not necessarily "edges formed of free surfaces", but desired edge(s) in the molded article is/are "edge(s) formed of free surface(s)".

Filling up of the glass into the corner of the mold during the press-molding tends to be retarded as the distance between the corner and the glass shaping preform is longer. When a molded article having longitudinal and transverse directions is molded, filling up of the glass along the longitudinal direction of the molded article is liable to be slower than filling up of the glass along the transverse direction. Accordingly, it is possible to obtain a molded article having edge(s) formed of free surface(s) at desired position(s) by using a glass shaping preform with a configuration previously described in (c) to (f), or by disposing the glass shaping preform along a little biased desired direction in the mold followed by a press-molding.

In obtaining an optical fiber fixing member having a rectangle shaped plane view, for example, an optical fiber fixing member having desired dimensional and form accuracies while preventing local molding burrs from being generated can be obtained by disposing the glass shaping preform along a little biased direction in the mold, so that only the gaps between one pair of confronting inner side faces of the inner side faces of the mold and the glass shaping preform (for example, the gaps between the inner side faces of the mold forming side faces in the transverse direction of the optical fiber guide block, and the glass shaping preform) are made uniform, followed by a press-molding. When the glass shaping preform is biased in the mold, it is preferable to dispose the glass shaping preform so that the gap at the side where filling of the glass is to be retarded (the gap between the glass shaping preform and an inner side face of the mold) be 1.1 to 2.0 times of the gap when the glass shaping preform is uniformly disposed (the corresponding gap when the glass shaping preform is disposed in the mold so that the gaps between the glass shaping preform and inner side faces of the mold become uniform).

Filling of the glass into the corner of the mold during press-molding can be also retarded by using a glass shaping preform whose edge(s) assume a curve or is/are subjected to a chamfering, thereby filling up of the glass can be controlled so that the glass is not filled into the corner. Consequently, it is made possible to obtain a molded article having at least one edge formed of a free surface as well as effectively preventing burrs at the corner(s) of the mold from being generated.

In using a glass shaping preform whose edge(s) assume curved face(s) or is/are chamfered, all the edges of the glass shaping preform may assume curved faces or may be chamfered. Or an appropriate volume allotment is provide in the glass shaping preform, i.e., selected edge(s) of the glass shaping preform assume curved face(s) or is/are subjected to chamfering. Otherwise, a glass-shaping preform may be used, in which specific edge(s) assume curved face(s) or is/are subjected to chamfering and a volume allotment is provided such that a volume reduction by allowing the specific edge(s) to assume curved face(s) or to be subjected to chamfering become larger than the volume reduction by allowing other edge(s) to assume curved face(s) or to be subjected to chamfering (including the cases where "other edge(s)" described above do not assume curved face(s) or is/are not subjected to chamfering).

The volume of the glass shaping preform to be used in respective molding in mass-production of molded articles is not always constant but a slight variation of the volume is inevitable. However, when a molded article having at least one edge formed of a free surface is molded by prohibiting the corner of the mold from being completely filled with a glass, the volume variation of each glass shaping preform can be absorbed depending on the degree of filling of the glass into the corner of the mold. Consequently, variation of the dimensional and form accuracies is possibly suppressed small along with preventing molding burrs from being generated. Generation of cracks at the edge(s) formed of free surface(s) can be also effectively prevented besides eliminating the need for providing a margin at the corner(s) of the attachment jig to be used in the alignment for the optical interconnection or at the polishing of the side face to be become optical end face, since at least one edge of the molded article is formed of a free surface.

It becomes difficult, however, to substantially uniformly spread the glass into the mold during press-molding when the thickness of the glass shaping preform exceeds 1.4 times of the maximum thickness of the molded article as a result of increased deformation of the glass shaping preform during press-molding, making the local molding burrs to be liable to generate. When the thickness of the glass shaping preform is less than 1.1 times of the maximum thickness of the molded article, on the other hand, filling of the glass into the optical fiber fixing engagement portion(s) and pedestal (s) becomes insufficient due to reduced deformation of the glass shaping preform along the pressurizing direction in molding the optical fiber guide block, thus deteriorating the transfer ability. Accordingly, it is preferable that the thickness of the glass shaping preform is 1.1 to 1.4 times of the maximum thickness of the molded article. The "maximum thickness of the molded article" as used in the present invention refers to the largest thickness of the molded article along the direction parallel to the pressurizing direction during press-molding. The thickness of the glass shaping preform may be possibly less than 1.1 times of the maximum thickness of the molded article in molding a holding block with a simple plate-like shape, because a thickness enough to compensate the outer diameter variation due to molding may be imparted to the glass shaping preform.

The thickness of the glass shaping preform may be substantially constant within the range described above. When the glass shaping preform has a constant width, the thickness of the preform may be changed within the range described above so that the volume of the preform is increased gradually or in stepwise from a selected side face to a side face confronting to the selected side face to provide an appropriate volume allotment in the preform. When the above described glass shaping preform in which the thickness is increased gradually or in stepwise is used, filling of the glass into a top corner, which is one of the four corners to form four edges surrounding a side face of the molded article, and the side face of the molded article corresponding to the above described selected side face of the glass shaping preform, of the mold during press-molding is more retarded than filling of the glass into other corners. Therefore, by press-molding the glass shaping preform not to completely fill the top corner of the mold with the glass, an optical fiber fixing member whose edge corresponding to the top corner of the mold is formed of a free surface can be obtained.

The larger the step height between the optical fiber fixing engagement portion(s) and pedestal(s) is, the larger will be the volume ratio of the optical fiber fixing engagement portion(s) side in the optical fiber guide block having the optical fiber fixing engagement portion(s) and pedestal(s). Accordingly, in case of obtaining an optical fiber guide block having optical fiber fixing engagement portion(s) and pedestal(s), it is preferable to select the configuration of the glass shaping preform or its disposition in the mold so as to retard filling of the glass into the side to be a rear side face of the optical fiber guide block as the step height between the optical fiber fixing engagement portion(s) and pedestal(s) in the optical fiber guide block is larger. Selection of configuration (including volume allotment) or disposition in the mold of the glass shaping preform makes it possible to keep a sufficient amount of glass enough to fill the side to form the optical fiber fixing engagement portion(s), thereby enabling to obtain an optical fiber guide block having high dimensional and form accuracies near the optical end face of the optical fiber fixing engagement portion(s).

Among the glass shaping preforms described above, those having curved edge(s) can be obtained by the method disclosed, for example, in Japanese Unexamined Patent Publication No. Hei 2-14839 comprising the steps of: using a mold having a concave part in which small opening(s) for discharging a gas such as an air or an inert gas is/are provided; receiving a falling molten glass mass with the concave part of the mold while blowing the gas out of the small opening(s) so that the molten glass mass to be molded does not make a contact with the inner face of the concave part of the mold; cooling the molten glass mass while retaining it contactless until at least a part of the surface of the molten glass mass is cooled to its softening point or less. Otherwise, the glass shaping preform can be obtained by cutting a desired shape of a block out of the glass base material followed by a cold-processing or hot-processing for being the edge(s) of the block into curved face(s). The glass shaping preform whose edge(s) is/are chamfered can be obtained, for example, by cutting a block with a desired configuration out of the glass base material followed by chamfering the edge(s) of the block.

The glass shaping preform described above preferably comprises a glass having a sag temperature of 600° C. or less for suppressing the mold release film or mold material(s) from being deteriorated during press-molding (molding). For the purpose of obtaining an optical fiber fixing member to be used for optical interconnection of an optical waveguide, formed on a substrate with a small thermal expansion coefficient such as a quartz glass or silicon, with quartz-based single mode optical fiber(s), it is preferable that the glass shaping preform described above has a mean thermal expansion coefficient at a temperature of room temperature to 400° C. of $70\times10^{-7}/°$ C. or less in order to obtain an optical fiber fixing member with a small connection loss arising from temperature changes at the optical interconnection site.

For obtaining an optical fiber fixing member enabling to adhere optical fiber fixing members with each other (an optical fiber guide block and a holding block) by an ultraviolet curing type adhesive, or to adhere an optical fiber array using the optical fiber fixing member with other optical fiber array or optical element(s) by an ultraviolet curing type adhesive, the glass shaping preform preferably comprises a glass having an ultraviolet ray transmittance at an wave length of 350 nm of 30% or more, preferably by 60% or more, at a thickness of 2 mm, or a glass being having an ultraviolet ray transmittance at an wave length of 300 nm of 60% or more at a thickness of 2 mm.

Examples of a glass having a sag temperature of 600° C. or less, a mean thermal expansion coefficient at a temperature of room temperature to 400° C. of $70\times10^{-7}/°$ C. or less and having an ultraviolet ray transmittance at an wave length of 350 nm of 30% or more at a thickness of 2 mm are those listed in the description of the optical fiber fixing member according to the present invention.

The desired molded article can be obtained by the steps comprising: disposing the foregoing glass shaping preform in a mold having a cavity of a desired shape corresponding to the configuration of the molded article; heating the glass shaping preform at a temperature for enabling molding, i.e., a temperature to make the viscosity of the glass to about $10^{8.5}$ to $10^{9.5}$ poise; and press-molding the glass under a condition being possible to obtain a molded article having at least one edge formed of a free surface.

A mold having higher dimensional and form accuracies than dimensional and form accuracies of the desired molded article is preferably used. The mold may be a dual type mold comprising upper and lower mold members or a triple type mold comprising a upper, lower and sleeve mold members. For obtaining an optical fiber fixing member with as high dimensional and form accuracies as possible, it is preferable that the mold comprises a triple type mold of an upper mold member, a lower mold member, and an integrated sleeve mold member having no movable portions. The mold may also have a stopper for fixing traveling of the movable mold member at a given position.

While the mold is so constructed as to form a clearance (gap) between the mold elements (a mold element refers to each of the upper or lower mold member when the mold comprises upper and lower mold members while the mold element refers to each of the upper, lower or sleeve mold member when the mold comprises the upper, lower and sleeve mold members) by combining each mold element, the "mold having a cavity of a desired shape" as used in the present invention refers to a mold that is able to form a sealed space except the clearance between the mold elements depending on the configuration of the desired molded article.

The material of each mold element preferably bears an xidation resistivity and a non-reactive property with the glass for enabling it to be used for molding of a glass, along with preferable properties not to cause texture change and plastic deformation in an environment of high temperature, examples of the material being silicon carbide, silicone nitride, tungsten carbide, alumina, zirconia, crystallized glass, silicon and cermet of titanium carbide and titanium nitride. Each mold element is coated with a carbon-based or platinum-alloy-based mold release film on its surface for release after forming the desired mold material into a given shape.

When an optical fiber guide block having only optical fiber fixing engagement portion(s) is produced by the method according to the present invention, a mold comprising two mold elements of upper and lower mold members may be used, or a mold comprising three mold elements of upper, lower and sleeve mold members may be used. In any case, it is preferable that the mold element (either the upper mold member or lower mold member (usually lower mold member) in the mold comprising two mold elements of upper and lower mold members; or the sleeve mold member in the mold comprising three mold elements of upper, lower and sleeve mold members) having molding faces for forming side faces of the desired optical fiber block is made of a mold material having a mean thermal expansion coefficient by $5 \times 10^{-7}/°$ C. to $70 \times 10^{-7}/°$ C. as small as the thermal expansion coefficient of the glass shaping preform at a temperature of room temperature to 400° C.

When the mean thermal expansion coefficient of the material for the mold element having molded faces for forming the side faces of the optical fiber guide block at a temperature of room temperature to 400° C. is larger than the mean thermal expansion coefficient of the glass shaping preform, or when the value is small but the difference is less than $5 \times 10^{-7}/°$ C., it becomes difficult to take the molded article out the mold element. When the difference is larger than $70 \times 10^{-7}/°$ C. although the mean thermal expansion coefficient of the mold material comprising the mold element at a temperature of room temperature to 400° C. is smaller than the mean thermal expansion coefficient of the glass shaping preform, on the other hand, the molded article after press-molding is pulled to the wall face of the mold during the cooling process via a high temperature region where deformation of the glass is possible, thereby dimensional and form accuracies of the optical fiber guide block obtained becomes poor. Accordingly, it is especially preferable that the mold material of the mold element described above has a mean thermal expansion coefficient at a temperature of room temperature to 400° C. of being by $10 \times 10^{-7}/°$ C. to $40 \times 10^{-7}/°$ C. as small as the mean thermal expansion coefficient of the glass shaping preform.

The mold to be used in producing an optical fiber guide block having optical fiber fixing engagement portion(s) and pedestal(s) by the method according to the present invention may correspond to the foregoing mold for use in producing an optical fiber guide block having merely optical fiber fixing engagement portion(s), except that a mold element having the first molding part for forming an optical fiber fixing engagement portion(s) and the second molding part for forming pedestal(s) is used for upper or lower mold member.

The mold element having the first and second molding parts can be obtained by a mechanical processing or etching of a material. However, a step should be provided between the first and second molding parts. Since it is difficult to provide the first molding part that is required to have a desired accuracy at the step and its vicinity on one member by the mechanical processing or etching. Accordingly, it is preferable to integrate the first and second molding parts in the mold element after forming the first and second molding parts separately by a mechanical processing or etching.

The first molding part preferably comprises a mold material having a mean thermal expansion coefficient at a temperature of room temperature to 400° C. of being by $5 \times 10^{-7}/°$ C. to $70 \times 10^{-7}/°$ C. as small as the mean thermal expansion coefficient of the glass shaping preform, like the other mold element. The second molding part preferably comprises, on the other hand, a mold material having a mean thermal expansion coefficient at a temperature of room temperature to 400° C. of being by $5 \times 10^{-7}/°$ C. to $70 \times 10^{-7}/°$ C. as large as the mean thermal expansion coefficient of the glass shaping preform, especially when the second molding part is provided for forming the side wall portions besides the pedestal(s).

When the mold material of the second molding part has a mean thermal expansion coefficient at a temperature of room temperature to 400° C. smaller than the mean thermal expansion coefficient of the glass shaping preform, or when the difference is less than $5 \times 10^{-7}/°$ C. although the value is larger than the mean thermal expansion coefficient of the glass shaping preform, release of the molded article from the mold becomes difficult. When the difference is larger than $70 \times 10^{-7}/°$ C. although the mean thermal expansion coefficient of the mold material comprising the second molding part at a temperature of room temperature to 400° C. is larger than the mean thermal expansion coefficient of the glass shaping preform, on the other hand, the molded article after press-molding is pulled to the wall face of the second molding part during the cooling process via a high temperature region where deformation of the glass is possible, thereby dimensional and form accuracies of the optical fiber guide block obtained becomes poor. Accordingly, the mold material of the second molding part described above with a mean thermal expansion coefficient at a temperature of room temperature to 400° C. of being by $7 \times 10^{-7}/°$ C. to $40 \times 10^{-7}/°$ C. as large as the mean thermal expansion coefficient of the glass shaping preform is especially preferable.

The mold element comprising by integrating the member in which the foregoing first molding part is formed and the member in which the foregoing second molding part is formed can be obtained by the method comprises steps of: integrating the two members above using an adhesive such as a heat resistant adhesive; integrating the two members as a fixing member such as a fixing frame; or integrating the two members above using an adhesive and a fixing frame together.

When an adhesive is used for integrating two or more of members into a mold element, the thickness of the adhesive layer is varied in a range of 10 to 50 μm due to viscosity of the adhesive to partially fluctuate the thickness of the adhesive layer, thereby finally deteriorating the accuracy of the mold element. Therefore, it is made necessary to adjust the clearance between the mold element obtained by integration and the mold element to be disposed in adjacent relation to the former mold element a little larger. Since as high a press-molding pressure as 100 kgf/cm² is desirable for obtaining as high dimensional accuracy as possible, a clearance of more than 10 μm makes the glass to easily permeate into the clearance under such high pressure condition. Accordingly, while a clearance of 10 μm or less is desirable for obtaining a molded article having as high dimensional and form accuracies as possible, it is difficult to adjust the clearance between the mold element integrated by using an adhesive and the mold element to be disposed in adjacent relation to the former mold below 10 μm.

Shrink or air bubbles are liable to be generated during curing of the adhesive. The glass so easily permeate into these shrink portion and air bubbles that the dimensional and form accuracies of the molded article obtained tend to be deteriorated. When the adhesive is overflowed, on the contrary, release of the molded article from the mold becomes difficult due to a reaction of the glass with the adhesive during press-molding because mold release film is hardly formed on the overflowed portions, besides deteriorating the dimensional or form accuracy of the molded article.

When the mold is used for a long period of time, a maintenance work of polishing of the surface of each mold element is required. Although the mold element integrated by using an adhesive is desirably divided into molding parts, it is quite difficult to peel the adhered portions without damaging the mold element.

Therefore, it is desirable to mechanically integrate each member using a fixing frame in order to produce a mold element being able to obtain a molded article with high dimensional and form accuracies and being easily repaired by integrating a plurality of members. The following procedure is preferable, for example, for integration using a fixing frame for the purpose of preventing slip of the adhering faces of the members out of position with each other. A reference face for positioning is provided at each member to be integrated. Each member is positioned by taking advantage of the reference face and the members are integrated while holding them with a fixing frame that gives little clearance between each member. It is preferable to mechanically fix the frame by the method of: (1) screw the frame to each member; (2) screw the frame to the pedestals when each member has a pedestal; and (3) mechanically press the frame indirectly with other constitution member(s).

A dimensional discrepancy by a clearance between the fixing frame and each member may occur even when a plurality of members are mechanically integrated as described above. The following two methods can be preferably applied to prevent the dimensional discrepancy: (a) The fixing frame is divided into a plurality of fixing members and each members are independently fixed so as not to generate a clearance between the members (between the members constituting the mold element) by taking advantage of each reference face; or (b) Tapered faces engaging with each other are provided on both of the reference face and fixing frame to make the clearance as small as possible. When screws are used for mechanically fixing the frame, the screws are preferably produced using a material having a thermal expansion coefficient close to the thermal expansion coefficient of each member in order to prevent the screws from being loosened due to the difference of the thermal expansion coefficient between the screw and the member to be integrated.

A mold element, having a desired accuracy and being easy to reduce the clearance between the mold element and mold element(s) to be disposed in adjacent relation the mold element to 10 μm or less, can be obtained by mechanically integrating a plurality of members by the method described above.

The mold to be used in producing the holding block by the method according to the present invention may follow the foregoing mold to be used in producing the optical fiber guide block having merely optical fiber fixing engagement portion(s).

It is preferable to use an appropriate material having a mean thermal expansion coefficient at a temperature of room temperature to 400° C. of being by $5 \times 10^{-7}$/° C. to $70 \times 10^{-7}$/° C. as large as the mean thermal expansion coefficient of the glass shaping preform, by taking release ability varying in accordance with the configuration and dimension of a concave portion into consideration, as a mold material for the mold element or molding part for forming the concave portion, even when an optical fiber guide block or a holding block is to be produced.

A thin-plate like optical fiber fixing member having at least one edge formed of a free surface can be obtained by press-molding the glass shaping preform using the mold described above by the method according to the present invention. The press-molding conditions such as a pressure of about 100 to 150 kgf/cm² and a temperature to make the viscosity of the glass to about $10^{8.5}$ to $10^{9.5}$ poise are appropriately selected depending on the required dimensional and form accuracies of the desired optical fiber fixing means, the composition of the glass shaping preform, and the heating medium and atmosphere used in press-molding.

According to the method of the present invention, the optical fiber guide block and holding block with a variety of configurations as described previously can be mass-produced with a low production cost. By press-molding a glass shaping preform by selecting its configuration (including volume allotment) and/or disposition in the mold so that at least one edge of the four edges surrounding the rear side face of the molded article is formed of a free surface, the fill-up ratio of the glass to the side face (the side face to be positioned at the optical end face after assembling into the optical fiber array using the molded article) confronting to a side face to be positioned at the rear side face of the molded article is enhanced. Consequently, dimensional and form accuracies of the optical fiber fixing engagement portion(s) in the vicinity of the optical end face can be improved when the optical fiber fixing member (a molded article) is an optical fiber guide block. It is made possible to obtain an optical fiber guide block in which dimensional and form accuracies in the vicinity of the optical end face of the optical fiber fixing engagement portion(s) are improved, along with making it possible to obtain an optical fiber guide block being able to be easily attached to a jig as will be described later, when the edges extending from a side face, of the edges surrounding the bottom face in addition to at least one edge surrounding the rear side face of the molded article, to be positioned at the optical end face after assembling the optical fiber array using the molded article, to the rear side face are press-molded to be "edges formed of free surfaces"

When the edge(s), of the edges surrounding the rear side face of the optical fiber fixing member (an optical fiber block and/or holding block), to be positioned at the optical fiber side or at the coated optical fiber side during use is/are "edge(s) formed of free surface(s)", stress can be prevented from being concentrated on the optical fiber or coating portion of the coated optical fiber at the periphery of the rear side face.

When the "edge(s) formed of free surface(s)" is/are positioned at a bottom face (the bottom face during the use) and/or side face(s) in the optical fiber guide block, or top face (the top face during the use) and/or side face(s) in the holding block, the following effects of (1) to (3) can be obtained:

(1) In fixing the optical fiber array being composed of the foregoing optical fiber guide block or holding block described above, or the foregoing optical fiber guide block and/or holding block with a jig, the jig is hardly damaged since it is smoothly supported.

(2) Crack at the edges is hardly generated, thereby reducing occurrence of micro-dusts.

(3) Attachment accuracy to a polishing jig, fiber arranging and fixing jig or alignment jig is improved since face-to-face fitting of the two crossing faces (side faces with each other or side face and bottom face) is secured.

When at least one edge, of the edges surrounding the side faces of the optical fiber fixing member (an optical fiber guide block and/or holding block), surrounding the side face to be positioned at the optical end face after assembling the optical fiber fixing member into an optical fiber array is "an edge formed of a free surface", crack in the edge is hardly generated in the polishing step for obtaining an optical fiber array whose optical end face is inclined to the plane perpendicular to the optical axis of the optical fiber, especially in the pre-polishing step.

Figure 24:
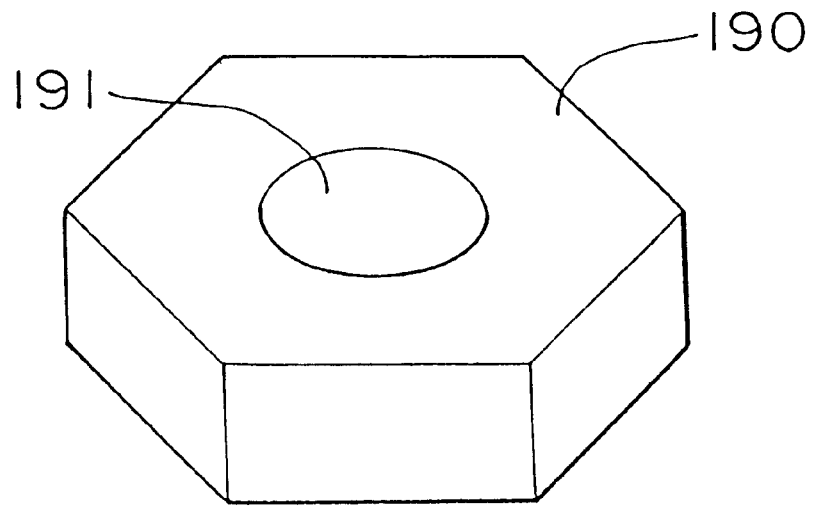
FIG. 24 is a perspective view showing one example of a polygon mirror capable of producing by applying the method according to the present invention.

The method according to the present invention can be also applied in the production of optical elements having peculiar configurations such as a polygon mirror and rectangular prism. The polygon mirror is a rotating polygonal mirror for use in rotary scanning of the parallel luminous flux laser light on a photoreceptor in the gas laser type laser beam printer, the polygon mirror 190 assuming a polygonal prism having a penetrating hole 191 at a position corresponding to its rotation axis as shown in FIG. 24 (though a hexagonal prism like polygon mirror is shown in FIG. 24, polygonal prism like polygon mirror other than the hexagonal prism like may be accepted.). Each side ace of this polygon mirror is required to have an accuracy of optical grade. The rectangular prism is used, on the other hand, for polarization of beam, inversion or rotation of images or spectrophotometry of white light, wherein an angular accuracy is required with respect to the angle between two faces having an optical profile irregularity, for example the angle $\theta_2$ between the top face 196 and inclined face 197 in the rectangular prism 195.

In molding the polygon mirror by taking advantage of the method according to the present invention, a mold in which the inner surfaces viewed along the pressurizing direction in press-molding assumes a desired polygonal shape besides a convex portion for forming a penetrating hole being formed on the upper mold member is preferably used. It is preferable that the upper mold member having a convex portion comprises a material with a mean thermal expansion coefficient at a temperature of room temperature to 400° C. being by $5 \times 10^{-7}/°$ C. to $70 \times 10^{-7}/°$ C. as large as the mean thermal expansion coefficient of the glass shaping preform. It is also preferable that the mold member(s) other than the upper mold member comprise a material with a mean thermal expansion coefficient at a temperature of room temperature to 400° C. of being by $5 \times 10^{-7}/°$ C. to $70 \times 10^{-7}/°$ C. as small as the mean thermal expansion coefficient of the glass shaping preform.

It is preferable to use a glass shaping preform in hich each face to be positioned in the pressurizing direction in press-molding is a plane or an outwardly convex curved face, comprising a glass block whose edge(s) assume curved face(s) or is/are chamfered, wherein its overall dimension allows substantially uniform gaps between the glass shaping preform and the inner side faces of the mold and its thickness is 1.1 to 2.4 times of the maximum thickness of the molded article.

A polygon mirror having a high dimensional accuracy and a high profile irregularity along with being small in accuracy variance among the products can be easily mass-produced with a low production cost by press-molding the glass shaping preform after disposing it in the mold so as to form substantially uniform gaps between the inner side faces of the mold and the glass shaping preform.

It is preferable in molding a rectangular prism by applying the method according to the present invention to use a mold having an inner side faces assuming a rectangular configuration when viewed along the pressurizing direction in press-molding, wherein the mold provided with a mold element, prepared by integrating molding parts after preparing a molding part for molding a top face and a molding part for molding an inclined face independently with each other, as a molding element for forming the top face and the inclined face crossing at a given angle with the top face. The preferable mold material for each mold element has a mean thermal expansion coefficient at a temperature of room temperature to 400° C. of being by $5 \times 10^{-7}/°$ C. to $70 \times 10^{-7}/°$ C. as small as the mean thermal expansion coefficient of the glass shaping preform.

It is preferable to use a glass shaping preform in which each face to be positioned in the pressurizing direction in press-molding is a plane or an outwardly convex curved face, comprising a glass block whose edge(s) assume curved face(s) or is/are chamfered, wherein its overall dimension allows substantially uniform gaps between the glass shaping preform and the inner side faces of the mold and its thickness is 1.1 to 2.4 times of the maximum thickness of the molded article.

A rectangular prism having a high dimensional accuracy, a high profile irregularity and an angular accuracy of the angle $\theta_2$ between the top face and inclined face can be easily mass-produced with a low production cost by press-molding the glass shaping preform by disposing the glass shaping preform in the mold so as to allow substantially uniform gaps between the inner side faces of the mold and the glass shaping preform.

A variety of optical glasses with a sag temperature of 600° C. or less such as a lanthanum based glass M-LaF81 (made by HOYA Co., glass transition temperature; 498° C., sag temperature; 534° C., thermal expansion coefficient at a temperature of room temperature to 400° C.; $108 \times 10^{-7}/°$ C.) or a barium based glass M-BaCD12 (made by HOYA Co., glass transition temperature; 498° C., sag temperature; 538° C., thermal expansion coefficient at a temperature of room temperature to 400° C.; $88 \times 10^{-7}/°$ C.) can be used, in addition to the glass listed as materials for the optical fiber fixing member of the present invention, for the glass shaping preform in producing peculiar shaped optical elements such as a polygon mirror or rectangular prism by applying the method according to the present invention.

While examples of the present invention are described referring to the drawings, the present invention is by no means not limited to the examples to be disclosed hereinafter.

EXAMPLE 1

(1) Production of the Optical Fiber Guide Block

A block-like glass shaping preform, whose edges assume curved faces, with a width of 3.5 mm, a length of 10.5 mm and a thickness of 2.05 mm was obtained by hot pre-molding a glass material containing 13.3% by weight of $SiO_2$, 32.2% by weight of $B_2O_3$, 44.5% by weight of ZnO, 5.5% by weight of $Al_2O_3$ and 4.5% by weight of $LiO_2$, with an exclusive proportion of 0.1% by weight of $SnO_2$. The vertical cross section of this glass shaping preform was a rectangle except its rounded corners, its plane view configuration being also a rectangle except its rounded corners. Accordingly, each faces positioned in the pressurizing direction in press-molding of this glass shaping preform (the face in the thickness direction of the glass shaping preform) assumes a plane. The glass material had a glass transition temperature of 477° C., a sag temperature of 511° C., a thermal expansion coefficient at a temperature of room temperature to 400° C. of $66.5 \times 10^{-7}$/° C. and a transmittance of ultraviolet ray at 350 nm of 90% or more at a thickness of 2 mm.

A mold comprising a upper, lower and sleeve mold members was obtained by using tungsten carbide (the thermal expansion coefficient at a temperature of room temperature to 400° C. is $55 \times 10^{-7}$/° C.) as a mold material.

As shown in FIG. 1, the upper mold member 2 constructing the foregoing mold 1 has a first molding part 3 for forming eight strings of mutually parallel optical fiber fixing engagement portion each of which comprising a V-shaped groove, and a second molding part 4 for forming a pedestal having the same width as the width of the optical fiber guide block in the optical fiber guide block.

The first molding part 3 has the form of a square pole, and in its end portion which is to be its lower end at a time of use, there are formed eight strings of convex portion 3a of which the vertical cross section in a length direction has a rectangular form and the vertical cross section in a width direction has an isosceles triangle and which has a length of 5 mm, a height of 170 µm and a base portion width of 250 µm, which convex portions corresponds to the form of the optical fiber fixing engagement portions and are arranged in parallel with one another at a pitch of 250±0.3 µm. Further, that end portion of the first molding part 3 which is to be an upper end at a time of use, excluding a face side which is to contact the second molding part 4, has a flange portion 3b which is to be rested on the top face of the sleeve mold member 5 at a time of use.

On the other hand, the second molding part 4 also has a form of a square pole, while its face which is to be a lower face at a time of use is formed of a plane surface. The lower face protrudes downwardly (downward at a time of use) by 250 µm from that face of the first molding part 3 which is to be a lower face at a time of use (surface excluding the 8 convex portions 3a). There is therefor a step between the first molding part 3 and the second molding part 4. Further, that portion of the second molding part 4 which was to be an upper end at a time of use, excluding a face side which is to contact the first molding part 3, has a flange portion 4a which is to be rested on the top face of the sleeve mold member 5 at a time of use.

The above first molding part 3 and the above second molding part 4 are formed of separate members, and these members are mechanically integrated with a fixing frame 6. The fixing frame 6 is fixed to each member with screws which is not shown and which is made of tungsten carbide (mean thermal expansion coefficient at a temperature of room temperature to 400° C. is $55 \times 10^{-7}$/° C.). The clearance between the first molding part 3 and the second molding part 4 is 4 µm.

The sleeve mold member 5 is for forming side faces of an intended optical fiber guide block with its inner side faces, and is formed of a cylindrical body of which the horizontal cross section has the form of a rectangular frame. Inside its upper end, there is formed a fixing frame engage means 5a which is to engage with the above fixing frame 6. The sleeve mold member 5 has internal dimensions of 5×12 mm when plane viewed. When the press-molding is carried out, the above upper mold member 2 is inserted as deep as predetermined from a portion which is to be above the sleeve mold member 5 at a time of use, i.e., until the flange portions 3b and 4a of the upper mold member 2 are rested on the top face of the sleeve mold member 5. The flange portions 3b and 4a of the upper mold member 2 work as stoppers at a press-molding time.

A lower mold member 7 has a square-pole-shaped molding part 7a for forming the bottom face of an intended optical fiber guide block. That face of the molding part 7A which is to be an top face at a time of use is formed of a plane surface. In that portion of the molding part 7a which is to be a lower end portion at a time of use, there is formed a flange portion 7b for stopping that face of the sleeve mold member 5 which is to be a lower face at a time of use. When the press-molding is carried out, the lower mold member 7 is fixed, and the sleeve mold member 5 is placed on the lower mold member 7 such that the lower face of the sleeve mold member 5 is stopped with the flange portion 7b. As a result, the top face of the molding part 7a is positioned in an internal space of the sleeve mold member 5. A glass shaping preform 8 is placed on the top face of the molding part 7a.

A platinum-alloy-based mold release film 9 having a thickness of 500 angstroms is formed, by a sputtering method, on each of the lower face of the above first molding part 1 and side faces from said lower face to the lower face of the flange portion 3b, the lower face of the second molding part 4 and side faces from said lower face to the lower face of the flange portion 4a, inner side faces of the sleeve mold member 5 (including the faces of the fixing frame engage means 5a), and the top face of the molding part 7a and side faces from said top face to the flange portion 7b. The dimensional accuracy of the above eight convex portions 3a having the mold release film on surface (dimensional accuracy on pitch and height) was within ±0.3 µm, and all of the lower face of the first molding part 3 excluding the eight convex portions 3a, the lower face of the second molding part 4, inner side faces of the sleeve mold member 5 and the top face of the molding part 7a had a flatness of within 1.0 µm.

The above mold 1 having the upper mold member 2, the sleeve mold member 5 and the lower mold member 7, each mold members having the mold release film 9, is manufactured so as to attain the following. The clearance between the upper mold member 2 and the sleeve mold member 5 and the clearance between the sleeve mold member 5 and the lower mold member 7 are 6 µm, respectively, and, of the distance between the upper mold member 2 and the lower mold member 7, the distance between the lower face (plane surface excluding the eight convex portions 3a) of the first molding part 3 and the top face of the molding part 7a is 1.5 mm and the distance between the lower face of the second molding part 4 and the top face of the molding part 7a is 1.25 mm.

The above mold 1 and the above glass shaping preform 8 were used, and an intended optical fiber guide block was obtained by carrying out the press-molding.

First, the lower mold member 7 and the sleeve mold member 5 were engaged with each other such that the lower face of the sleeve mold member 5 was stopped with the flange portion 7b of the lower mold member 7, and then glass shaping preform 8 was placed on the top face of the molding part 7a of the lower mold member 7 so as to substantially uniformly form gaps with the inner side faces of the sleeve mold member 5. Then, the upper mold member 2 was held above the sleeve mold member 5. FIG. 1(a) illustratively shows a vertical cross sectional view of the mold 1 and the glass shaping preform 8 in a width direction at this stage, and FIG. 1(c) illustratively shows a vertical cross sectional view of the mold 1 and the glass shaping preform 8 in a length direction at this stage.

Then, the glass shaping preform 8 placed on the top face of the lower mold member 7 as described above was heated together with the mold 1 so as to have a temperature of 560° C. (viscosity of glass at this stage: $10^9$ poise). In this state, the upper mold member 2 was inserted in the sleeve mold member 5 at a shaping pressure of 150 kgf/cm² until the flange portions 3b and 4a of the upper mold member 2 were rested on the top face of the sleeve mold member 5, and the pressurization was continued for 120 seconds. FIG. 1(b) illustratively shows a vertical cross sectional view of the mold 1 and a molded article 10 in a width direction at this stage, and FIG. 1(d) illustratively shows a vertical cross sectional view of the mold 1 and a molded article 10 in a length direction at this stage.

Then, the molded article 10 was cooled to room temperature and then taken out of the mold 1. The obtained molded article 10 is an optical fiber guide block (to be referred to as "optical fiber guide block 10" hereinafter) having, on one surface, mutually parallel 8 optical fiber fixing engagement portions 11 formed of V-grooves having a length of 5 mm, a depth of 170 μm and a width of a upper end of 250 μm each and a pedestal 12 formed in a position one step lower than the upper end face of the optical fiber fixing engagement portions 11 as shown in FIG. 2. The optical fiber guide block 10 has a width of 5 mm, a length of 12 mm and a maximum thickness of 1.5 mm, and the pedestal 12 has a width of 5 mm, which is the same as the width of the optical fiber guide block. of edges of the optical fiber guide block 10, those edges corresponding to a clearance portion between the upper mold member 2 and the sleeve mold member 5, a clearance portion between the lower mold member 7 and the sleeve mold member 5 and a clearance portion between the first molding part 3 and the second molding part 4 of the upper mold member 2 are formed of free surfaces, and the form of the optical fiber guide block 10 is nearly rectangular when it is plane viewed.

(2) Measurement and Evaluation of Accuracy

Figure 3:
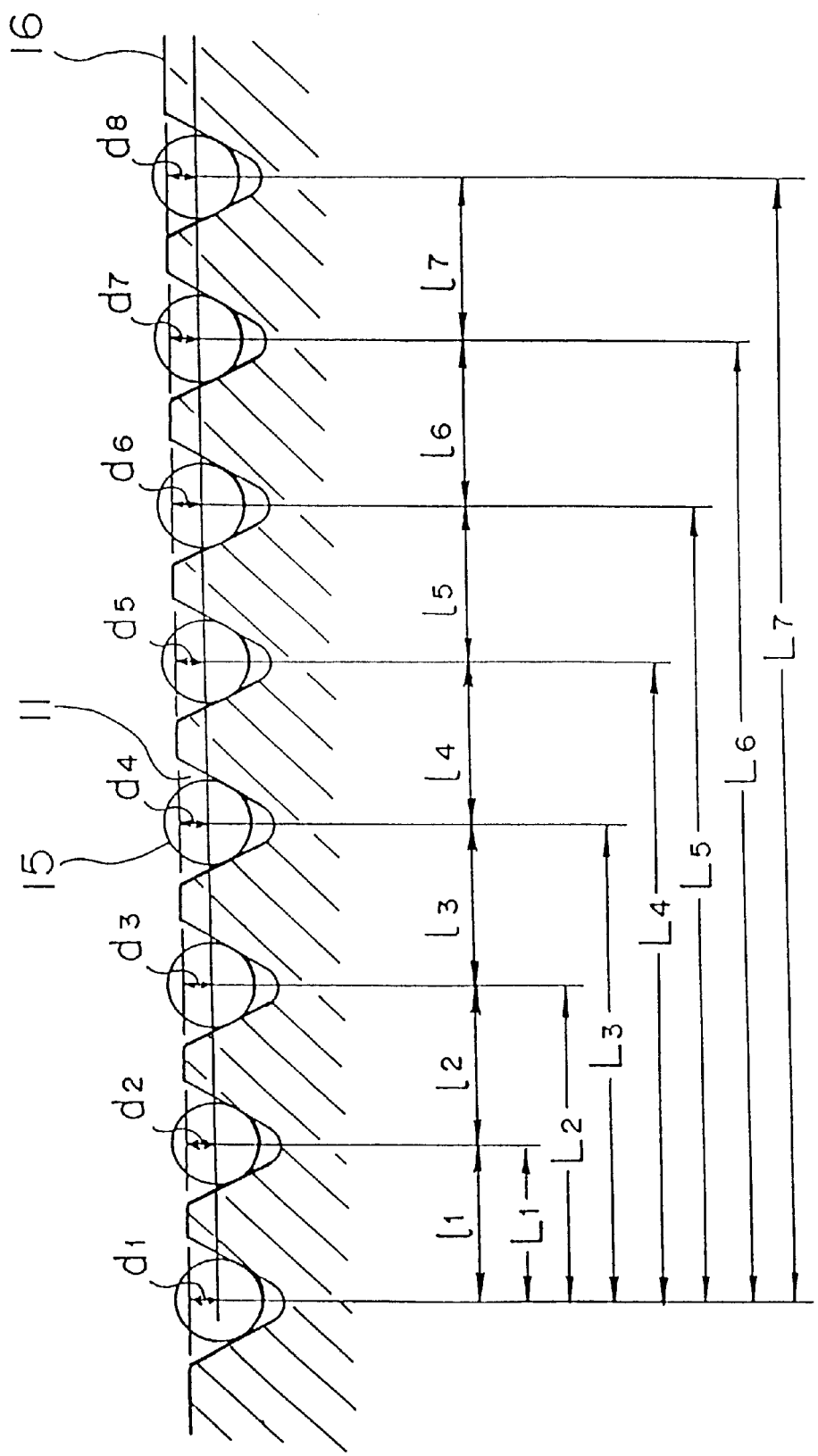
FIG. 3 is a drawing for describing the measuring points of the dimensional accuracy of the optical fiber guide block according to the present invention.

The dimensional accuracy with respect to the optical fiber fixing engagement portions 11 formed on the optical fiber guide block 10 above was measured as follows:

By using a needle touch type contour measuring apparatus (Contour Record 2600 C made by Tokyo Seimitsu Co.) provided with a touch needle with a circular diameter of the tip of 25 μm, the touch needle of the contour measuring apparatus was scanned along the direction perpendicular to the longitudinal direction of the optical fiber fixing engagement portions 11 to obtain the contour coordinate of the optical fiber fixing engagement portions and its vicinity, followed by drawing the contour on the screen of the display. Then, as shown in FIG. 3, circles 15 with a diameter of 125 μm corresponding to the outer diameter of the quartz-based single mode optical fiber were virtually inserted one by one into the optical fiber fixing engagement portions 11 on the screen, thereby obtaining the coordinates of the centers of the circles 15 when the circles 15 had made a contact with the two inclined faces (inner faces) of the optical fiber fixing engagement portions 11.

Then, the distances between the centers of the mutually adjoining two circles 15 (single pitch) $l_1$ to $l_7$ and their dimensional accuracies (single pitch accuracy), the distances $L_1$ to $L_7$ between the center of a circle virtually inserted into an optical fiber fixing engagement portion positioned at the outermost left side in the transverse direction of the optical fiber guide block 10 and the centers of other circles 15 (accumulated pitch) and their dimensional accuracies (accumulated pitch accuracy), and the vertical distances $d_1$ to $d_8$ between the center of each circle 15 and the plane including the top face 16 of the edge line positioned at the right side in the transverse direction of the optical fiber fixing engagement portion 11 and their dimensional accuracy (depth accuracy) were determined by taking the coordinate of the center of each circle 15 as a reference.

Further, with regard to eight convex portions 8a provided in the first molding part 3 of the upper mold member 2 for forming the optical fiber fixing engagement portions 11, there were determined their single pitches $l_1$ to $l_7$ and their dimensional accuracies, accumulated pitch $L_1$ to $L_7$ and their dimensional accuracies, and the heights (depths) corresponding to the vertical distances $d_1$ to $d_8$ above and their dimensional accuracies by using the same method as described above.

The designed values of the foregoing single pitch $l_1$ to $l_7$ is 250 μm, and the depth (the height of the convex portion 3a) $d_1$ to $d_8$ is 52.8 μm, with respect to the optical fiber fixing engagement portions 11 and convex portions 3a formed in the first molding part 3.

The measured results are listed in Table 1.

TABLE 1

|  |  | Dimensional accuracy of the mold (μm) | Molded article | |
|---|---|---|---|---|
|  |  |  | Measured value (μm) | Dimensional accuracy (μm) |
| Single Pitch | $l_1$ | −0.1 | 249.8 | −0.2 |
|  | $l_2$ | −0.1 | 250.2 | +0.2 |
|  | $l_3$ | +0.1 | 250.2 | +0.2 |
|  | $l_4$ | +0.2 | 249.9 | −0.1 |
|  | $l_5$ | ±0 | 250.1 | +0.1 |
|  | $l_6$ | −0.3 | 250.0 | ±0 |
|  | $l_7$ | +0.1 | 249.9 | −0.1 |
| Accumulated pitch | $L_1$ | −0.1 | 249.8 | −0.2 |
|  | $L_2$ | −0.2 | 500.0 | ±0 |
|  | $L_3$ | −0.1 | 750.2 | +0.2 |
|  | $L_4$ | +0.1 | 1000.1 | +0.1 |
|  | $L_5$ | +0.1 | 1250.2 | +0.2 |
|  | $L_6$ | −0.2 | 1500.2 | +0.2 |
|  | $L_7$ | −0.1 | 1750.1 | +0.1 |
| Depth (Height)* | $d_1$ | +0.1 | 52.7 | −0.1 |
|  | $d_2$ | ±0 | 52.9 | +0.1 |
|  | $d_3$ | +0.2 | 52.6 | −0.2 |
|  | $d_4$ | +0.1 | 52.5 | −0.3 |
|  | $d_5$ | −0.1 | 52.8 | ±0 |
|  | $d_6$ | −0.2 | 52.9 | +0.1 |
|  | $d_7$ | −0.1 | 53.1 | +0.3 |
|  | $d_8$ | −0.2 | 52.9 | +0.1 |

*:The mold is represented by "height" while the molded article is represented by "depth".

As shown in Table 1, the single pitch accuracy, accumulated pitch accuracy and depth accuracy are all within ±0.3 μm with respect to the optical fiber guide block 10, indicating that the optical fiber guide block 10 with high dimensional accuracy was obtained. It was confirmed that molding was carried out in a high transfer accuracy since the dimensional accuracy of the single pitch $l_1$ to $l_7$, dimensional accuracy of the accumulated pitch $L_1$ to $L_7$ and the dimensional accuracy of the height $d_1$ to $d_8$ were within ±0.3 μm with respect to the eight convex portions 3a formed in the first molding part 3 of the upper mold member 2. Corrections against the object values were applied to the single pitch, accumulated pitch and depth of the mold. The correction value was determined by taking the difference between the thermal expansion coefficients of the mold and the thermal expansion coefficients of glass materials for the molded article.

In the same manner as in the above dimensional accuracy determination, the locational accuracy of the center of vertical cross section of each of optical fibers when the optical fibers were fit in the optical fiber fixing engagement portions 11 was determined by using the bottom face or a side face (side face on the right or left side viewed from the side face which was to be positioned at the optical end face after assembled into an optical fiber array) of the above optical fiber guide block 10 as a reference. As a result, when the bottom surface of the optical fiber guide block 10 was used as a reference, the locational accuracy I of the center of any optical fiber was within 2 μm, and when the side face thereof was used as a reference, the locational accuracy I of the center of any optical fiber was within 3 μm. From these results, the optical fiber guide block 10 was confirmed to have a high form accuracy.

The optical fiber guide block 10 having the above dimensional accuracy and the above form accuracy is suitable as a constitution member for an optical fiber array together with a tape fiber (thickness; about 400 μm) in which eight strings of quartz-based single mode optical fiber having an outer diameter of 125 μm each are arranged in parallel relation with each other with a pitch of 250 μm, with an alignment accuracy of ±1 μm.

(3) Continuous Molding

Press-molding was carried out more than 500 times under the same manner as that of (1) described above using the mold produced in (1) described above.

After the press-molding, any abnormalities were observed in the mold. Neither occurrence of burrs nor decrease in the dimensional and form accuracies was also observed. When the overall dimensions around the optical fiber fixing engagement portions of each optical fiber guide block was measured with an electric micrometer (Degimatic Micrometer made by Mitsutoyo Co.), variance of the overall dimensions among the molded articles was within ±0.8 μm.

Comparative Example 1

An optical fiber guide block was obtained by the same method as used in Example 1, except that a marble-shaped glass shaping preform with a longitudinal diameter of 6 mm, transverse diameter of 4 mm and maximum thickness of 4 mm was used. The dimensional accuracy of the optical fiber guide block measured by the same method as used in Example 1(2) was more than ±1 μm with respect to the single pitch accuracy, accumulated pitch accuracy and depth accuracy.

Molding burrs were frequently generated at the edges corresponding to the clearance portions between the upper and sleeve mold members, between the lower and sleeve mold members and between the first molding part and second molding part in the upper mold member. The variance of the overall dimensions around the optical fiber fixing engagement portions among the molded articles was more than ±1.5 μm Comparative Example 2

An optical fiber guide block was obtained by the same method as used in Example 1(1), except that the side-free type structure mold shown in FIG. 4 was used as a mold.

The mold 20 of the side-free type structure mold shown in FIG. 4 is constituted by two mold elements of a upper mold member 21 and lower mold member 25 without being provided with a sleeve mold member. The mold material for the upper mold member 21 and lower mold member 25 is identical to the mold material used in Example 1(1).

The upper mold member 21 has a first molding part 22 with eight convex portions 22a for forming mutually parallel eight strings of optical fiber fixing engagement portion comprising V-shaped grooves, and a second molding part 23 for forming a pedestal having the same width as the width of the optical fiber guide block on the guide block.

The configuration, dimension and structure of the upper mold member 21 is identical to that of the upper mold member 2 used in Example 1(1), except the three points that its width is wider than the width of the upper mold member 2 used in Example 1(1), its length is longer than the length of the upper mold member 2 used in Example 1(1), and both of the flange 3b formed in the first molding part 3 and the flange 4a formed in the second molding part 4 of the upper mold member 2 used in Example 1(1) are not formed. The first molding part 22 and the second molding part 23 were different members with each other as in the upper mold member 2 used in Example 1(1), each member being mechanically integrated with the fixing frame 24. The fixing frame is fixed to each member with screws made of tungsten carbide not shown in the figure. The clearance between the first molding part 22 and second molding part 23 is 4 μm.

The lower mold member 25 assumes a square pole with a wider width than the width of the molding part 7a of the lower mold member 7 used in Example 1(1) and a longer length than the length of the molding part 7a of the lower mold member 7 used in Example 1(1).

A platinum-alloy-based mold release film 26 having a thickness of 500 angstroms is formed, by a sputtering method, on each of the lower face of the above first molding part 22, the lower face of the second molding part 23 and the top face of the lower mold member 25. The dimensional accuracy (dimensional accuracy of the pitch and height) of foregoing eight convex portions 22a having the mold release film 26, flatness of the portion except eight convex portions 22a of the lower face of the first molding part 22, flatness of the lower face of the second molding part 23 and flatness of the top face of the lower mold member 25 are substantially identical to that of the mold 1 used in Example 1(1). The distance between the lower face (the plane except the eight convex portions 22a) of the first molding part 22 and the top face of the lower mold member 25 is controlled to be 1.5 mm while the distance between the lower face of the second molding part 23 and the top face of the lower mold member 25 is controlled to be 1.25 mm.

Figure 4A:
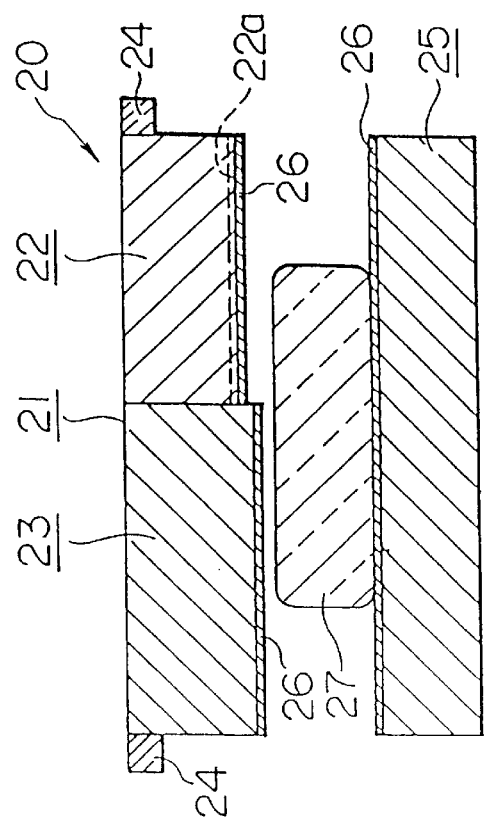
FIG. 4a–4d are illustrative cross-sections of the mold of the side-free type structure used in Comparative Example 2.
Figure 4C:
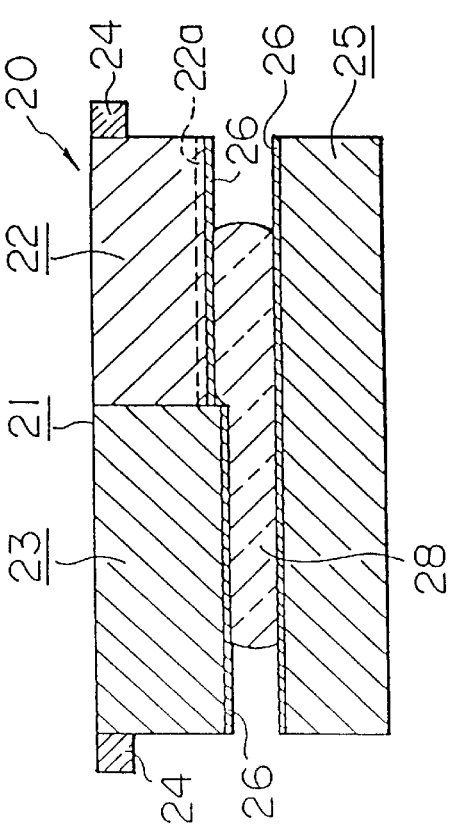
Figure 4B:
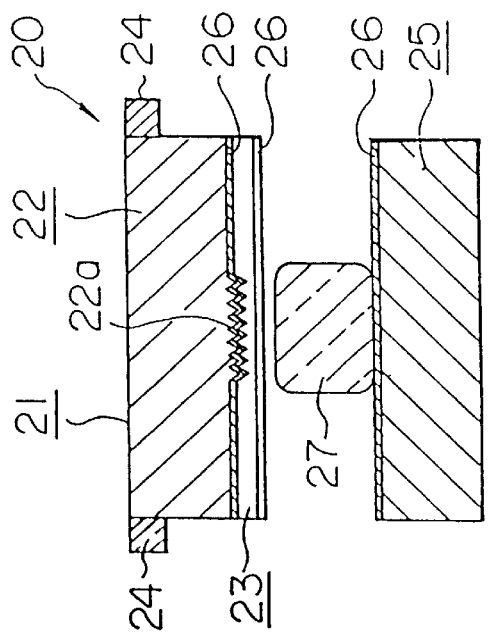
Figure 4D:
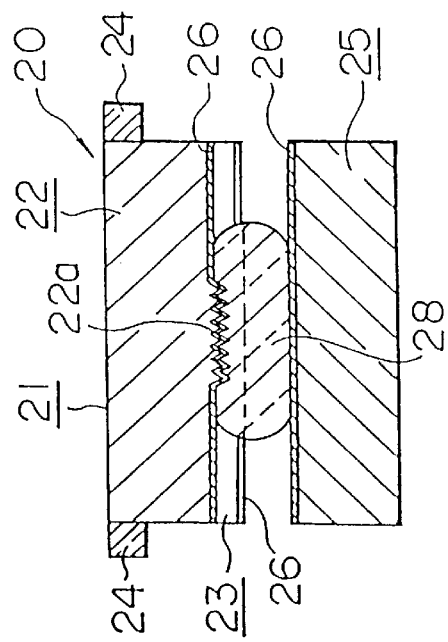

FIG. 4(a) is an illustrative drawing showing the vertical cross section along the transverse direction of the mold 20 and glass shaping preform 27, while FIG. 4(b) is an illustrative drawing showing the vertical cross section along the longitudinal direction of the mold 20 and glass shaping preform 27 when the glass shaping preform 27 is placed on the top face of the lower mold member 25 prior to press-molding, respectively. FIG. 4(c) is an illustrative drawing showing the vertical cross section along the transverse direction of the mold 20 and molded article 28 while FIG. 4(d) is an illustrative drawing showing the vertical cross section along the longitudinal direction of the mold 20 and molded article 28 during the press-molding, respectively.

Although the side faces of the optical fiber guide block (molded article 28) obtained by using the mold 20 is an outwardly convex curved face formed by making no contact with the inner wall of the mold, the edges between the side faces and bottom face or top face are not formed of "free surfaces" according to the present invention.

The dimensional accuracy of the optical fiber guide block measured by the same method as used in Example 1(2) was within ±2 μm. Variance of the maximum thickness among the optical fiber guide blocks those of which were produce by a continuous molding carried out under the same manner as Example 1(3) by using the mold 20 showed a large value of 250 μm.

EXAMPLE 2 to EXAMPLE 8 (Production of optical fiber guide block)

A glass shaping preform having the same configuration as the glass shaping preform used in Example 1(1) was formed in each Examples 2 to 8 using a glass with respective compositions shown in Table 2 to obtain an optical fiber guide block by the same method as used in Example 1(1) except the molding temperature listed in Table 2 was adopted.

The dimensional and form accuracies of each optical fiber guide block obtained in each example were measured by the same method as used in Example 1(2), obtained the same results in Example 1(2).

The same results as in Example 1(3) were also obtained by continuous molding carried out under the same manner as in Example 1(3), in each example. Variance of the overall dimensions around the optical fiber fixing engagement portions among the molded articles was within ±0.9 μm in all examples.

EXAMPLE 9
(1) Production of the Optical Fiber Guide Block

A glass shaping preform comprising the glass with the same composition as the glass material used in Example 1(1) with a dimension of 6.5×11.5×2.8 mm was produced by the same method as used in Example 1(1).

A mold having the same structure as the mold used in Example 1(1) was produced, except that the size of the upper and lower mold members was changed so that the width and length of the optical fiber guide block to be obtained are 8 mm and 13 mm, respectively, and the length of the optical fiber fixing engagement portions to be formed is 4 mm, a cermet (mean thermal expansion coefficient at a temperature of room temperature to 400° C. is 88×10$^{-7}$/° C. ) made of titanium carbide and titanium nitride was used for the mold material of the second molding part constituting the upper mold member, a carbon-based mold release film with a film thickness of 500 Å formed by an ion plating method was used for the mold release film to be provided in the second molding part, and the configuration of the second molding part was made to be the configuration shown in FIG. 5.

As shown in FIG. 5, the second molding part 32 constituting the upper mold member 31 of the mold 30 to be used in Example 9 has a convex portion 32a with a width of 2.3 mm, a height of 250 μm and a length of 7 mm, whose vertical cross section and horizontal cross section assuming a rectangle, as a convex portion for forming a pedestal. This convex portion 32a is formed so as to be positioned at the center of the lower face in use of the second molding part 32, its longitudinal direction being identical to the longitudinal direction of the second molding part 32. The lower face in use of the convex portion 32a is downwardly (downward in use) protruded by 250 μm below the lower face (the plane except eight convex portions 33a) of the first molding part 33 in use. The portion except the concave portion 32a in the

TABLE 2

|  |  | Example 2 | Example 3 | Example 4 | Example 5 | Example 6 | Example 7 | Example 8 |
| --- | --- | --- | --- | --- | --- | --- | --- | --- |
| Composition of glass *1 | SiO$_2$ | 4.0 | 4.0 | 23.3 | 4.0 | 4.0 | 4.8 | 13.3 |
|  | GeO$_2$ | — | 5.0 | — | — | — | — | — |
|  | B$_2$O$_3$ | 27.2 | 32.2 | 22.2 | 32.2 | 37.2 | 32.2 | 32.2 |
|  | ZnO | 54.5 | 40.5 | 42.5 | 40.5 | 40.2 | 40.7 | 44.0 |
|  | MgO | — | — | — | — | — | — | 1.0 |
|  | CaO | — | — | — | — | — | — | 1.5 |
|  | SrO | — | — | — | — | — | — | — |
|  | BaO | — | — | — | — | — | — | — |
|  | PbO | — | — | — | — | — | — | — |
|  | (A) *2 | 54.5 | 40.5 | 42.5 | 40.5 | 40.2 | 40.7 | 46.5 |
|  | Al$_2$O$_3$ | 2.5 | 1.0 | 7.5 | 1.0 | 2.5 | 9.0 | 5.5 |
|  | (B) *3 | 88.2 | 82.7 | 95.5 | 77.7 | 82.4 | 86.7 | 97.5 |
|  | Li$_2$O | 2.5 | 2.5 | 4.5 | 2.5 | — | 2.5 | 2.5 |
|  | La$_2$O$_3$ | 9.3 | 13.3 | — | 13.3 | 15.3 | 4.3 | — |
|  | Y$_2$O$_3$ | — | — | — | 5.0 | — | — | — |
|  | TiO$_2$ | — | — | — | — | 0.4 | — | — |
|  | ZrO$_2$ | — | 1.5 | — | 1.5 | 1.5 | 1.5 | — |
|  | Nb$_2$O$_5$ | — | — | — | — | 0.4 | — | — |
|  | Ta$_2$O$_5$ | — | — | — | — | — | 5.0 | — |
|  | Sb$_2$O$_3$ *4 | — | — | 0.5 | — | — | — | — |
| Characteristic values | Transition temperature | 465° C. | 500° C. | 470° C. | 500° C. | 530° C. | 510° C. | 495° C. |
|  | Sag temperature | 495° C. | 540° C. | 500° C. | 530° C. | 555° C. | 540° C. | 520° C. |
|  | Mean thermal expansion coefficient *5 | 64 | 63 | 62 | 66 | 67 | 64 | 66 |
|  | Ultraviolet ray transmittance *6 | 81% | 85% | 91% | 84% | 80% | 81% | 83% |
|  | Molding temperature | 545° C. | 593° C. | 553° C. | 584° C. | 595° C. | 592° C. | 573° C. |

*1: Numerical value in each component is expressed in % by weight
*2: Total contents of ZnO, MgO, CaO, SrO, BaO and PbO
*3: Total contents of SiO$_2$, GeO$_2$, B$_2$O$_3$, RO (R═Zn, Mg, Ca, Sr, Ba, Pb) and Al$_2$O$_3$
*4: The amount of addition in exclusive proportion
*5: Mean thermal expansion coefficient at a temperature of room temperature to 400° C. Unit is × 10$^{-7}$/° C.
*6: Transmittance of ultraviolet ray with an wave length of 350 nm at a sample thickness of 2 mm lower face of the second molding part 32 comprises a plane, the plane being at an equal height with the lower face (the plane except eight convex portions 33a) of the first molding part 33 in use. A flange 32b to be received with the top face of the sleeve mold member 34 in use is formed on the upper end of the second molding part 32 in use except the side face to contact with the first molding part 33.

A carbon-based mold release film 35 with a thickness of 500 Å is formed, as described previously, on the lower face (including the lower and side faces of the convex portion 32a) of the second molding part 32 and on the side faces from the foregoing lower face to the lower face of the flange 32b by the ion plating method. The dimensional accuracy of the foregoing convex portion 32a on which the mold release film 35 is formed was within ±0.3 μm while the flatness of the lower face of the second molding part 32 except the convex portion 32a was within 1.0 μm. The second molding portion 32 is produced so that the distance between the lower face of the convex portion 32a and top face of the molding part 36a of the lower mold member 36 is 1.75 mm, and the distance between the lower face of the second molding part 32 except the convex portion 32a and the top face of the molding part 36a of the lower mold member 36 is 2.0 mm.

FIG. 5(a) is an illustrative drawing showing the vertical cross section along the transverse direction of the mold 30 and glass shaping preform 37, and FIG. 5(c) is an illustrative drawing showing the cross section along the longitudinal direction of the mold 30 and glass shaping preform 37 when the glass shaping preform 37 is placed in the mold 30 as in Example 1(1) prior to press-molding, respectively. FIG. 5(b) is an illustrative drawing showing the vertical cross section along the transverse direction of the mold 30 and molded article 38 while FIG. 5(d) is an illustrative drawing showing the vertical cross section along the longitudinal direction of the mold 30 and molded article 38 during the press-molding, respectively.

The reference numeral 33b in FIG. 5 indicates a flange to be received by the top face of the sleeve mold member 34 in use, the flange 33b being formed on the upper end of the first molding member 33 in use except the side face to contact with the second molding part 32. The reference numeral 39 shows a fixing frame mechanically integrating the first molding part 33 and second molding part 32 constituting the upper mold member 31, the material and specification for fixing of the fixing frame 39 being identical with that of the fixing frame 6 in Example 1(1). The reference numeral 34a denotes a fixing frame engage means formed inside of the upper end of the sleeve mold member 34, wherein the fixing frame engage means 34a engages to the fixing frame 39 described above during the press-molding. The reference numeral 36b corresponds to a flange formed on the lower mold member 36 to receive the lower face of the sleeve mold member 34 in use. The reference numeral 40 shows a platinum-alloy-based mold release film with a thickness of 500 Å formed on the lower face of the first molding part 33, and on the side faces from the foregoing lower face to the lower face of the flange 33b, on the inner side faces of the sleeve mold member 34 (including the surface of the fixing frame engage means 34a) and on the side faces from the foregoing top face of molding part 36a to the flange 36b by a sputtering method.

A molded article (optical fiber guide block) 38 was obtained by the same method as used in Example 1(1), except that the mold 30 above and the glass shaping preform described previously were used.

Figure 6:
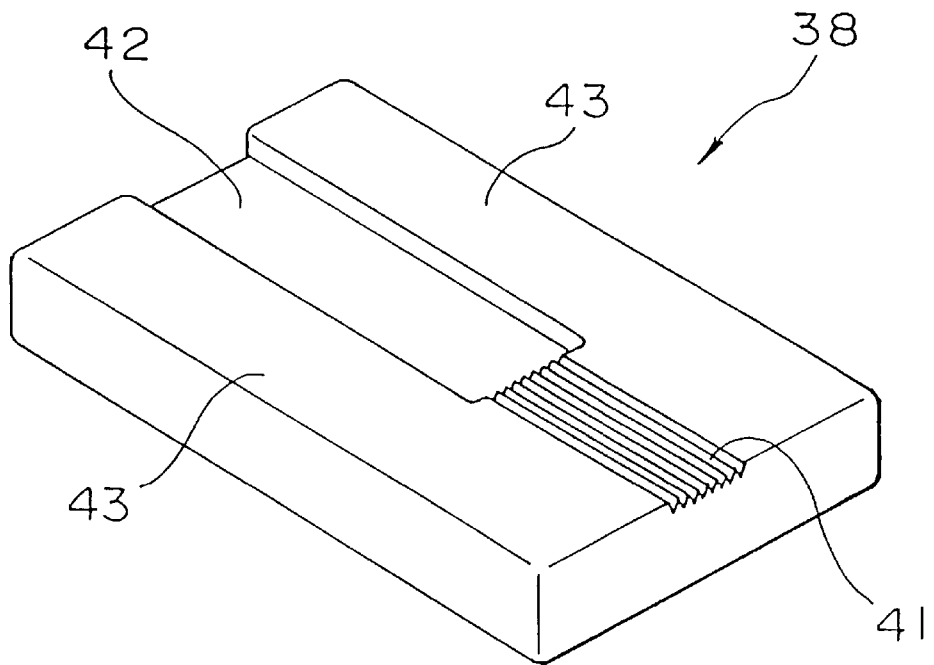
FIG. 6 is an illustrative perspective view of the optical fiber guide block obtained in Example 9.

The molded article 38 is an optical fiber guide block (referred to "optical fiber guide block 38" hereinafter) having mutually parallel eight strings of optical fiber fixing engagement portion 41 comprising V-grooves with a length of 4 mm, a depth of 170 μm and a width at the upper end of 250 μm, a pedestal 42 formed at one step lower position from the upper end face of the optical fiber fixing engagement portions 41 and side wall portions formed at the sides of the pedestal 42 as shown in FIG. 6.

The width, length and maximum thickness of the optical fiber guide block 38 are 8 mm, 13 mm and 2 mm, respectively, while the width, length and the difference in the height between the surface of the pedestal 42 and top face of the side wall portions 43 are 2.3 mm, 9 mm and 250 μm, respectively. The top faces of the side wall portions 43 are at the same level as the upper end face of the optical fiber fixing engagement portions 41. Among the edges of the optical fiber guide block 38, the edges corresponding to the clearance portion between the upper mold member 31 and sleeve mold member 34, the clearance portion between the lower mold member 36 and sleeve mold member 34 and the clearance portion between the first molding part 33 and the second molding part 32 in the upper mold member 31, respectively, and each edges at the crossing portions of the top faces of the side wall portions 43 with the side faces positioned at the pedestal 42 side of the side faces of the side wall portions 43 were formed of free surfaces, respectively. The plane view of the optical fiber guide block 38 approximately assumes a rectangle.

(2) Measurement and Evaluation of Accuracy

The same results as in Example 1(2) were obtained on the dimensional and form accuracies of the optical fiber guide block 38 described above from the same measurement as used in Example 1(2). It was confirmed from the results that the optical fiber guide block 38 has high dimensional and form accuracies.

The optical fiber guide block 38 having the high dimensional and form accuracies is advantageous as a constitution member of an optical fiber array together with a tape fiber (thickness; about 400 μm) with a width of 2.3 mm, in which eight strings of quartz-based single mode optical fiber having an outer diameter of 125 μm each are arranged in parallel relation with each other with a pitch of 250 μm, with an alignment accuracy of ±1 μm.

(3) Continuous Molding

The same results as in Example 1(3) were obtained by a continuous molding carried out under the same manner as in Example 1(3). Variance of the overall dimension around the optical fiber fixing engagement portions among the molded articles was within ±0.90 μm.

EXAMPLE 10

(1) Production of the Optical Fiber Guide Block

A glass shaping preform comprising the glass with the same composition as the glass material used in Example 1(1) with a dimension of 3.5×10.5×2.8 mm was produced by the same method as used in Example 1(1).

A mold having the same structure as that of the mold used in Example 9(1) was produced, except that the configuration of the second molding part was changed so that the top faces of the side wall portions of the optical fiber guide block obtained are by 1 mm higher than the upper end face of the optical fiber fixing engagement portions, along with changing the dimensions of the upper, sleeve and lower mold members so that the width and length of the optical fiber guide block to be obtained are 5 mm and 12 mm, respectively and the length of the optical fiber fixing engagement portions to be formed is 5 mm.

An optical fiber guide block was thus obtained by the same method as in Example 1(1), except that the glass shaping preform and mold as described above were used.

Figure 7:
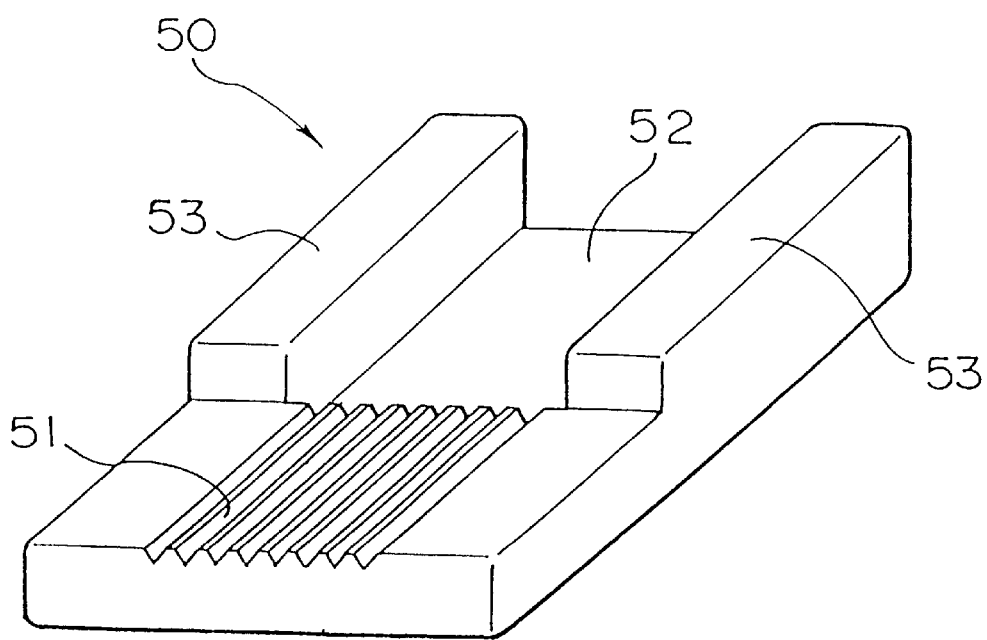
FIG. 7 is an illustrative perspective view of the optical fiber guide block obtained in Example 10.

As shown in FIG. 7, the optical fiber guide block 50 obtained by using the foregoing mold has eight optical fiber fixing engagement portions 51 in parallel relation with each other comprising V-grooves with a length of 5 mm, a depth of 170 μm and a upper end with of 250 μm, a pedestal 52 formed at by one step lower level from the upper end face of the optical fiber fixing engagement portions 51, and side wall portions 53 formed at sides of the pedestal 52. The width, length and maximum thickness of the optical fiber guide block 50 are 5 mm, 12 mm and 2.5 mm, respectively, while the width of the pedestal 52 is 2.3 mm and the difference between the surface of the pedestal 52 and top faces of the side wall portions 53 is 1.25 mm. The top faces of the side wall portions 53 are made to be by 1 mm higher than the upper end faces of the optical fiber fixing engagement portions 51. Among the edges of this optical fiber guide block 50, the edges corresponding to the clearance portions between the upper mold member and sleeve mold member, between the lower mold member and sleeve mold member and between the first molding part of the upper mold member and second molding part, and each edges at the crossing portion of the top faces of the side wall portions 53 with the side face positioned at the pedestal 52 side of the side faces of the side wall portions 53 were formed of free surfaces, respectively. The plane view of the optical fiber guide block 50 assumes approximately a rectangle.

(2) Measurement and Evaluation of Accuracy

The same results as in Example 1(2) were obtained on the dimensional and form accuracies of the optical fiber guide block 50 described above from the same measurement as used in Example 1(2). It was confirmed from the results that the optical fiber guide block 50 has high dimensional and form accuracies.

The optical fiber guide block 50 having the accuracies described above is advantageous, as shown in FIG. 8, as an optical fiber fixing member for fixing a tape fiber 56 (with a thickness of about 400 μm) having a width of 2.3 mm in which eight strings of quartz-based single mode optical fiber 55 with an outer diameter of 125 μm are arranged in parallel relation with each other with a pitch of 250 μm, along with as a constitution member of the optical fiber array together with quartz-based single mode optical fibers 55 with an alignment accuracy of ±1 μm.

Figure 8A:
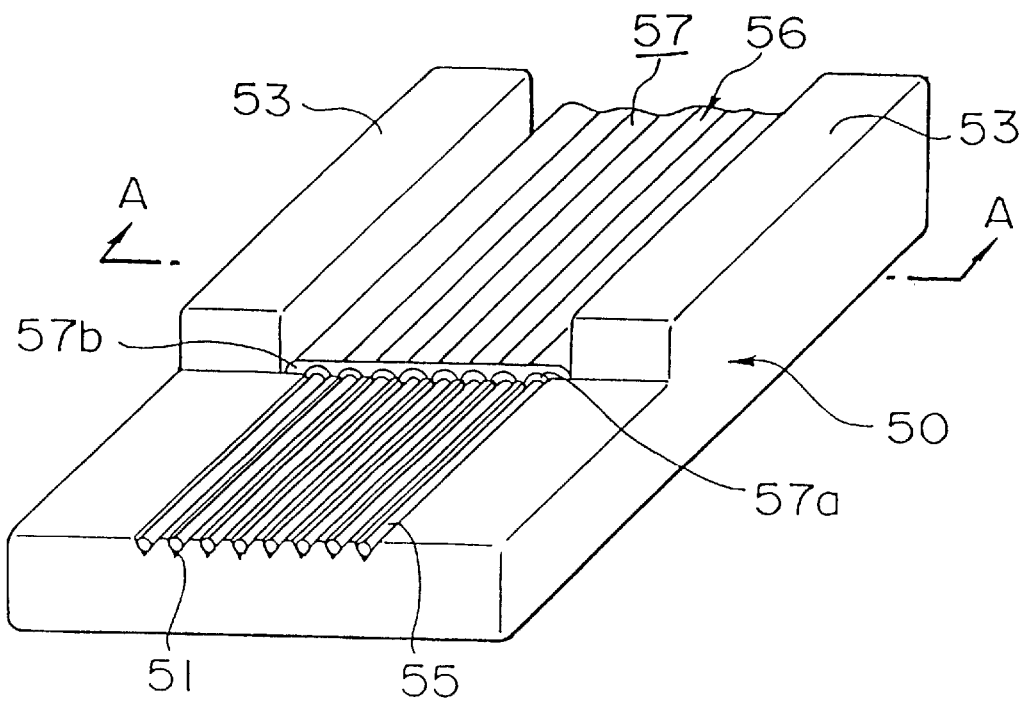
FIG. 8(a) is a perspective view illustrating one example of the optical fiber guide block in use obtained in Example 10.
Figure 8B:
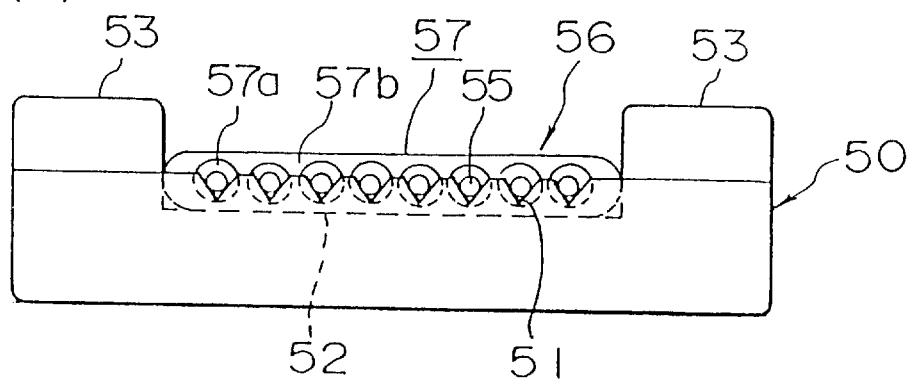
FIG. 8(b) is an illustrative view of the optical fiber guide block shown in FIG. 8(a) viewed from the optical end face.
Figure 8C:
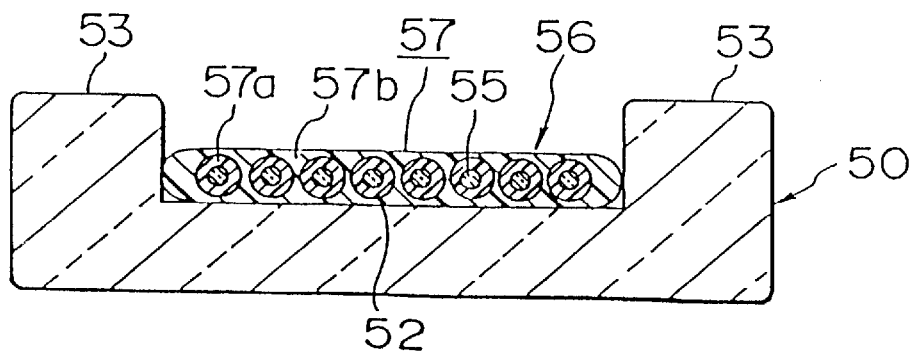
FIG. 8(c) is an illustrative cross section along the direction A—A shown in FIG. 8(a).

FIG. 8(a) is an illustrative perspective view showing the arrangement in which the optical fibers 55 exposed from the tape fiber 56 are engaged to the optical fiber fixing engagement portions 51 of the optical fiber guide block 50, besides placing the tape fiber 56 (the portion where the optical fibers 55 are not exposed) on the pedestal 52 (a reference numeral is not attached in FIG. 8(a)) of the optical fiber guide block 50. The coating portion 57 of the tape fiber 56 assumes a double coating structure having the first coating 57a formed around the periphery of the optical fiber 55 and the second coating 57b formed around the periphery of the first coating 57a. FIG. 8(b) is an illustrative drawing of the optical fiber guide block 50 and tape fiber 56 viewed from the optical end face. FIG. 8(c) is an illustrative drawing of the cross section along the line A—A shown in FIG. 8(a).

Figure 9:
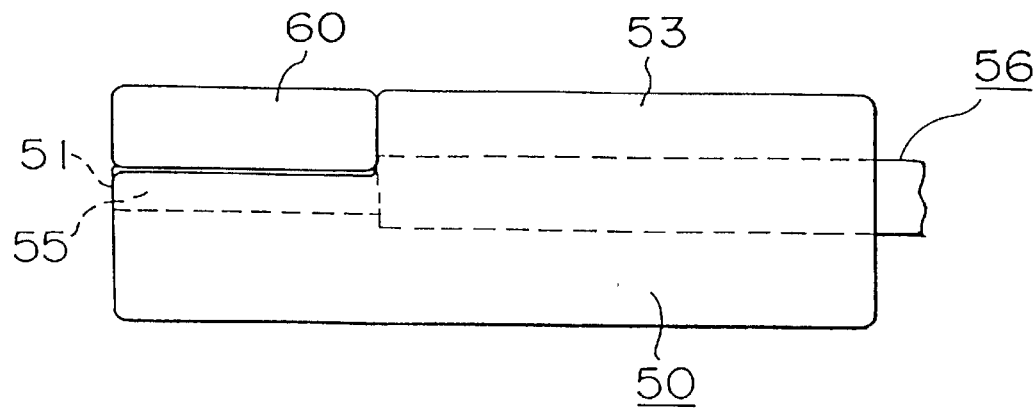
FIG. 9 is a side view illustrating the other example of the optical fiber guide block in use obtained in Example 10.

According to the optical fiber guide block 50 described above, the optical fiber holding block 60 for compression-fixing the optical fibers 55 engaged to the optical fiber fixing engagement portions 51 can be easily positioned along the depth direction as shown in FIG. 9. The members shown in FIG. 9 in common with the members shown in FIG. 8 are given the same reference numerals.

(3) Continuous Molding

The same results as in Example 1(3) were obtained by a continuous molding carried out by the same method as used in Example 1(3). Variance of the overall dimensions around the optical fiber fixing engagement portions among the molded articles was within ±0.8 μm.

EXAMPLE 11

(1) Production of Optical Fiber Holding Block

A block like glass shaping preform with a width of 4.56 mm, a length of 4.56 mm and a thickness of 1.2 mm having rounded edges was obtained by hot pre-molding of a glass material having the same composition as the glass material used in Example 1(1). The vertical cross section of this glass shaping preform assumes a rectangle except that its corners are rounded, while its plane view also assumes a rectangle except that its corners are rounded. Accordingly, each faces (the face in the direction of thickness of the glass shaping preform) of the glass shaping preform positioned in the pressurizing direction in press-molding assumes a plane.

A mold having the same structure as the mold used in Example 1(1) was produced, except that a flange that is received by the top face of the sleeve mold member in use was provided at four sides of the upper end of the square pole of the upper mold member, the upper mold member was formed of a single material comprising tungsten carbide, and the dimensions of the upper, sleeve and lower mold members were changed so that the width and length of the optical fiber holding block to be obtained are 5 mm and 5 mm, respectively, and the distance between the lower face of the upper mold member and top face of the lower mold member during the press-molding is 1 mm.

An optical fiber holding block comprising a plate with a width of 5 mm, a length of 5 mm and a thickness of 1 mm was obtained by a press-molding by the same method as used in Example 1(1), except that the glass shaping preform and mold as described above were used. All the edges of the optical fiber holding block were formed of free surfaces and the plane view of the optical fiber holding block approximately assumes a rectangle.

Any one of the two main surfaces of the optical fiber holding block is used for an optical fiber holding plane, i.e., a face for compression-fixing the optical fiber(s) engaged to the optical fiber fixing engagement portions of the optical fiber guide block.

(2) Measurement and Evaluation of Accuracy

The width (the width viewed from the side face to be positioned at the optical end face after assembling into the optical fiber array) and thickness of the foregoing optical fiber holding block were measured with an electric micrometer (Digimatic Micrometer made by Mitsutoyo Co.) to determine their accuracies. It was confirmed from the results that the optical fiber holding block has a high dimensional accuracy with dimensional accuracies of within ±1 μm with respect to its width and thickness.

Flatness of the two main surfaces of the optical fiber holding block measured with a contour measuring apparatus described above was within 1 μm. Degree of rectangle between the two main surfaces and a side face (right or left side face viewed from the side face to be positioned at optical end face after assembling into the optical fiber array) measured with the contour measuring apparatus described above was within 10 μm. Parallelism between these two main surfaces measured with the contour measuring apparatus described above was within 1 μm. It was confirmed from these results that the optical fiber holding block has a high form accuracy.

The optical fiber holding block having dimensional and form accuracies as described above is advantageous, judging from its dimension, for compression-fixing all the optical fibers engaged to the optical fiber fixing engagement portions of the optical fiber guide block according to any of Example 1 to Example 8.

(3) Continuous Molding

By using the mold used in (1) above, 500 times of press-molding was carried out under the same manner as in Example 1(1).

The results revealed that there were no abnormalities in the mold. Any occurrence of burrs or decrease in dimensional and form accuracies were not observed in the optical fiber holding block obtained. Variance of the dimensional accuracy among the molded articles was within ±0.7 µm.

EXAMPLE 12

(1) Production of the Coated Optical Fiber Holding Block

A block like glass shaping preform with a width of 4.1 mm, a length of 6.1 mm and a thickness of 1.46 mm having rounded edges was obtained by hot pre-molding of a glass material having the same composition as the glass material used in Example 1(1). The vertical cross section of this glass shaping preform assumes a rectangle except that its corners are rounded, while its plane view also assumes a rectangle except that its corners are rounded. Accordingly, each faces (the face in the direction of thickness of the glass shaping preform) of this glass shaping preform positioned in the pressurizing direction in press-molding assumes a plane.

A mold having the same structure as the mold used in Example 11(1) was produced, except that a cermet made of titanium carbide and titanium nitride (mean thermal expansion coefficient at a temperature of room temperature to 400° C. is $88 \times 10^{-7}$/° C.) was used as a material for the upper mold member, a convex portion with a width of 2.3 mm, a height of 450 µm and a length of 7 mm whose vertical cross section and horizontal cross section assume rectangles was formed in the lower face of the upper mold member, and the dimensions of the upper, sleeve and lower mold members were changed so that the width and length of the holding block to be obtained are 5 mm and 7 mm, respectively. The convex portion described above was formed to be positioned at the center of the lower face of the upper mold member with the same longitudinal direction as the longitudinal direction of the upper mold member. The upper mold member was produced so that the distance between the lower face of the foregoing convex portion and the top face of the molding part of the lower mold member is 800 µm while the distance between the lower face of the upper mold member except the convex portion and the top face of the molding part of the lower mold member is 1.25 mm.

A coated optical fiber holding block with a width of 5 mm, a length of 7 mm and a maximum thickness of 1.25 mm was obtained by the press-molding as in Example 11(1), except that the glass shaping preform and mold as described above were used.

Figure 10:
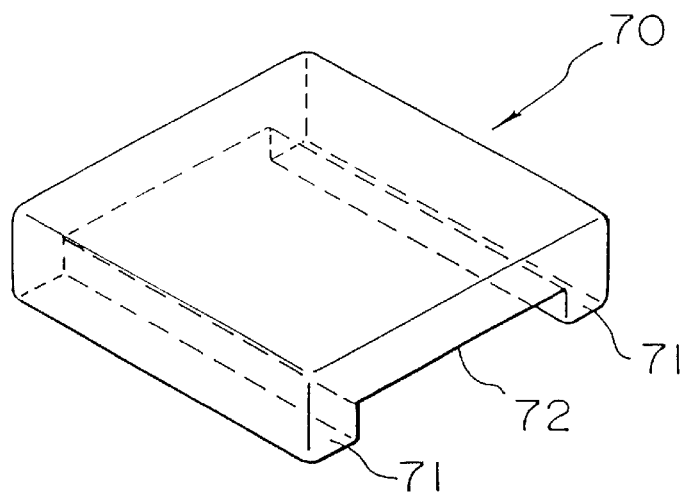
FIG. 10 is an illustrative perspective view showing the coated optical fiber holding block obtained in Example 12.

As shown in FIG. 10, the coated optical fiber holding block 70 has two convex portions 71 with a width of 1.35 mm, a length of 7 mm and a height of 0.45 mm at each periphery at the right and left side portions along the longitudinal direction on one face, the area except the convex portions on the face on which these convex portions are formed assumes a plane 72. The face (top face) confronting to the face on which the convex portions 71 are formed, and the side faces of the coated optical fiber holding block 70 comprise planes, respectively.

The edges corresponding to the clearance portions between the upper and sleeve mold members and between lower and sleeve mold members, and each edges at the crossing portion of the top faces of the convex portions 71 with the side faces positioned at the plane 72 side of the side faces of the convex portions 71 are formed of free surfaces, respectively. The plane view of the coated optical fiber holding block 70 approximately assumes a rectangle.

The plane 72 is used for a coated optical fiber holding plane (referred to "coated optical fiber holding plane 72" hereinafter), i.e., a face for compression-fixing the coated optical fiber fixed to the pedestal of the optical fiber guide block from above the coating portion of the coated optical fiber, in the optical fiber holding block 70 described above.

(2) Measurement and Evaluation of Accuracy

The width and thickness (the thickness at the portion where the coated optical fiber holding plane 72) of the coated optical fiber holding block 70 were measured by the same method as used in Example 11(2) to determine their dimensional accuracies. The results showed that the dimensional accuracy is within ±1 µm for either the width or the thickness, confirming that the coated optical fiber holding block 70 has a high dimensional accuracy.

Flatness of the coated optical fiber holding plane 72, degree of rectangle between the coated optical fiber holding plane 72 and a side face and parallelism between the coated optical fiber holding plane and the top face were measured by the same method as used in Example 11(2). The results showed that the accuracies were within 10 µm, confirming that the coated optical fiber holding block 70 has a high form accuracy.

Figure 11:
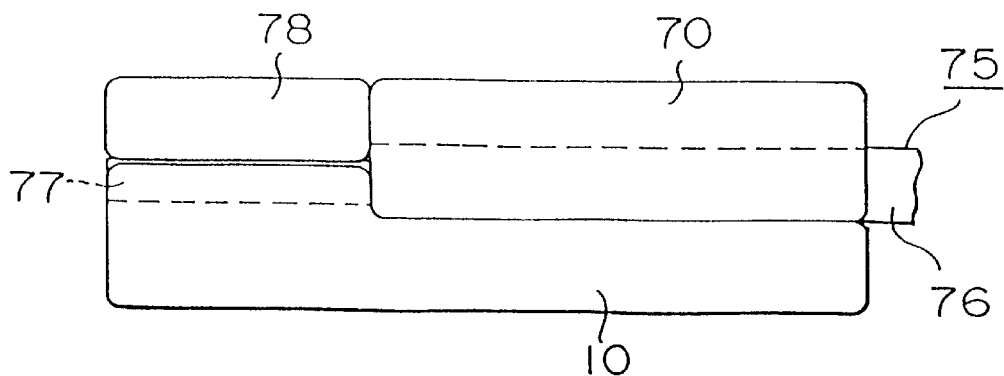
FIG. 11 is a side view illustrating one example of the coated optical fiber holding block in use obtained in Example 12.

The coated optical fiber holding block 70 is advantageous, as judged form its configuration and size, for compression-fixing the tape fiber 75 fixed on the pedestal (reference numerals are not attached in FIG. 11) of the optical fiber guide block 10 obtained in Example 1 from above the coating portion 76 of the tape fiber 75 as shown in FIG. 11. The reference numeral 77 in FIG. 11 indicates the optical fiber exposed from the tape fiber 75 while the reference numeral 78 indicates the optical fiber holding block obtained in Example 11.

(3) Continuous Molding

The same results as obtained in Example 11(3) was obtained after a continuous molding as in Example 11(3). Variance of the dimensional accuracy among the molded articles was within ±0.8 µm.

EXAMPLE 13

(1) Production of the Coated Optical Fiber Holding Block

A block like glass shaping preform with a width of 2 mm, a length of 6.8 mm and a thickness of 0.91 mm having curved edges was obtained by a hot pre-molding of a glass material having the same composition as the glass material used in Example 1(1). A mold with the same structure as the mold used in Example 11(1) was produced, except that the dimensions of the upper, sleeve and lower mold members were changed so that the width and length of the coated optical fiber holding block to be obtained are 2.2 mm and 7 mm, respectively, and the distance between the lower face of the upper mold member and the top face of the lower mold member is 0.8 mm during the press-molding.

A coated optical fiber holding block comprising a plate with a width of 2.2 mm, a length of 7 mm and a thickness of 0.8 mm was obtained by a press-molding carried out under the same manner as in Example 11(1), except that the glass shaping preform and mold described above were used. All the edges of the coated optical fiber holding block were formed of free surfaces and the plane view of the coated optical fiber holding block approximately assumes a rectangle.

Any one face of the two main surfaces may be used as the coated optical fiber holding plane in the coated optical fiber holding block.

(2) Measurement and Evaluation of Accuracy

The dimensional and form accuracies of the coated optical fiber holding block described above was measured by the same method as used in Example 11(2). The results showed that the dimensional accuracy is within ±1 m and form accuracy is within 10 μm as obtained in the optical fiber holding block in Example 11(1). It was confirmed from the results that the coated optical fiber holding block has high dimensional and form accuracies.

The coated optical fiber holding block having the dimensional and form accuracies described above is advantageous, judging from its size, for compression-fixing the coated optical fiber fixed on the pedestal of the optical fiber guide block obtained in Example 10 from above the coating portion of the coated optical fiber.

(3) Continuous Molding

The same results as obtained in Example 11(3) was obtained after a continuous molding carried out under the same manner as in Example 11(3). Variance of the dimensional accuracy among the molded articles was within ±0.7 μm.

EXAMPLE 14

(1) Production of Dual-purpose Holding Block

A block like glass shaping preform with a width of 4 mm, a length of 11 mm and a thickness of 1.4 mm having curved edges was obtained by a hot pre-molding of a glass material having the same composition as the glass material used in Example 1(1). The vertical cross section of the glass shaping preform assumes a rectangle except that its corner is rounded while its plane view also assumes a rectangle except that its corner is rounded. Accordingly, the faces to be positioned in the pressurizing direction (the faces in the direction of thickness of the glass shaping preform) during the press-molding in the glass shaping preform assumes a plane.

The first molding part made of tungsten carbide having the same configuration and size as the upper mold member used in Example 11(1), except that it has no flange at the side of a face making a contact with the second molding part to be described later, and the second molding part made of a cermet (a cermet of titanium carbide and titanium nitride; mean thermal expansion coefficient at temperature of room temperature to 400° C.=88×10$^{-7}$/° C.) having the same configuration and size with the upper mold member used in Example 12(1), except that it has no flange at the side of a face making a contact with the first molding part, were mechanically integrated with each other using a fixing frame having a given inner dimension and screws as in the upper mold member used in Example 1(1). The dimensions of the sleeve mold member and lower mold member were changed so that the width and length of the dual-purpose holding block to be obtained are 5 mm and 12 mm, respectively.

A dual-purpose holding block, having a configuration in which the optical fiber holding block obtained in Example 11 and the coated optical fiber holding block obtained in Example 12 were linearly disposed by aligning their transverse direction, was obtained by a press-molding carried out under the same manner as in Example 11(1), except that the glass shaping preform and mold described above were used.

Among the edges of the dual-purpose holding block described above, the edges corresponding to the clearance portions between the upper and sleeve mold members, between the lower and sleeve mold members and between the first molding part and second molding part of the upper mold member, and each edges corresponding to the crossing portion of the top faces of the convex portions 71 in the coated optical fiber holding block 70 obtained in Example 12 with the side faces positioned at the coated optical fiber holding plane 72 side of the side faces of the convex portion 71 were formed of free surfaces, respectively. The plane view of the dual-purpose holding block approximately assumes a rectangle.

(2) Measurement and Evaluation of Accuracy

The dimensional and form accuracies of the dual-purpose holding block described above was measured by the same method as used in Example 11(2) and Example 12(2). The results showed that the dimensional accuracy is within ±1 μm and form accuracy is within 10 μm as obtained in the optical fiber holding block in Example 11 and in the coated optical fiber holding block in Example 12. It was confirmed from the results that the dual-purpose holding block has high dimensional and form accuracies.

The dual-purpose holding block having the dimensional and form accuracies described above has both functions of the function of the optical fiber holding block in Example 11 and the function of the coated optical fiber holding block in Example 12. Judging from its configuration and size, the dual-purpose holding block being advantageous for compression-fixing all the optical fibers engaged to the optical fiber fixing engagement portions of the optical fiber guide block in Example 1, and for compression-fixing the coated optical fiber fixed to the pedestal of the optical fiber guide block from above the coating portion of the coated optical fiber.

(3) Continuous Molding

The same results as obtained in Example 11(3) was obtained after a continuous molding as in Example 11(3). Variance of the dimensional accuracy among the molded articles was within ±0.9 μm.

EXAMPLE 15

(1) Production of the Optical Fiber Guide Block

A mold having the same structure as the mold in Example 1(1) was produced, except that the configuration of the first molding part was changed so that the side portions in the transverse direction of the top face of the optical fiber guide block to be obtained form inclined faces having an outwardly falling gradient. An optical fiber guide block was produce by the same method as used in Example 1(1), except that the mold was used.

The same results as in Example 1(2) was obtained by measuring the dimensional and form accuracies of the optical fiber guide block described above by the same method as used in Example 1(2). It was confirmed from the results that the optical fiber guide block has high dimensional and form accuracies.

A continuous molding was carried out under the same manner as in Example 1(3), by using the mold described above, thereby the same results as obtained in Example 1(3) was obtained. Variance of the overall dimensions around the optical fiber fixing engagement portions among the molded articles was within ±0.8 μm.

(2) Production of the Optical Fiber Fixing Block

A mold with the same structure with the mold used in Example 11(1) was produced, except that the configuration of the upper mold member was changed so that the side portions of the lower face of the optical fiber holding block obtained form inclined face having an outwardly falling gradient, and that a cermet of titanium carbide and titanium nitride (mean thermal expansion coefficient at a temperature of room temperature to 400° C. is 88×10$^{-7}$/° C.) was used as a material of the upper mold member. An optical fiber guide block was produced by the same method as used in Example 11(1) except that the mold was used.

The lower face except the inclined face described above may be used as an optical fiber holding plane in the optical fiber holding block. The gradients of the foregoing inclined faces are the same as the gradients of the inclined faces in the optical fiber guide block obtained in (1) described above.

The same results as in Example 11(2) was obtained by measuring the dimensional and form accuracies of the optical fiber holding block described above by the same method as in example 11(2). It was confirmed from these results that the optical fiber holding block has high dimensional and form accuracies.

A continuous molding was carried out under the same manner as in Example 11(3), by using the mold described above, thereby the same results as obtained in Example 11(3) was obtained. Variance of the dimensional accuracy among the molded articles was within ±0.7 $\mu$m.

(3) Production of the Coated Optical Fiber Holding Block

A coated optical fiber holding block was obtained by the same method as in Example 12.

(4) Fixing of Optical Fibers

A tape fiber (thickness; 400 $\mu$m) with a width of 2.3 mm, in which eight strings of quartz-based single mode optical fiber having an outer diameter of 125 $\mu$m each are arranged in parallel relation with each other with a pitch of 250 $\mu$m, was prepared. Each of the eight strings of optical fiber was exposed by 6 mm from one end of the tape fiber.

An ultraviolet curing type adhesive (sensitizing wavelength; 350 nm) was coated on each optical fiber fixing engagement portions and pedestal of the optical fiber guide block obtained in (1) described above. After engaging the optical fibers exposed from the tape fiber to each optical fiber fixing engagement portions and placing the tape fiber on the pedestal, an ultraviolet light with an wavelength of 350 nm was irradiated to cure the ultraviolet curing type adhesive.

Then, the same ultraviolet curing type adhesive as described above was coated on the foregoing optical fiber engaged to the optical fiber fixing engagement portions and its periphery, followed by placing the optical fiber holding block obtained in (2) form above thereon so that the optical fiber holding plane of the optical fiber holding block is positioned at the optical fiber side. Since the inclined faces, formed at the side portions in the transverse direction of the lower face of the optical fiber holding block, and the inclined faces, formed at the side portions in the transverse direction of the top face of the optical fiber guide block, engage with each other, positioning in the transverse direction of the optical fiber holding block was made easy. Because both of the edges of the incline faces formed at the side portions in the transverse direction of the top face of the optical fiber guide block and the edges of the incline faces formed at side portions in the transverse direction of the lower face of the optical fiber holding block are formed of free surfaces, a wider spaces than spaces at other portion is provided between these edges to serve as an adhesive pools, thereby any overflow of the ultraviolet curing type adhesive toward the transverse direction of the optical fiber guide block was not encountered. The same ultraviolet curing type adhesive was also coated on the foregoing tape fiber fixed on the pedestal of the optical fiber guide block and at the side portions of the pedestal, followed by placing the coated optical fiber holding block obtained in (3) above so that the coated optical fiber holding plane of the coated optical fiber holding block is positioned at the coated optical fiber side.

The ultraviolet curing type adhesive described above was cured thereafter by irradiating an ultraviolet light with an wavelength of 350 nm while pressing the optical fiber holding block and coated optical fiber holding block toward the optical fiber guide block.

The optical fibers exposed from the foregoing tape fiber were fixed with the optical fiber guide block, optical fiber holding block and coated optical fiber holding block together with a part of the tape fiber by the procedure described above, thereby obtaining an optical fiber array. This optical fiber array is shown in FIG. 12.

Figure 12A:
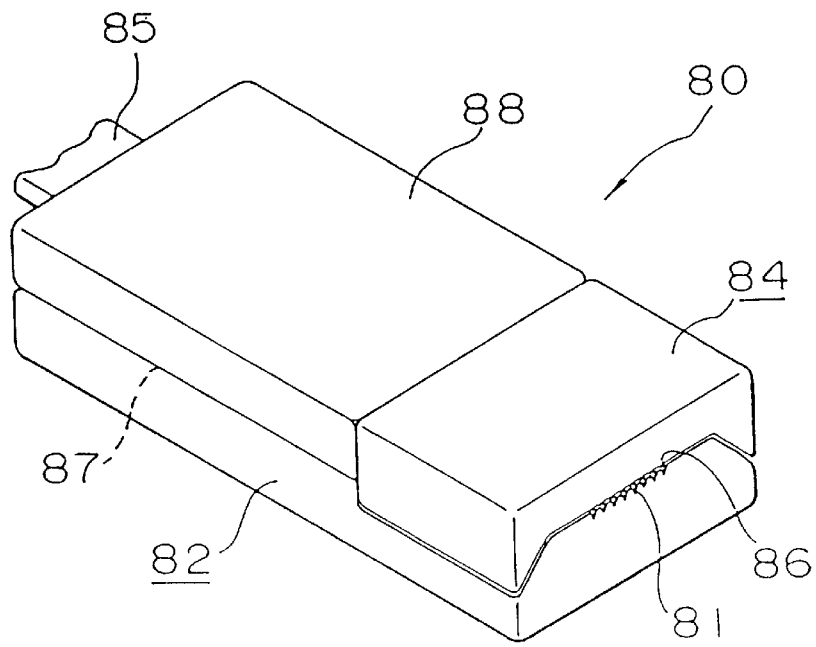
FIG. 12(a) is an illustrative perspective view of the optical fiber array obtained in Example 15.
Figure 12B:
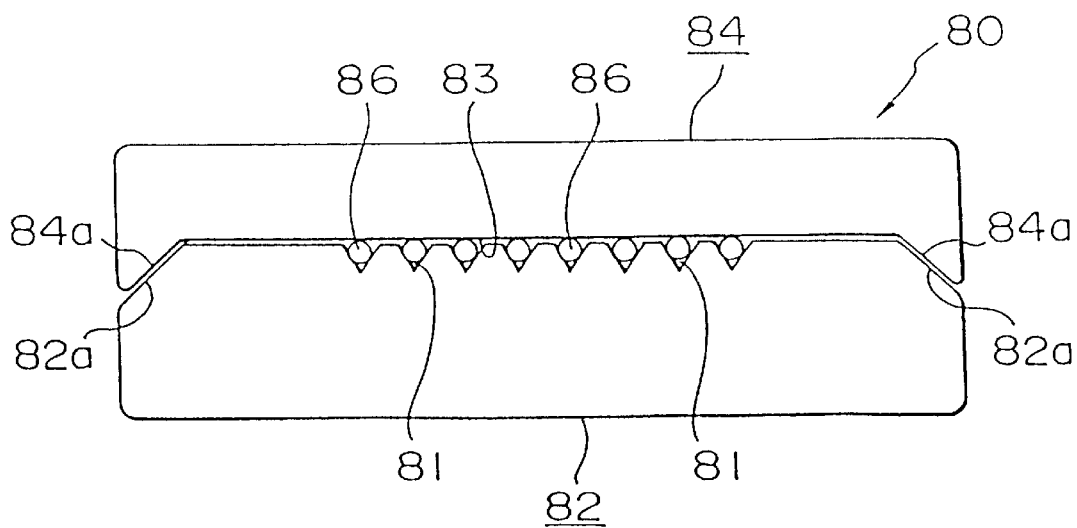
FIG. 12(b) is an illustrative view of the optical fiber array shown in FIG. 12(a) viewed from its optical end face.

FIG. 12(a) is an illustrative perspective view of the optical fiber array described above while FIG. 12(b) is an illustrative drawing of the optical fiber array viewed from the optical end face. As shown in these figures, the optical fiber array 80 described above can fix eight strings of optical fiber 86 exposed from the tape fiber 85 by means of an optical fiber guide block 82 having eight strings of optical fiber fixing engagement portion in a parallel relation with each other comprising V-grooves, an optical fiber holding block 84 having an optical fiber holding plane 83 and the ultraviolet curing type adhesive omitted in the drawing.

Each optical fiber 86 is adhered to the optical fiber fixing engagement portions with the ultraviolet curing type adhesive while slightly exposing its outer surface from the upper end face of the optical fiber fixing engagement portions 81, and the outer surface above slightly exposed from the upper end face of the optical fiber fixing engagement portions 81 is also adhered to the optical fiber holding plane 83 of the optical fiber holding block 84 with the ultraviolet curing type adhesive.

The side portions in the transverse direction of the top face of the optical fiber guide block 82 form inclined faces 82a having an outwardly falling gradient, and this incline faces 82a are engaged to the inclined faces 84a having an outwardly falling gradient formed at the side portions in the transverse direction of the lower face of the optical fiber holding block 84 while forming a layer of the ultraviolet curing type adhesive or a small space between the inclined faces 84a. The length along the depth of the foregoing inclined face 82a (the same direction as the direction along the depth of the optical fiber guide block 82) is identical to the length along the direction of the depth of the foregoing inclined face 84a (the same direction as the direction along the depth of the optical fiber guide block 84), both length being equal to the length along the longitudinal direction of the optical fiber fixing engagement portions 81.

The optical fiber guide block 82 has a pedestal 87, and the optical fiber array 80 fixes a part of the optical fibers 86 exposed side of the tape fiber 85 by means of the pedestal 87, the coated optical fiber holding block 88 having a coated optical fiber holding plane and the ultraviolet curing type adhesive. The lower surface of the tape fiber positioned at the part of the tape fiber 85 is adhered to the foregoing pedestal 87 with the ultraviolet curing type adhesive, and the upper surface of the tape fiber positioned at the part is adhered to the coated optical fiber holding block 88 with the ultraviolet curing type adhesive.

EXAMPLE 16

(1) Production of the Optical Fiber Guide Block

A mold having the same structure as the mold used in Example 15(1) was produced, except that the configuration of the first molding part was changed so that the side portions in the transverse direction of the top face of the optical fiber guide block to be obtained form inclined faces having outwardly rising gradients, and that a cermet of titanium carbide and titanium nitride (mean thermal expansion coefficient at a temperature of room temperature to 400° C. is $88 \times 10^{-7}/°$ C.) was used as a material of the upper mold member. An optical fiber guide was produced by the same method as used in Example 15(1) except that the mold was used.

The same results as in Example 15(1) was obtained from the measurement of the dimensional and form accuracies of the optical fiber guide block by the same method as used in Example 15(1). It was confirmed from the results that the optical fiber guide block has high dimensional and form accuracies.

A continuous molding was carried out under the same manner as in Example 15(1), by using the mold described above, thereby the same results as obtained in Example 15(1) was obtained. Variance of the overall dimensions around the optical fiber fixing engagement portions among the molded articles was within ±0.9 μm.

(2) Production of the Optical Fiber Holding Block

A mold having the same structure as the mold used in Example 15(2) was produced, except that the configuration of the upper mold member was changed so that the side portions in the transverse direction of the lower face of the optical fiber holding block to be obtained form inclined faces having outwardly rising gradients. An optical fiber holding block was produced by the same method as used in Example 15(2) except that the mold was used.

The lower face of the optical fiber holding block except its inclined faces may be used as an optical fiber holding plane. The gradients of the foregoing inclined faces are equal to the gradients of the inclined faces of the optical fiber guide block obtained in (1) described above.

The same results as in Example 15(2) were obtained from the measurement of the dimensional and form accuracies of the holding block above by the same method as used in Example 15(2). It was confirmed from the results that the optical fiber holding block has high dimensional and form accuracies.

A continuous molding was carried out under the same manner as in Example 15(2), by using the mold described above, thereby the same results as obtained in Example 15(2) was obtained. Variance of the dimensional accuracy among the molded articles was within ±0.7 μm.

(3) Production of the Coated Optical Fiber Holding Block

A coated optical fiber holding block was obtained by the same method as used in Example 15(3).

(4) Fixing of Optical Fibers

An optical fiber array was obtained by fixing the optical fibers exposed from the tape fiber having the same specification as that used in Example 15(4) and a part of the tape fiber with the foregoing optical fiber guide block, optical fiber holding block and coated optical fiber holding block, by the same method as used in Example 15(4). The optical fiber array is shown in FIG. 13.

Figure 13:
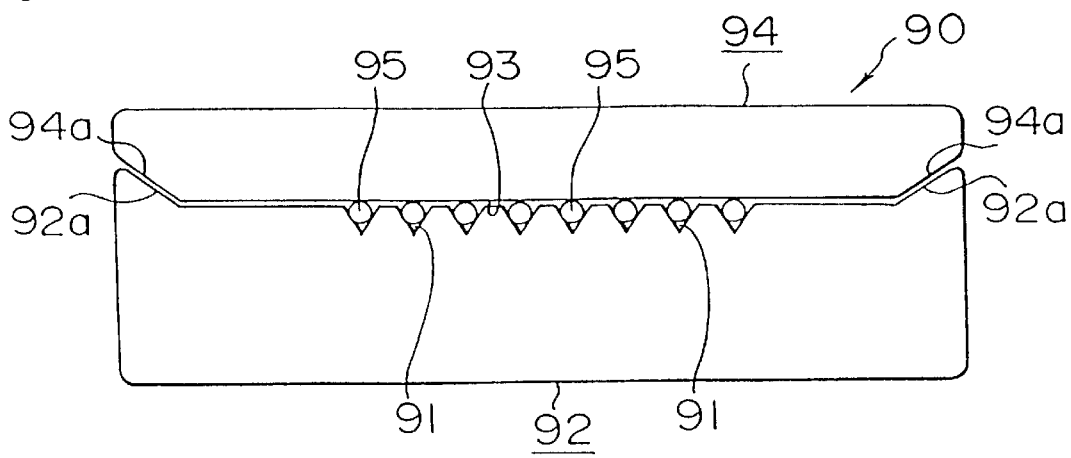
FIG. 13 is an illustrative view of the optical fiber array obtained in Example 16 viewed from its optical end face.

FIG. 13 is an illustrative drawing of the optical fiber array viewed from its optical end face. As shown in the figure, the optical fiber array 90 fixes eight stings of optical fibers 95 exposed from the tape fiber (not shown in the figure) by means of an optical fiber guide block 92 having eight strings of optical fiber fixing engagement portion 91 in parallel relation with each other comprising V-grooves, an optical fiber holding block 94 having an optical fiber holding plane 93 and an ultraviolet curing type adhesive omitted in the figure. The optical fiber array 90 also fixes a part of the optical fibers 95 exposed side of the tape fiber by means of the pedestal (not shown in the figure) formed in the optical fiber guide block 92, coated optical fiber holding block (not shown in the figure) having a coated optical fiber holding plane and ultraviolet curing type adhesive.

While the optical fiber array 90 differs from the optical fiber array in Example 15 in that the side portions in the transverse direction of the top face of the optical fiber guide block 92 constituting the optical fiber array form inclined faces 92a having outwardly rising gradients and the side portions in the transverse direction of the lower face of the optical fiber holding block form inclined faces 94a having outwardly rising gradients, the optical fiber array 90 is the same as the optical fiber array in Example 15 with respect to the other constructions. The inclined faces 92a formed on the optical fiber guide block 92 and the inclined faces 94a formed on the optical fiber holding block 94 engage with each other when assembled into the optical fiber array 90.

EXAMPLE 17

(1) Production of the Optical Fiber Guide Block

A mold having the same structure as the mold used in Example 15(1) was produced, except that the configuration of the first molding part was changed so that the side portions in the transverse direction of the top face of the optical fiber guide block to be obtained become by one step lower than the upper end face of the optical fiber fixing engagement portions. An optical fiber guide block was produced by the same method as in Example 15(1) except that the mold was used.

The same results as in Example 15(1) were obtained from the measurement of the dimensional and form accuracies of the optical fiber guide block by the same methods as used in Example 15(1). It was confirmed from the results that this optical fiber guide block has high dimensional and form accuracies.

A continuous molding was carried out under the same manner as in Example 15(1), by using the mold described above, thereby the same results as obtained in Example 15(1) was obtained. Variance of the overall dimensions around the optical fiber fixing engagement portions among the molded articles was within ±0.8 μm.

(2) Production of the Optical Fiber Holding Block

A mold having the same structure as the mold used in Example 15(2) was produced, except that the configuration of the upper mold member was changed so that the side portions in the transverse direction of the lower face of the optical fiber holding block obtained become convex portions (convex portions downwardly protruded in use) by one step higher than the optical fiber holding plane. An optical fiber holding block was produced by the same methods as in Example 15(2) except that the mold was used.

The same results as in Example 15(2) were obtained from the measurement of the dimensional and form accuracies of the optical fiber holding block by the same methods as used in Example 15(2). It was confirmed from the results that this optical fiber holding block has high dimensional and form accuracies.

A continuous molding was carried out under the same manner as in Example 15(2), by using the mold described above, thereby the same results as obtained in Example 15(2) was obtained. Variance of the dimensional accuracy among the molded articles was within ±0.8 μm.

(3) Production of the Coated Optical Fiber Holding Block

A coated optical fiber holding block was obtained by the same methods as used in Example 15(3).

(4) Fixing of Optical Fibers

An optical fiber array was obtained by fixing the optical fibers exposed from the tape fiber having the same specification as that used in Example 15(4) and a part of the tape fiber with the foregoing optical fiber guide block, optical fiber holding block and coated optical fiber holding block, by the same method as used in Example 15(4). The optical fiber array is shown in FIG. 14.

Figure 14:
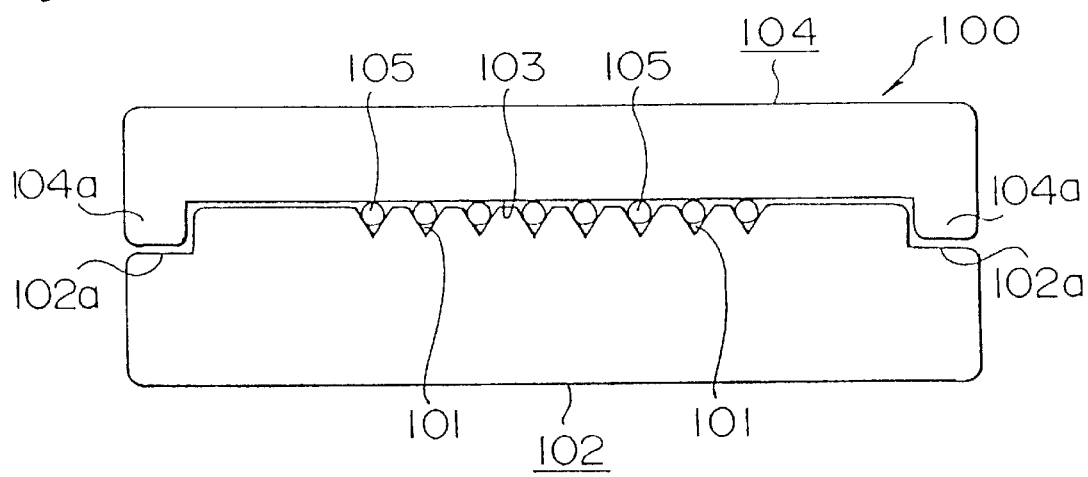
FIG. 14 is an illustrative view of the optical fiber array obtained in Example 17 viewed from its optical end face.

FIG. 14 is an illustrative drawing of the optical fiber array viewed from the optical end face. As shown in the figure, the optical fiber array 100 described above fixes eight strings of optical fiber 105 exposed from the tape fiber (not shown in the figure) by means of an optical fiber guide block 102 having eight strings of optical fiber fixing engagement portion 101 in parallel relation with each other comprising V-grooves, an optical fiber holding block 104 having an optical fiber holding plane 103 and an ultraviolet curing type adhesive omitted in the figure. The optical fiber array 100 also fixes a part of the optical fibers 105 exposed side of the tape fiber by means of a pedestal (not shown in the figure) formed on the optical fiber guide block 102, a coated optical fiber holding block (not shown in the figure) having a coated optical fiber holding plane and the ultraviolet curing type adhesive (not shown in the figure).

While the optical fiber array 100 differs from the optical fiber array in Example 15 in that the side portions 102a in the transverse direction of the top face of the optical fiber guide block 102 are by one step lower than the upper end face of the optical fiber fixing engagement portions 101, and the side portions in the transverse direction of the lower face of the optical fiber holding block 104 form convex portions (downwardly protruded convex portions in use) 104a are by one step higher than the optical fiber holding plane 103, the optical fiber array is the same as the optical fiber array in Example 15 with respect to the other constructions. The side portions 102a of the top face of the optical fiber guide block 102 (by one step lower portion) and the convex portions 104a formed on the optical fiber holding block 104 engage with each other after assembling into the optical fiber array 100.

EXAMPLE 18

(1) Production of the Optical Fiber Guide Block

A mold having the same structure as the mold used in Example 15(1) was produced, except that the configuration of the first molding part was changed so that the side portions in the transverse direction of the top face of the optical fiber guide block obtained become by one step higher than the upper end face of the optical fiber fixing engagement portions. An optical fiber guide block was produced by the same method as in Example 15(1) except that the mold was used.

The same results as in Example 15(1) was obtained from the measurement of the dimensional and form accuracies of the optical fiber guide block by the same method as used in Example 15(1). It was confirmed from the results that the optical fiber guide block has high dimensional and form accuracies.

A continuous molding was carried out under the same manner as in Example 15(1), by using the mold described above, thereby the same results as obtained in Example 15(1) was obtained. Variance of the overall dimensions around the optical fiber fixing engagement portions among the molded articles was within ±0.9 m.

(2) Production of the Optical Fiber Holding Block

A mold having the same structure as the mold used in Example 11(1) was produced, except that the configuration of the upper mold member was changed so that the side portions in the transverse direction of the lower face of the optical fiber holding block obtained are by one step lower than the optical fiber holding plane. An optical fiber holding block was produced by the method as used in Example 15(2) except that the mold was used.

The same results as in Example 15(2) were obtained from the measurement of the dimensional and form accuracies of the holding block by the same methods as used in Example 15(2). It was confirmed from the results that the optical fiber holding block has high dimensional and form accuracies.

A continuous molding was carried out under the same manner as in Example 15(2), by using the mold described above, thereby the same results as obtained in Example 15(2) was obtained. Variance of the dimensional accuracy among the molded articles was within ±0.8 μm.

(3) Production of the Coated Optical Fiber Holding Block

A coated optical fiber holding block was obtained by the same method as used in Example 15(3).

(4) Fixing of Optical Fibers

An optical fiber array was obtained by fixing the optical fibers exposed from the tape fiber having the same specification as that used in Example 15(4) and a part of the tape fiber with the foregoing optical fiber guide block, optical fiber holding block and coated optical fiber holding block, by the same method as used in Example 15(4). The optical fiber array is shown in FIG. 15.

Figure 15:
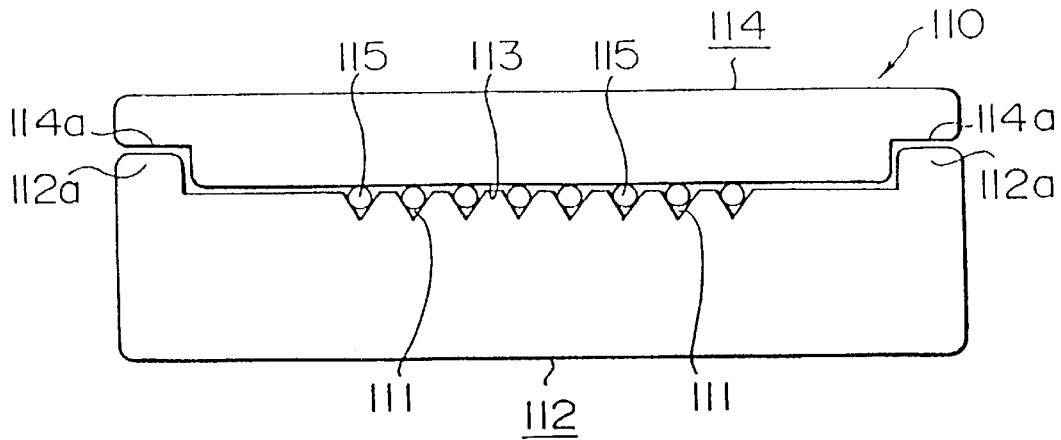
FIG. 15 is an illustrative view of the optical fiber array obtained in Example 18 viewed from its optical end face.

FIG. 15 is an illustrative drawing of the optical fiber array viewed from the optical end face. As shown in the figure, the optical fiber array 110 fixes eight strings of optical fiber 115 exposed from the tape fiber (not shown in the figure) by means of an optical fiber guide block 112 having eight strings of optical fiber fixing engagement portion 111 in parallel relation with each other comprising V-grooves, optical fiber holding block 114 having an optical fiber holding plane 113 and an ultraviolet curing type adhesive. The optical fiber array 110 also fixes a part of the optical fibers 115 exposed side of the tape fiber by means of a pedestal (not shown in the figure) formed on the optical fiber guide block 112 , coated optical fiber holding block (not shown in the figure) and ultraviolet curing type adhesive (not shown in the figure).

While this optical fiber array 110 differs from the optical fiber array in Example 15 in that the side portions in the transverse direction of the top face of the optical fiber guide block 112 form convex portions 112a by one step high than the upper end face of the optical fiber fixing engagement portions 111, and the side portions 114a in the transverse direction of the lower face of the optical fiber holding block 114 are by one step lower than the optical fiber holding plane 113, the optical fiber array is the same as the optical fiber array in Example 15 with respect to the other constructions. The convex portions 112a formed on the optical fiber guide block 112 and the side portions 114a (the portion by one step lower) at the lower face of the optical fiber holding block 114 engage with each other after assembling into the optical fiber array 110.

EXAMPLE 19

(1) Production of the Optical Fiber Guide Block

A mold having the same structure as used in Example 1(1) was produced, except that the configuration of the first molding part was changed so that groove-shaped guide pin engagement portion comprising V-grooves having a width of the upper end of 0.93 mm, a depth of 0.64 mm and a length of 5.0 mm are formed at given positions of the right and left side in the transverse direction of the top face of the optical fiber guide block, respectively. An optical fiber guide block was produced by the same method as used in Example 1(1), except that the mold was used.

The same result as in Example 1(2) was obtained from the measurement of the dimensional and form accuracies of the optical fiber guide block described above. The locational accuracy of the center of each circle virtually inserted into each optical fiber fixing engagement portions with reference to the center of the circle virtually inserted into one groove-shaped guide pin engagement portion (locational accuracy II of the center of the optical fiber), and the locational accuracy II of the center of the optical fiber with reference to the center of the other guide pin were determined, respectively, by virtually inserting a circle with a diameter of 0.7 mm into each groove-shaped guide pin engagement portions and a circle with a diameter of 125 μm into each optical fiber fixing engagement portions, respectively, by the same method as used in Example 1(2). The locational accuracy II of the center of the optical fiber corresponds to one of the form accuracies of the optical fiber guide block according to the present invention. The results indicated that the locational accuracy II of the center of the optical fiber was within 1 μm with reference to any of the center of the left and right guide pins (the centers of circles virtually inserted into the groove-shaped guide pin engagement portions). From these results, it was confirmed that the optical fiber guide block has high dimensional and form accuracies.

A continuous molding was carried out under the same manner as in Example 1(3), by using the mold described above, thereby the same results as obtained in Example 1(3) was obtained. Variance of the overall dimensions around the optical fiber fixing engagement portions among the molded articles and variance of the overall dimensions around the groove-shaped guide pin engagement portions were within ±0.7 μm, respectively.

(2) Production of the Optical Fiber Holding Block

A mold having the same structure as used in Example 11(1) was produced, except that the configuration of the upper mold member was changed so that guide pin holding planes by 300 μm lower than the optical fiber holding plane are formed at the left and right side portions in the transverse direction of the lower face of the optical fiber holding block to be obtained. An optical fiber holding block was obtained by the same method as used in Example 11(1), except that the mold was used.

The same results as in Example 12(2) were obtained from the measurement of the dimensional and form accuracies of the holding block by the same methods as used in Example 12(2). It was confirmed from the results that the optical fiber holding block has high dimensional and form accuracies. When the flatness of each guide pin holding planes was determined by the same method as used in determining the flatness of the optical fiber holding plane, the flatness of left guide pin holding plane and the flatness of right guide pin holding plane were within 1 μm, respectively. The parallelism between the optical fiber holding plane and guide pin holding planes was also within 1 μm.

A continuous molding was carried out under the same manner as in Example 11(3), by using the mold described above, thereby the same results as obtained in Example 11(3) was obtained. Variance of the dimensional accuracy among the molded articles was within ±0.8 μm.

(3) Production of the Coated Optical Fiber Holding Block

A coated optical fiber holding block was obtained by the same method as used in Example 12(1).

(4) Fixing of Optical Fibers

An optical fiber array was obtained by fixing optical fibers exposed from the tape fiber with the same specification as used in Example 15(4) and a part of the tape fiber with the foregoing optical fiber guide block, optical fiber holding block and coated optical fiber holding block, by the same method as used in Example 15(4). The optical fiber array is shown in FIG. 16.

Figure 16:
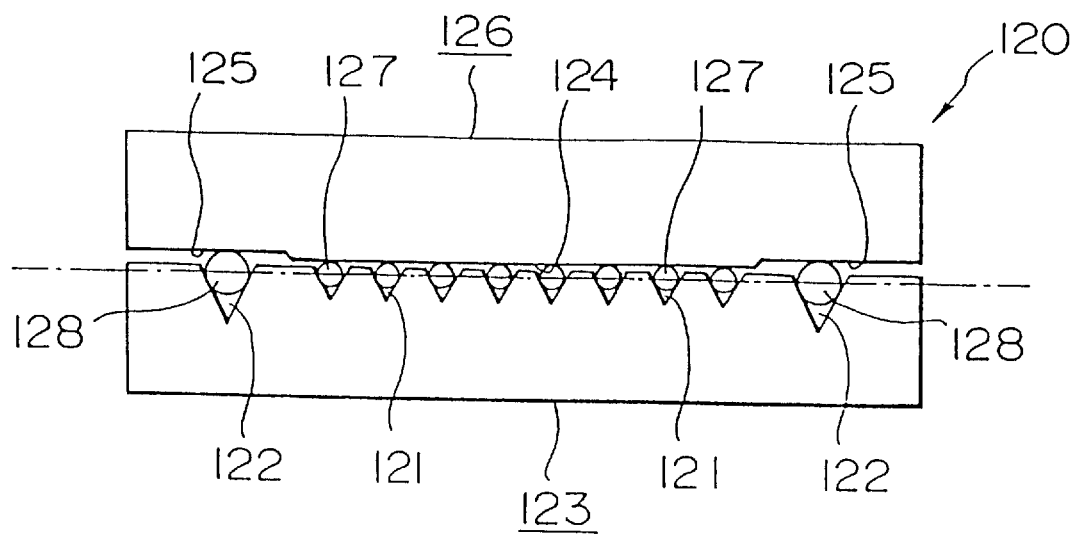
FIG. 16 is an illustrative view of the optical fiber array obtained in Example 19 viewed from its optical end face.

FIG. 16 is an illustrative drawing of the optical fiber array viewed from the optical end face. As shown in the figure, the optical fiber array 120 fixes eight strings of optical fiber 127 exposed from the tape fiber (not shown in the figure) by means of an optical fiber guide block 123 having eight strings of optical fiber fixing engagement portion 121 in parallel relation with each other comprising V-grooves and grove-shaped guide pin engagement portions 122 formed at left and right side portions in the transverse direction, an optical fiber holding block 126 having an optical fiber holding plane 124 and guide pin engagement portions 125 comprising planes formed at left and right side portions in the transverse direction and an ultraviolet curing type adhesive omitted in the figure. The optical fiber array 120 also fixes a part of the optical fiber 127 exposed side of the tape fiber by means of a pedestal (not shown in the figure) formed on the optical fiber guide block 123, coated optical fiber holding block (not shown in the figure) having a coated optical fiber holding plane and ultraviolet curing type adhesive (not shown in the figure).

While the optical fiber array 120 differs from the optical fiber array in Example 15 in that the left and right side portions in the transverse direction of the top face of the optical fiber guide block form planes, respectively, to form groove-shaped guide pin engagement portions 122 thereto, and guide pin engagement portions 125 comprising planes are formed at left and right side portions in the transverse direction of the lower face of the optical fiber holding block 126, respectively, the other constructions are the same as the optical fiber array in Example 15.

In optically connecting the optical fibers 127 fixed in the optical fiber array 120 with other optical fibers or optical element(s), guide pins 128 with a diameter of 0.7 mm are inserted into spaces (two spaces at right and left positions) between guide pin engagement portions 122 of the optical fiber guide block 123 and guide pin engagement portions 125 of the optical fiber holding block 126 as shown in FIG. 16. The centers of the vertical cross section of the guide pins 128 and the centers of the vertical cross section of each optical fiber 127 are aligned along a line as shown by the chain line.

EXAMPLE 20

(1) Production of the Optical Fiber Guide Block

An optical fiber guide block was obtained by the same method as used in Example 19(1).

(2) Production of the Optical Fiber Holding Block

A mold was produced by the same method as used in Example 11(1), except that the configuration of the upper mold member was changed so that guide pin engagement portions comprising V-grooves with a width at the upper end of 0.93 mm, a depth of 0.4 mm and a length of 5.0 mm are formed at given positions on the left and right side portions in the transverse direction of the lower face of the optical fiber holding block to be obtained, respectively. An optical fiber holding block was obtained by the same method as used in Example 11(1), except that the mold was used. The plane between the guide pin engagement portions formed on left and right side portions in the transverse direction of the bottom face, respectively, may be used as an optical fiber holding plane.

The same results as in Example 12(2) were obtained from measurements of the dimensional and form accuracies of the optical fiber holding block described above by the same method in Example 12(2). It was confirmed from these results that the optical fiber guide block has high dimensional and form accuracies. After virtually inserting circles with a diameter of 0.7 mm into each guide pin engagement portions above as in Example 1(2), the distance (pitch) between one center of the circle virtually inserted into one guide pin engagement portion and other centers of the circles virtually inserted into the other guide pin engagement portions were measured to obtain a dimensional accuracy of ±1 μm.

A continuous molding was carried out under the same manner as in Example 11(3), by using the mold described above, thereby the same results as obtained in Example 11(3) was obtained. Variance of the dimensional accuracy among the molded articles was within ±0.9 µm.

(3) Production of the Coated Optical Fiber Holding Block

A coated optical fiber holding block was obtained by the same method as used in Example 12(3).

(4) Fixing of Optical Fibers

An optical fiber array was obtained by the same method as used in 15(4) by fixing optical fibers exposed from a tape fiber having the same specification as used in Example 15(4) and a part of the tape fiber with the foregoing optical fiber guide block, an optical fiber holding block and a coated optical fiber holding block. The optical fiber array is shown in FIG. 17.

Figure 17:
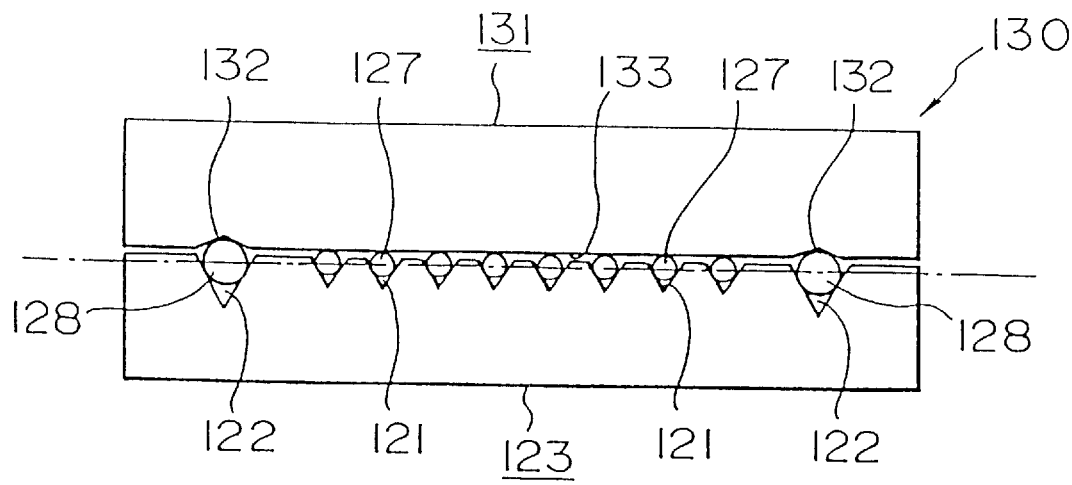
FIG. 17 is an illustrative view of the optical fiber array obtained in Example 20 viewed from its optical end face.

FIG. 17 is an illustrative drawing of the optical fiber array above viewed from the optical end face. Although the optical fiber array 130 differs from the optical fiber array in Example 19 in that guide pin engagement portions 132 comprising V-grooves are formed at the left and right side portions in the transverse direction of the lower face of the optical fiber holding block 131, respectively, and the left and right side portions in the transverse direction of the lower face of the optical fiber holding block 131 are substantially on the same plane of the optical fiber holding plane 133 except the guide pin engagement portions as shown in the figure, it is identical to the optical fiber array in Example 19 with respect to the other configurations. This optical fiber array fixes eight strings of optical fiber 127 exposed from the tape fiber (not shown in the figure) and a part of the tape fiber.

In the optical interconnection of the optical fibers 127 fixed in the optical fiber array 130 with other optical fibers or optical element(s), guide pins 128 having a diameter of 0.7 mm are inserted into the spaces (two spaces at the right and left positions) between the guide pin engagement portions 122 of the optical fiber guide block 123 and guide pin engagement portions 132 of the optical fiber holding block 131 as shown in FIG. 17. The centers of the vertical cross section of the guide pins 128 and the center of the vertical cross section of each optical fibers 127 are aligned on a straight line as shown by the chain line shown in FIG. 17. The same reference numerals are attached to the members being in common between FIG. 16 and FIG. 17.

EXAMPLE 21

(1) Production of the Optical Fiber Guide Block

A glass shaping preform comprising a glass with the same composition as the glass material used in Example 1(1) and having a size of 4.5×4.5×1.9 mm was produced by the same methods as used in Example 1(1).

A mold having the same structure as used in Example 1(1) was produced, except that the configuration of the first molding part was changed so that alignment marks comprising cross-shaped convex portions with a height of 10 µm and a plane viewed line width of 20 µm are formed at the right and left side portions in the transverse direction of the top face of the optical fiber guide block obtained, the upper mold member is merely composed of the first molding part and the dimensions of the sleeve and lower mold members were changed so that the length of the optical fiber guide block to be obtained is 5 mm. Flanges to be received by the top face of the sleeve mold member in use were formed at the upper end of the upper mold member in use along its four directions.

An optical fiber guide block was obtained by the same method as used in Example 1(1), except that the glass shaping preform and mold described above were used.

Figure 18:
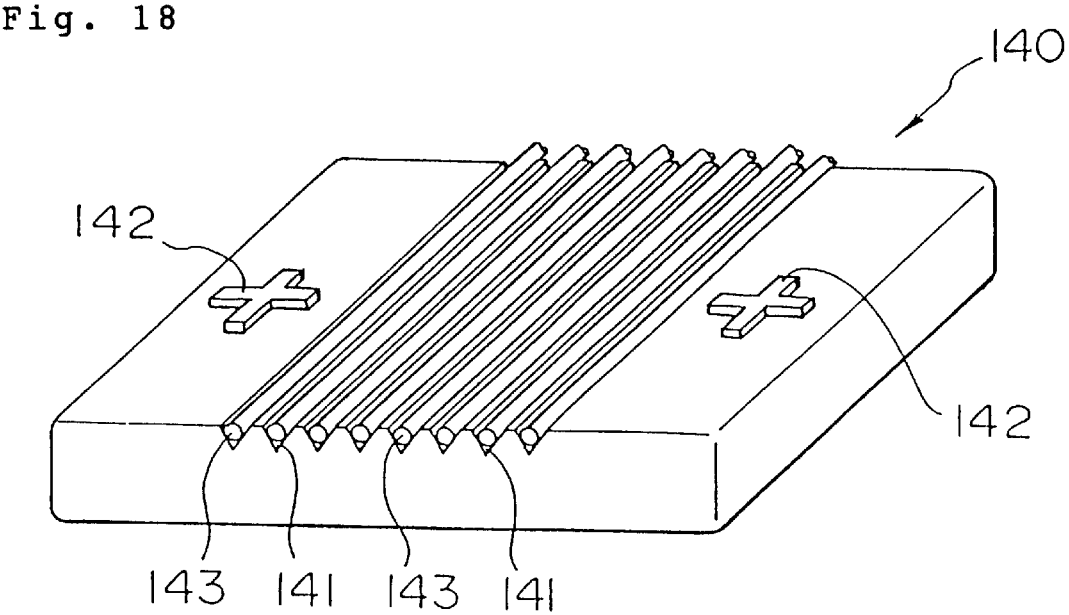
FIG. 18 is an illustrative perspective view of the optical fiber guide block obtained in Example 21.

As shown in FIG. 18, the optical fiber guide block 140 obtained by using the foregoing mold has eight optical fiber fixing engagement portions 141 in parallel relation with each other comprising v-grooves with a length of 5 mm, a depth of 170 µm and a upper end width of 250 µm on the top face, and also has alignment marks formed on right and left side portions, respectively, in the transverse direction of the top face, but has no pedestal. Each alignment marks 142 assumes a cross in which two convex portions with a plane viewed line width of 20 µm, a length of 100 µm and a height of 10 µm cross at right angle at each center. The longitudinal direction of one convex portion or the other convex portion being in parallel relation with the transverse or longitudinal direction (the direction of depth) of the optical fiber guide block 140, respectively. The centers of the alignment marks are positioned, in a plane view, on a straight line in parallel relation to the transverse direction of the optical fiber guide block 140.

The width, length and maximum thickness of the optical fiber guide block 140 having the optical fiber fixing engagement portions 141 and alignment marks 142 are 5 mm, 5 mm and 1.5 mm, respectively. Each edges corresponding to the clearance portions between the upper and sleeve mold members and between lower and sleeve mold members was formed of a free surface. The plane view of the optical fiber guide block 140 approximately assumes a rectangle.

(2) Measurement and Evaluation of Accuracies

The same results as in Example 1(2) were obtained from a measurement of the optical fiber guide block 140 above. The coordinate of plane viewed center of each alignment marks 142 were determined using the contour measuring apparatus described above. Locational accuracies of the center (locational accuracy III of the center of optical fibers) of each circle virtually inserted into each optical fiber fixing engagement portions in reference to each center of one and the other alignment marks 142 were determined based on the coordinates of the centers of the alignment marks and circles (circles virtually inserted into each optical fiber fixing engagement portions 141) used for determining the above described form accuracies. The locational accuracy III corresponds to one of the form accuracies of the optical fiber guide block according to the present invention. The results showed that the locational accuracy III of the center of optical fibers was within 1 µm no matter which left or right alignment mark center was used as a reference. It was confirmed from these results that the optical fiber guide block has high locational and form accuracies.

The optical fiber guide block 140 having foregoing dimensional and form accuracies is advantageous as a constitution member of an optical fiber array together with quartz-based single mode optical fibers 143, exposed from a tape fiber (not shown in the figure) with a width of 2.3 mm in which eight strings of quartz-based single mode optical fiber 143 with an outer diameter of 125 µm are arranged in parallel relation with each other with a pitch of 250 µm as shown in FIG. 18, in an alignment accuracy of ±1 µm.

(3) Continuous Molding

A continuous molding was carried out under the same manner as in Example 1(3), thereby the same results as obtained in Example 1(3) was obtained. Variance of the overall dimensions around the optical fiber fixing engagement portions among the molded articles was within ±0.8 µm.

EXAMPLE 22

(1) Production of the Optical Fiber Guide Block

A glass shaping preform was produced by the same methods as in Example 21(1).

A mold having the same structure as used in Example 21(1) was produced, except that the dimensions of the sleeve mold member and lower mold member were changed so that the dimension of the bottom face of the optical fiber guide block to be obtained is 5.0×5.1 mm and the side face to be positioned at the optical end face is inwardly inclined by an angel of 82° against its bottom face, and that no alignment marks are formed.

An optical fiber guide block was obtained by the same method as used in Example 21(1), except that the foregoing glass shaping preform and mold were used and the mold was used by turning upside down so that the foregoing upper mold member constituting the mold becomes a stationary mold (lower mold member) while the foregoing lower mold member becomes a movable mold member (upper mold member).

Figure 19:
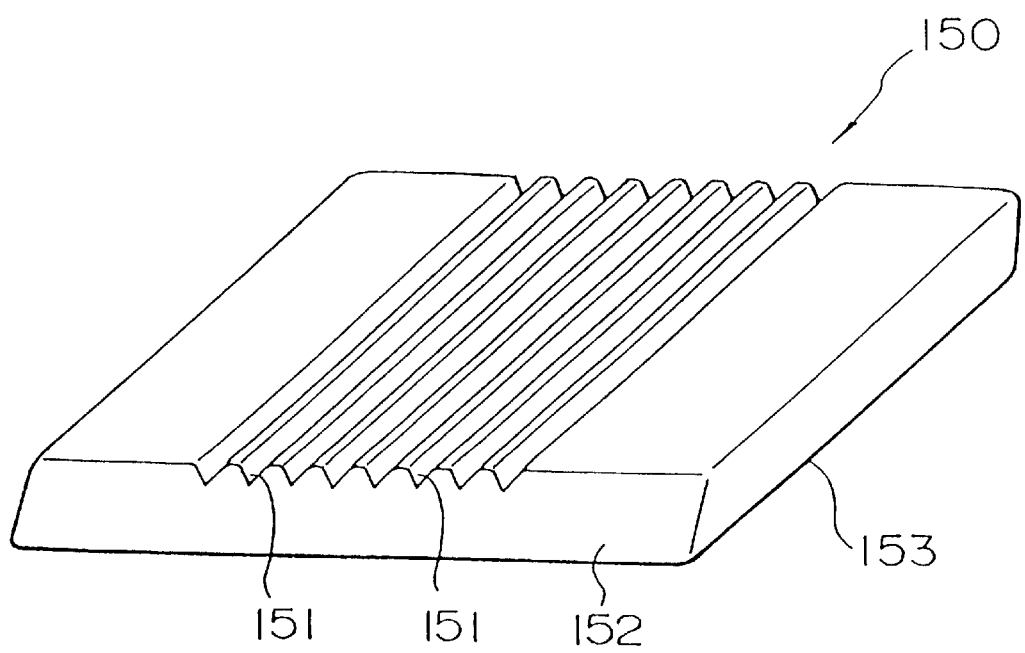
FIG. 19 is an illustrative perspective view of the optical fiber guide block obtained in Example 22.

As shown in FIG. 19, the optical fiber guide block 150 obtained has eight strings of optical fiber fixing engagement portion 151 comprising V-grooves with a length of 5 mm, a depth of 170 μm and a upper end width of 250 μm in parallel relation with each other, on its top face but there is no pedestal. The optical end face 152 of the optical fiber guide block 150 is inclined by 82° relative to the bottom face 153. Accordingly, when optical fibers are engaged to the optical fiber fixing engagement portions 151 of the optical fiber guide block 150, the angle between the plane perpendicular to the optical axis of the optical fibers and the optical end face 152 becomes 8°.

The size of the top face of the optical fiber guide block 150 above is 5.0×4.9 mm, the size of the bottom face is 5.0×5.1 mm and the maximum thickness is 1.5 mm. Each edges corresponding to the clearance portions between the upper and sleeve mold members and between lower and sleeve mold members was formed of a free surface. The plane view of the optical fiber guide block 150 approximately assumes a rectangle.

(2) Measurement and Evaluation of Accuracies

The same results as in Example 1(2) was obtained from the measurement of the dimensional and form accuracies of the optical fiber guide block 150 described above. It was confirmed from these results that the optical fiber guide block 150 has high dimensional and form accuracies. The accuracy of the inclined angle between the side face to be positioned at the optical end face and the bottom face was within 3 μm (within 82°±0.2° as expressed in angle).

The optical fiber guide block 150 having foregoing locational and form accuracies is advantageous as a constitution member of the optical fiber array together with quartz-based single mode optical fibers, exposed from a tape fiber in which eight strings of quartz-based single mode optical fiber with an outer diameter of 125 μm are arranged in parallel relation with each other with a pitch of 250 μm, in an alignment accuracy of ±1 μm.

(3) Continuous Molding

A continuous molding was carried out under the same manner as in Example 1(3), thereby the same results as obtained in Example 1(3) was obtained. Variance of the overall dimensions around the optical fiber fixing engagement portions among the molded articles was within ±0.8 μm.

EXAMPLE 23 (production of the optical fiber guide block)

For obtaining an optical fiber guide block having a pedestal and optical fiber fixing engagement portions, a glass shaping preform whose plane view and side view configurations are resembling to the desired optical fiber guide block was obtained by pre-molding a glass with the same composition as the glass shaping preform used in Example 1.

The length and width of the glass shaping preform are 11.0 mm and 4.0 mm, respectively, while the volume is allotted so that the thickness of the side to be try to form the optical fiber fixing engagement portions and the thickness of the side to be formed into a rear side face of the optical fiber guide block are 2.1 mm and 1.60 mm, respectively. There is a step with a level difference of about 0.50 mm between the side to be try to form optical fiber fixing engagement portions and the side to be formed into the pedestal. Length (length along the same direction as the longitudinal direction of the optical fiber fixing engagement portion) of the side to be try to form the optical fiber fixing engagement portions and the length of the side to be formed into the pedestal of the optical fiber guide block are 4.5 mm and 6.5 mm, respectively.

Four edges surrounding the side face to be formed into the rear side face of the optical fiber guide block, and the edges, extending from side face to be formed into the foregoing rear side face and reaching to the side face to be positioned at the optical end face among the edges surrounding the face to be formed into the bottom face of the optical fiber guide block, are chamfered with a given size while the other edges are not chamfered in the glass shaping preform. The faces to be positioned in the pressurizing direction during the press-molding in the glass shaping preform assumes planes.

A mold, in which the configuration and size of the cavity is the same as the mold used in Example 1 but its disposition was inverse, i.e. the mold member corresponding to the lower mold member used in Example 1 and the mold member corresponding to the upper mold member used in Example 1 serve as upper and lower mold members, respectively, was prepared.

The foregoing glass shaping preform was placed in the mold described above, wherein the side of the glass shaping preform where the step is provided between the side to be try to form the optical fiber fixing engagement portions and the side to be formed into a pedestal is downwardly placed. In the mold above, the side to be try to form the optical fiber fixing engagement portions in the foregoing glass shaping preform was disposed on the portion corresponding to the first molding part 3 (see FIG. 1) of the mold 1 (see FIG. 1) used in Example 1. The foregoing glass shaping preform was disposed so that the gap between the side to be try to form the optical fiber fixing engagement portions and inner side face of the mold is 0.5 mm and the gap between the side to be formed into the rear side face and the inner side face of the mold is also 0.5 mm.

Figure 20:
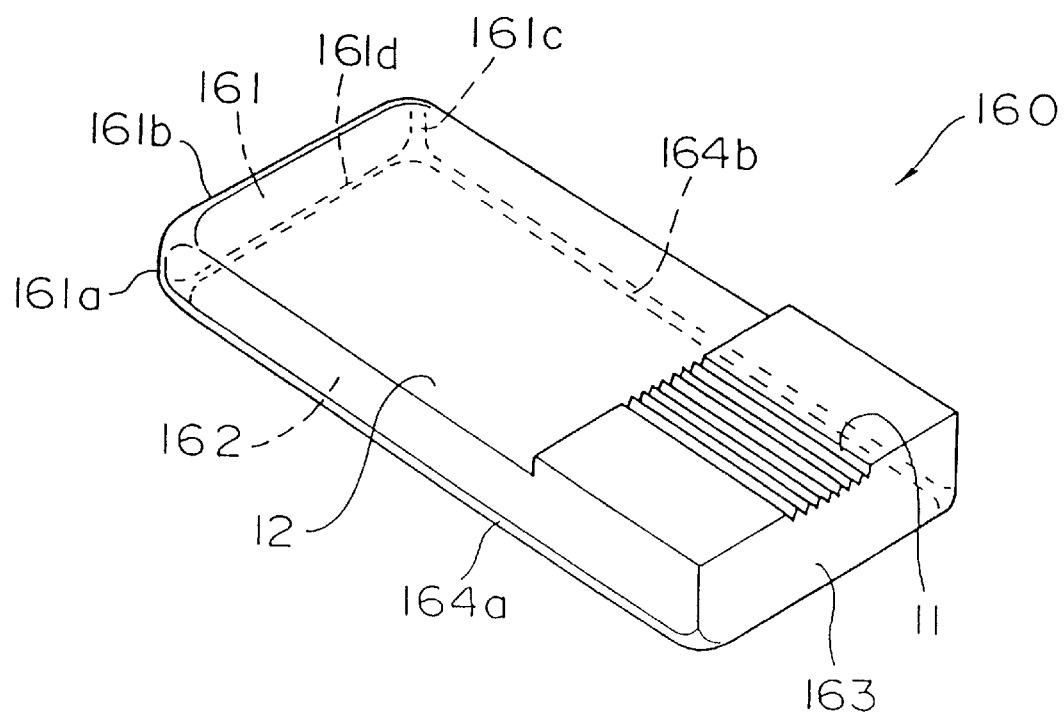
FIG. 20 is an illustrative perspective view of the optical fiber guide block obtained in Example 23.

An optical fiber guide block 160 shown in FIG. 20 was obtained by press-molding the glass shaping preform under the same condition as in Example 1.

Since the optical fiber guide block 160 assumes a similar configuration to the optical fiber guide block 10 (see FIG. 2) obtained in Example 1, the same reference numerals are attached to the optical fiber fixing engagement portions and pedestal.

The four edges 161*a*, 161*b*, 161*c* and 161*d* surrounding the rear side face 161, and the edges 164*a* and 164*b*, extending from the side face 163 to be positioned at the optical end face and reaching to the rear side face 161 among the edges surrounding the bottom face 162, were formed of free surfaces, respectively, in the optical fiber guide block 160. The proportion of volume reduction due to making these edges into "edges formed of free surfaces" is larger than the proportion of volume reduction due to making the edges at the same position into "edges formed of free surfaces" in the optical fiber guide block 10 in Example 1.

It was shown from the measurement of the dimensional and form accuracies by the same method as used in Example 1 that the dimensional and form accuracies of the optical fiber fixing engagement portions 12 in the optical fiber guide block 160 above was higher than the dimensional and form accuracies of the optical fiber fixing engagement portions in the optical fiber guide block obtained in Example 1.

EXAMPLE 24 (Production of the optical fiber guide block)

For obtaining an optical fiber guide block having a pedestal and optical fiber fixing engagement portions, a shaping preform whose plane view and side view configurations are resembling to the desired optical fiber guide block was obtained by pre-molding a glass with the same composition as the glass shaping preform used in Example 23.

The length and width of the glass shaping preform are 11.0 mm and 4.0 mm, respectively, the volume being allotted so that the thickness of the side to be try to form the optical fiber fixing engagement portions and the thickness of the side to be formed into a rear side face of the optical fiber guide block are 2.1 mm and 1.68 mm, respectively. A step with a level difference of about 0.42 mm is formed between the side to be try to form the optical fiber fixing engagement portions and the side to be formed into the pedestal. Length (length along the same direction as the longitudinal direction of the optical fiber fixing engagement portion ) of the side to be try to form the optical fiber fixing engagement portions and the length of the side to be formed into the pedestal of the optical fiber guide block are 4.5 mm and 6.5 mm, respectively.

The same mold as used in Example 23 was prepared.

The glass shaping preform described above was disposed in the foregoing mold so as to downwardly place the side provided with the step between the side to be try to form the optical fiber fixing engagement portions and the side to be formed into the pedestal in the glass shaping preform. The side to be try to form the optical fiber fixing engagement portions in the foregoing glass shaping preform was placed on the portion, in the lower mold member above, corresponding to the first molding part 3 (see FIG. 1) of the mold 1 (see FIG. 1) used in Example 1.The glass shaping preform was unevenly disposed so that the gap between the side to be try to form the optical fiber fixing engagement portions and the inner side face of the mold is 0.2 mm and the gap between the side to be formed into the rear side face and the inner side face of the mold is 0.8 mm. The gaps between each side faces to be formed into the side faces in the transverse direction of the optical fiber guide block and the inner side faces of the mold were uniform.

Then, an optical fiber guide block 160 shown in FIG. 20 was obtained by press-molding the glass shaping preform under the same condition as in Example 1.

EXAMPLE 25 (Production of the optical fiber guide block)

For obtaining an optical fiber guide block having optical fiber fixing engagement portions but no pedestal, a glass shaping preform whose plane view and side view configurations are resembling to the desired optical fiber guide block was obtained by pre-molding a glass with the same composition as the glass shaping preform used in Example 21.

While the size of this glass shaping preform is, as in Example 21, 4.5×4.5×1.9 mm, the four edges surrounding the side face to be formed into the rear side face of the optical fiber guide block and the edges, of the edges surrounding the bottom face, extending from a side face to be formed into the foregoing rear side face to the side face confronting the foregoing side face are chamfered in a given dimension, respectively, but the remaining edges are not chamfered. The planes to be positioned in the pressurizing direction during the press-molding, in the glass shaping preform, assume planes, the thickness at the portions not subjected to chamfering being substantially uniform.

The same mold as used in Example 21 was prepared, except that no convex portions for forming alignment marks were formed.

The glass shaping preform was unevenly disposed so that the bottom face of the glass shaping preform is downwardly placed and the gap between the side face to be formed into the rear side face of the optical fiber guide block and the inner side face of the mold is 0.4 mm and the gap between the side face confronting the side face to be formed into the rear side face of the optical fiber guide block and the inner side face of the mold is 0.1 mm. The gaps between each side faces to be formed into the side faces in the transverse direction of the optical fiber guide block and the inner side faces of the mold were uniform.

Figure 21:
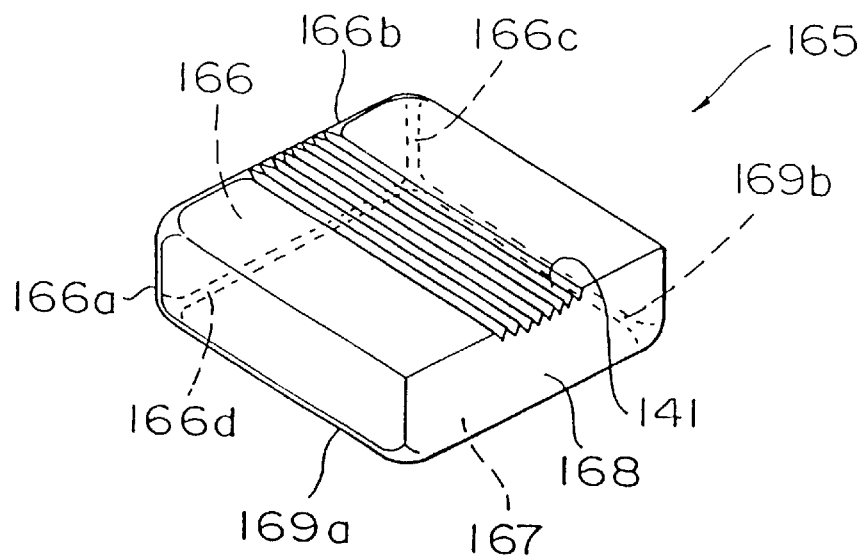
FIG. 21 is an illustrative perspective view of the optical fiber guide block obtained in Example 24.

The optical fiber guide block 165 shown in FIG. 21 was obtained by press-molding the glass shaping preform under the same condition as in Example 21.

Figure 26:
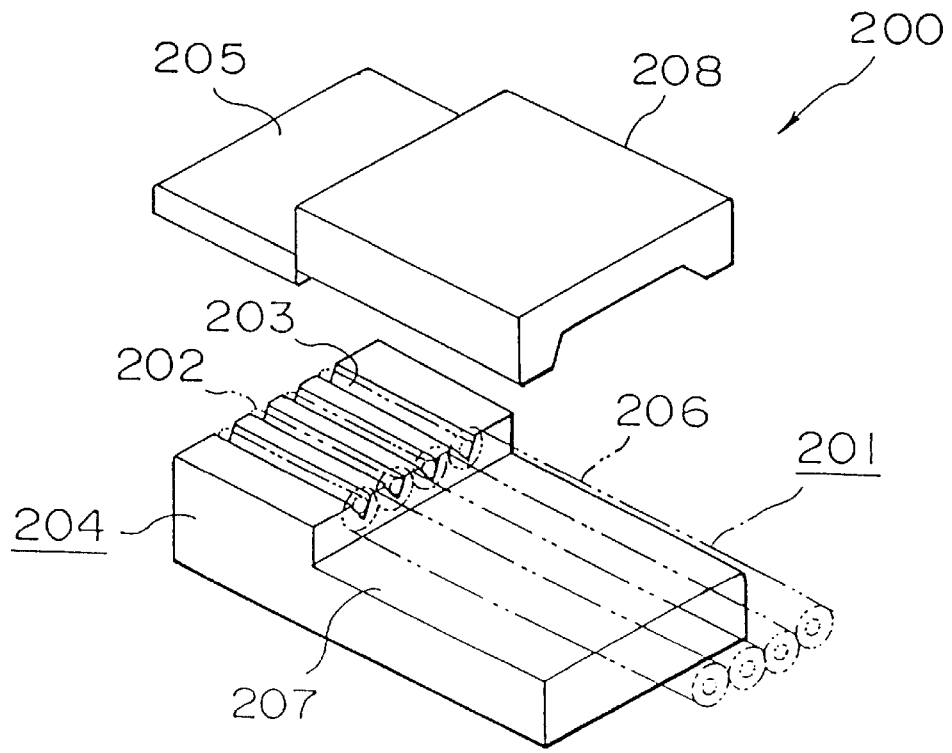
FIG. 26 is a dismantled perspective view showing one example of the conventional optical fiber array.
Figure 27A:
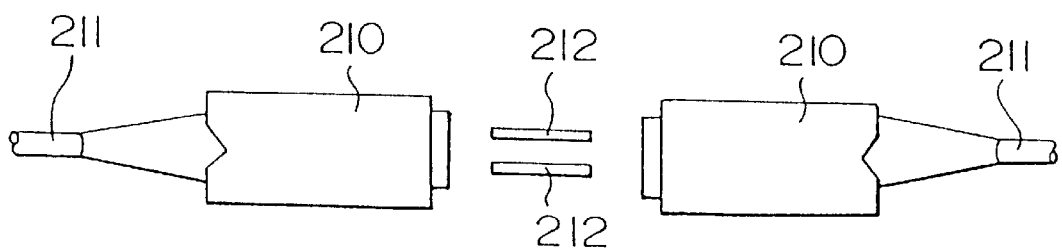
Figure 27B:
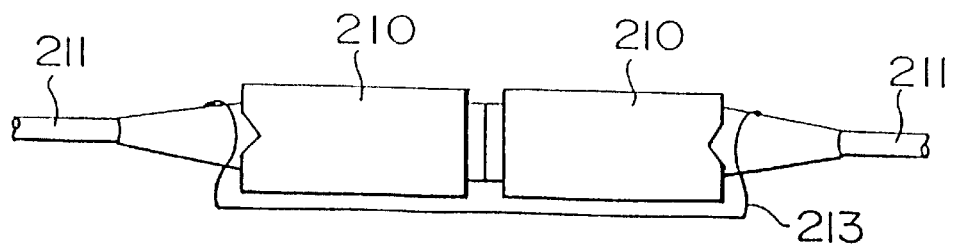
Figure 28:
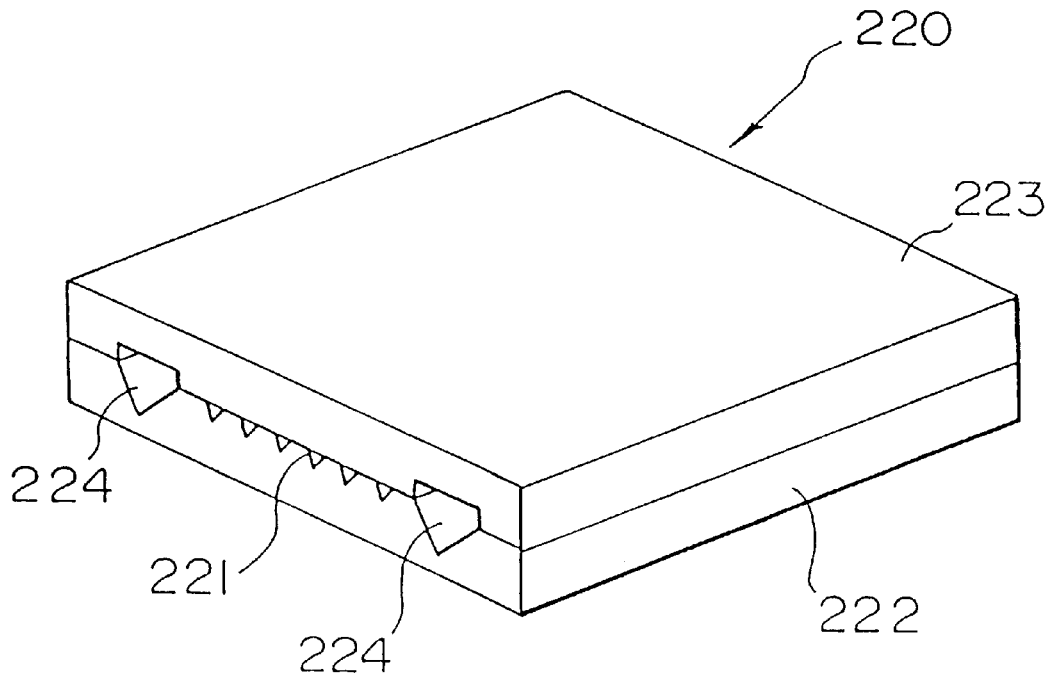
FIG. 28 is a perspective view showing the other example of the conventional optical fiber array.

The same reference numeral as in FIG. 18 is attached to the optical fiber fixing engagement portions since the optical fiber guide block 165 shown in FIG. 26 assumes the same configuration as the optical fiber guide block 140 (see FIG. 18) obtained in Example 21, except that no alignment marks is formed.

The four edges 166a, 166b, 166c and 166d surrounding the rear side face 166, and the edges 169a and 169b, extending from the side face 168 to be positioned at the optical end face to the rear side face 166 among the edges surrounding the bottom face 167, were formed of free surfaces, respectively, in the optical fiber guide block 165. The proportion of volume reduction due to making these edges into "edges formed of free surfaces" is larger than the proportion of volume reduction due to making the edges at the same position into "edges formed of free surfaces" in the optical fiber guide block 140 in Example 21.

It was shown from the measurement of the dimensional and form accuracies of the optical fiber fixing engagement portions 141 of the optical fiber guide block 165 by the same method as used in Example 21 that the dimensional and form accuracies of the optical fiber fixing engagement portions of the optical fiber guide block above was higher than the dimensional and form accuracies of the optical fiber fixing engagement portions in the optical fiber guide block obtained in Example 21.

EXAMPLE 26 (Production of the optical fiber holding block)

For obtaining an optical fiber holding block, a glass shaping preform whose plane view and side view configurations are resembling to those of the desired optical fiber holding block was obtained by pre-molding a glass having the same composition as the glass shaping preform used in Example 11.

The plane view configuration of this glass shaping preform approximately assumes an trapezoid with a width of the side face to be formed into the rear side face of the optical fiber holding block of 4.4 mm and the width of the side face confronting the side face to be formed into the foregoing rear side face of 4.6 mm. Three edges of the four edges surrounding the side face to be formed into the rear side face of the optical fiber holding block except the edge at the top face side, and of the edges surrounding the bottom face the edges extending from the side face to be formed into the foregoing rear side face to the side face confronting the foregoing side face are chamfered in a given dimension in the glass shaping preform, but the remaining edges are not chamfered. The faces to be positioned in the pressurizing direction in the press molding of the glass shaping preform assume planes, the thickness at the potions not subjected to chamfering is substantially uniform.

The same mold as the mold used in Example 11 was prepared.

The glass shaping preform was unevenly disposed so that the bottom face of the glass shaping preform is downwardly placed and the gap between the side face to be formed into the rear side face of the optical fiber holding block and the inner side face of the mold is 0.35 mm and the gap between the side face confronting the side face to be formed into the rear side face of the optical fiber holding block and the inner side face of the mold is 0.15 mm. The gaps between each side faces to be formed into the side faces in the transverse direction of the optical fiber holding block and the inner side faces of the mold were uniform.

Figure 22:
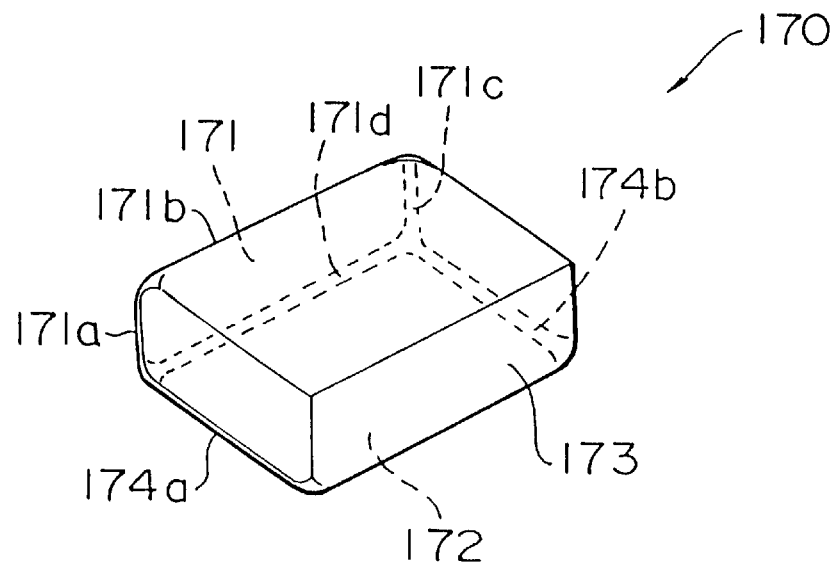
FIG. 22 is an illustrative perspective view of the optical fiber holding block obtained in Example 25.

An optical fiber holding block 170 shown in FIG. 22 was obtained by press-molding the glass shaping preform under the same condition as in Example 11.

While the optical fiber holding block 170 shown in FIG. 22 assumes a similar configuration to the optical fiber holding block obtained in Example 11, three edges of the four edges of 171a, 171b, 171c and 171d except the edge 171c at the top face side, and of the edges surrounding the bottom face 172 the edges 174a and 174b extending from the side face 173 to be positioned at the optical end face to the rear side face 171 were formed of free surfaces, respectively.

It was shown from the measurement of dimensional and form accuracies of the optical fiber holding block 170 by the same method as used in Example 11 that the optical fiber holding block obtained had dimensional and form accuracies equal to or higher than those of the optical fiber holding block obtained in Example 11.

EXAMPLE 27 (Production of the optical module)

Figure 23A:
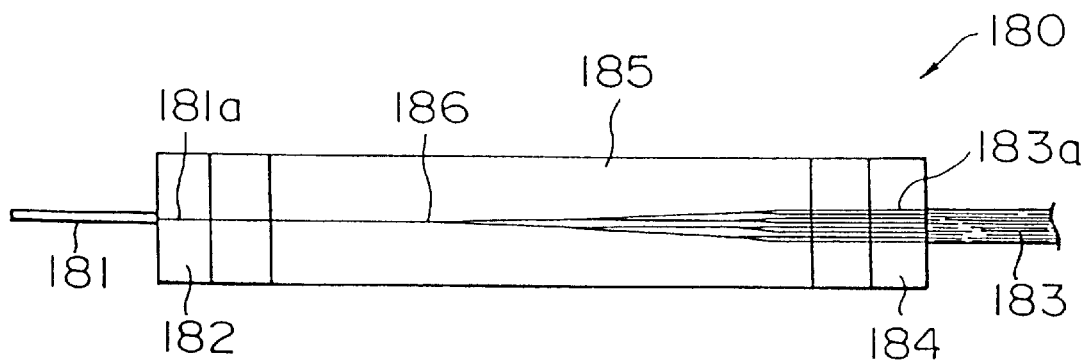
Figure 23B:
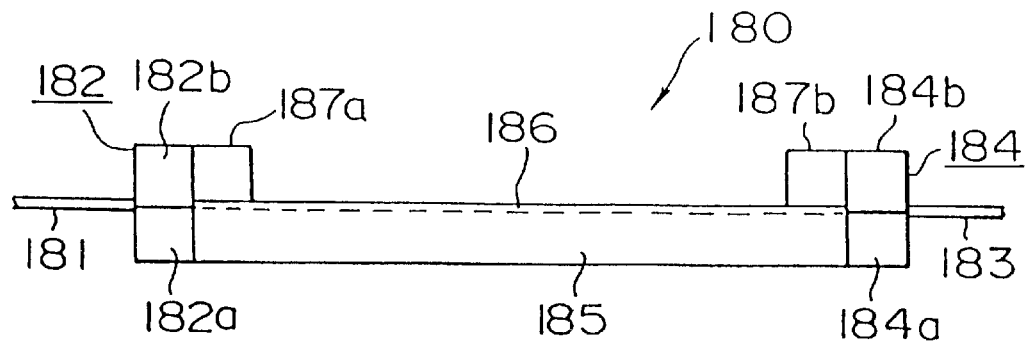
FIG. 23(b) is its side view.

An example of the optical module of the present invention is shown in FIG. 23(a) and (b), respectively. The optical module 180 shown in the figure is provided with an optical fiber array 182 fixing a string of optical fiber 181a exposed from an optical fiber code 181, an optical fiber array 184 fixing eight strings of optical fiber 183a exposed from 8-core tape fiber 183 and a quartz-based waveguide chip 185 for 1×8 branching. The optical module 180 introduces the light beam transmitted by the optical fiber code 181 into an optical waveguide 186 formed in the quartz-based waveguide chip 185 to divide into eight light beams. The divided light beams are transmitted by the 8-core tape fiber 183, respectively, to emit the light beams from the other end of the tape fiber 183.

The optical fiber array 182 is provided with an optical fiber guide block 182a produced by the same method as used in example 21 except that only one optical fiber fixing engagement portion (V-groove) was provided, and an optical fiber holding block 182b produced by the same method as in Example 11. The optical fiber array 184 is provided with an optical fiber guide block 184a produced by the same method as in Example 21 and an optical fiber holding block 184b produced by the same method as in Example 11. The quartz-based waveguide chip 185 comprises a buried type optical waveguide 186 branched by 1×8 formed on a silicon substrate.

The optical fiber array 182 is adhered to the quartz-based waveguide chip 185 with an ultraviolet curing type adhesive (not shown in the figure) so that the optical fiber 181a fixed in the optical fiber array 182 is optically connected with the incident beam port of the optical waveguide 186. The optical fiber array 184 is adhered to the quartz-based waveguide chip 185 with an ultraviolet curing type adhesive (not shown in the figure) so that eight strings of the optical fiber 183a fixed in the optical fiber array 184 are optically connected to each output port (the end point at the eight branched side) of the optical waveguide 186.

Optical interconnections between the optical fiber 181a and optical waveguide 186, and between the optical fibers 183a and optical waveguide 186 were carried out by a passive alignment by taking advantage of the bottom face of the optical fiber array 182 (the bottom face of the optical fiber guide block 182a), the bottom face of the quartz-based waveguide chip 185 and the bottom face of the optical fiber array 184 (the bottom face of the optical fiber guide block 184a) as reference faces. Alignment marks (not shown in the figure) formed on the optical fiber guide blocks 182a and 184a, the holding blocks 182b and 184b, and the quartz-based waveguide chip 185, respectively, were utilized for positioning along the transverse direction (positioning along the direction of width of the quartz-based waveguide chip 185).

The glass blocks 187a and 187b were adhered to the side portions along the longitudinal directions of the top face of the quartz-based waveguide chip 185 with an ultraviolet curing type adhesive (not shown in the figure). These glass blocks 187a and 187b were used as auxiliary members for preventing cracks from generating in polishing of the end face (the optical end face) along the longitudinal direction of the quartz-based waveguide chip 185, along with obtaining a desired adhesive strength by increasing the adhesion area in adhering the optical fiber arrays 182 and 184 with the quartz-based waveguide chip 185 using an adhesive.

EXAMPLE 28 (Production of the optical fiber fixing member)

(1) Production of the Optical Fiber Guide Block

Nine sorts of optical fiber guide blocks were obtained by the same method as used in Example 1, Example 9, Example 10, Example 15, Example 16, Example 17, Example 18, Example 19 or Example 21, except that the overall configuration of the glass shaping preform was made to be a square pole without any curved edges or without any chamfering (the width, length and thickness are the same as those in each example).

Seven sorts of optical fiber guide blocks were obtained by the same method as used in Example 2, Example 3, Example 4, Example 5, Example 6, Example 7 or Example 8, except that the overall configuration of the glass shaping preform was made to be a square pole without any curved edges or without any chamfering (the width, length and thickness are the same as those in each example).

Each optical fiber guide block described above does not possess any edges formed of a free surface.

The changes of dimensional and form accuracies of these optical fiber guide blocks against temperature variations are small since they are made of a glass having a specified composition with a small thermal expansion coefficient. A high adhesive strength can be obtained in adhering the optical fiber guide block to other member with an ultraviolet curing type adhesive since the guide blocks have a high ultraviolet ray transmittance. The molded is less liable to be damaged when press-molding the guide blocks since the guide blocks are composed of glass having a sag temperature of 555° C. or less.

(2) Production of the Holding Block

Seven sorts of optical fiber holding blocks were obtained by the same method as used in Example 11, Example 15, Example 16, Example 17, Example 18, Example 19 or Example 20, except that the overall configuration of the glass shaping preform was made to be a square pole without any curved edges or without any chamfering (the width, length and thickness are the same as those in each example).

Two sorts of coated optical fiber holding blocks were obtained by the same method as used in Example 12 or Example 13, except that the overall configuration of the glass shaping preform was made to be a square pole without any curved edges or without any chamfering (the width, length and thickness are the same as those in Example 12 or Example 13).

A dual-purpose holding block was obtained by the same method as in Example 14, except that the overall configuration of the glass shaping preform was made to be a square pole without any edges formed of free surfaces.

Each holding guide block described above does not possess any edges formed of a free surface.

The changes of dimensional and form accuracies of these holding blocks against temperature variations are small by the same reason in each optical fiber guide block obtained in (1) described above. A high adhesive strength can be also obtained in adhering the holding block to other member with an ultraviolet curing type adhesive. In addition, the mold is less liable to be damaged when press-molding the holding blocks.

EXAMPLE 29 (Production of the optical fiber array)

Seven sorts of optical fiber arrays were obtained by the same method as used in Example 15, Example 16, Example 17, Example 18, Example 19, Example 20 or Example 21, except that the overall configuration of the glass shaping preform for the optical fiber guide block and holding block was made to be a square pole without any curved edges or without any chamfering (the width, length and thickness are the same as those in each example).

All of the optical fiber arrays described above are provided with an optical fiber guide block substantially having no edges formed of free surfaces, a holding block substantially having no edges formed of free surfaces and optical fibers (optical fibers exposed from the tape fiber) fixed with these optical fiber guide block and holding block.

EXAMPLE 30 (Production of the optical module)

Two sorts of optical fiber guide blocks and holding blocks were obtained, respectively, as glass shaping preforms for the optical fiber guide block or holding blocks having a configuration of square poles without any curved edges or without any chamfering (the width, length and thickness are the same as those in Example 27). These optical fiber guide blocks assume the same configuration as any of the optical fiber guide block used in Example 27, except that they have substantially no edges formed of free surfaces. The holding blocks described above assume the same configuration as the holding blocks used in Example 27, except that they have substantially no edges formed of free surfaces.

An optical module was obtained by the same method as used in Example 27, except that the optical fiber guide block and holding block described above were used.

EXAMPLE 31 (Production of the polygon mirror)

After forming a glass material having the same composition as the glass material used in Example 1(1) into a hexagonal prism (the top and bottom faces assume hexagons with a length of each side of 7 mm, respectively) by hot pre-molding, a glass shaping preform with a height (thickness) of 6 mm was obtained by a chamfer processing to the edges between the top and side faces and the edges between the bottom and side faces with a given dimension, and by mechanically drilling a hole with a diameter of 7.5 mm penetrating from the center of the top face to the center of the bottom face. The configuration of the horizontal cross section (the configuration of the cross section sliced by a plane parallel to the bottom face at the center along the direction of height) of the glass shaping preform assumes a hexagon provided with a hole having a diameter of 7.5 mm at its center.

A mold comprising a upper, lower and sleeve mold members and having a hexagonal prism like cavity with a height of 4 mm was prepared. These upper, lower and sleeve mold members comprise tungsten carbide, respectively, as the mold used in Example 1(1), platinum-alloy-based mold release film with a thickness of 500 Å being provided on its molding face. A columnar convex portion with a diameter of 7 mm and a length (height) of 4 mm is provided at the center of the top face of the lower mold member. The plane view of the contour of the molding face in the upper mold member and the plane view of the contour of the molding face in the lower mold member assumes a hexagon with a length of each side of 8 mm, respectively.

A given number of hexagonal prism like polygon mirrors in which the edges between the top faces and side faces and the edges between the bottom faces and side faces were formed of free surfaces, respectively, were obtained by a continuous molding by the same method as use in Example (1), except that the shaping preforms and mold described above were used. These polygon mirrors have a height (thickness) of 4 mm, the configuration of the contour at the horizontal cross section (the configuration of the contour of the cross section sliced with a plane parallel to the bottom face at the midpoint along the direction of height) assuming a hexagon with a length of each side of 8 mm. A penetrating hole from the top face to the bottom face is provided at the center of each polygon mirror.

It was found that variance of the accuracy of the overall dimensions, measured with an electric micrometer, among the molded articles is within ±2 $\mu$m. When the profile irregularity of the six side faces of the polygon mirrors was measured with an interferometer, the accuracy was within Newton ±0.5 in any polygon mirrors.

Polygon mirrors were produced by the same method as described above, except that a glass material with the same composition as the glass material used in Example 2, Example 3, Example 4, Example 5, Example 6, Example 7 or Example 8 was used. Variance of the overall dimensional accuracy and profile irregularity of the side faces were measured with respect to these polygon mirrors, obtaining the same results as described above.

Polygon mirrors were produced by the same method as described above, except that the height (thickness) of the glass shaping preform was variously changed, confirming that polygon mirrors having the same degree of variance of dimensional accuracy and profile irregularity could be obtained when the thickness of the glass shaping preform is within 1.1 to 1.4 times as high as the height of the desired polygon mirror.

Since foregoing each polygon mirror is made of a glass having a specified composition with small thermal expansion coefficient, the changes in the dimensional accuracy and profile irregularity due to temperature variations are small. A high adhesive strength can be obtained when the polygon mirror is adhered to other member because the material has a high ultraviolet ray transmittance.

When a peculiar shaped optical element having a penetrating hole such as the polygon mirror described above or a peculiar shaped optical element having concave portions is molded, the optical element may be produced by forming a desired penetrating hole or concave portion by a mechanical processing after molding a peculiar shaped optical element having no previously formed penetrating hole or concave portion, or the optical element having a penetrated hole or concave portion may be molded using a glass shaping preform provided with a hole for the penetrating hole or a concavity for the concave portion and a mold having a desired configuration.

A variety of optical glasses having a sag temperature of 600° C. or less such as lanthanum glass M-LaF81 (a glass made by HOYA Co.) or barium glass M-BaCD12 (a glass made by HOYA Co.) may be used, besides the first class glass according to the specification of the present invention, as a glass material of the glass shaping preform used for molding a peculiar shaped optical element having no penetrating holes or concave portions when the penetrating hole or concave portion is formed by a mechanical processing. A peculiar shaped optical element having the same degree of variance of the overall dimensions among the molded articles and profile irregularity as described above maybe obtained by molding so as to obtained a peculiar shaped optical element having at least one edge formed of a free surface, when the glass shaping preform comprising the foregoing optical glass is used.

In molding the penetrated hole or concave portion together with the optical element, such a glass shaping preform should be used as comprising a glass having a smaller thermal expansion coefficient than that of the mold material used for a molding part for forming the penetrated hole or the concave portions and a larger thermal expansion coefficient than that of the outer mold material (the mold material for molding parts excluding the molding part described above; for example, when the mold is composed of upper, sleeve and lower mold members and the foregoing molding part is provided at the lower mold member, the mold material corresponds to each mold material for the upper and sleeve mold members and the lower mold member except for the molding part, respectively). The first class glass according to the specification of the present invention is suitable for the glass material described above.

The polygon mirror is used after coating its reflection faces (side faces) with a reflection film.

EXAMPLE 32 (Production of the rectangular prism)

A square pole was obtained by a hot pre-molding of a glass material having the same composition as the glass material used in Example 1(1). Then, a shaping article having a similar configuration to a rectangular prism shown in FIG. 25 was obtained by cutting off a part of the square pole. The size of the shaping article is smaller than the size of the desired rectangular prism. The edges between the top face (the face corresponding to the face indicated by a reference numeral 195 in FIG. 25) and the side faces, the edge between the top face and inclined face, the edges between the inclined face (the face corresponding to the face indicated by a reference numeral 196 in FIG. 25) and side faces, and the edges between the bottom face and side faces were chamfered in a given dimension to obtain a glass shaping preform.

Figure 25:
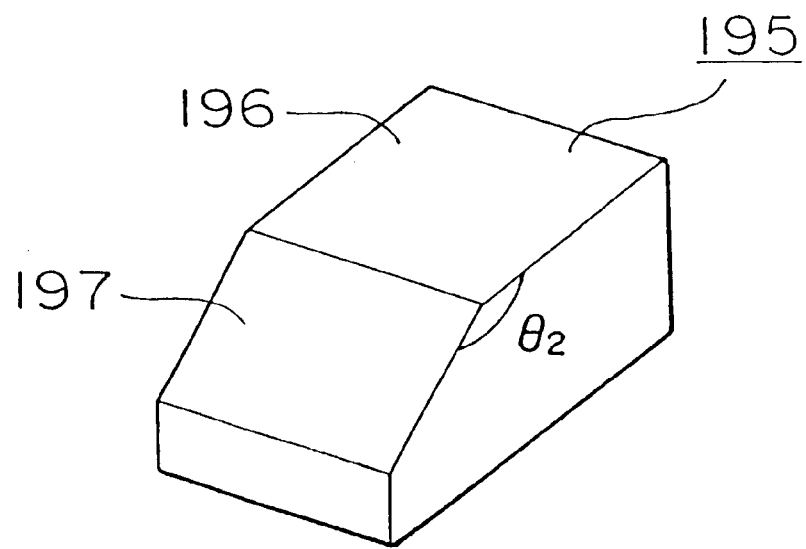
FIG. 25 is a perspective view showing one example of a rectangular prism capable of producing by applying the method according to the present invention.

A mold comprising the upper, lower and sleeve mold members an having a cavity with a configuration resembling to the rectangular prism shown in FIG. 25 was prepared. These upper, lower and sleeve mold members are made of tungsten carbide like the mold used in Example 1(1), a platinum-alloy-based mold release film with a thickness of 500 Å being provided on their molding faces. While the plane view of the molding face of the upper mold member assumes a rectangle with a dimension of 10×8 mm, the molding face is downwardly bent by 45° at a position by 4 mm inside from the end along its longitudinal direction. The molding face in the lower mold member assumes a plane of 10×8 mm and the inner dimension of the sleeve mold member is 10×8×6 mm.

A given number of rectangular prisms having the same configuration as shown in FIG. 25 were obtained by a continuous molding which was carried out under the same manner as in Example 1(1), except that the glass shaping preform and the mold described above were used. In these rectangular prisms, the top face (the face shown by a reference numeral of 195 in FIG. 25) was a plane with a dimension of 6×8 mm, the inclined face (the face shown by a reference numeral of 196 in FIG. 25) was a plane with a dimension of $4.2^{1/2} \times 8$ mm, the height between the top and bottom faces was 6 mm, the height between the bottom end of the inclined face and bottom face was 2 mm and the angle corresponding to the angle $\theta_2$ in FIG. 25 was 45° when the prisms were placed as shown in FIG. 25.

It was shown that variance of the dimensional accuracy of the overall dimension of the rectangular prism as measured with an electric micrometer was within ±2 µm. The profile irregularity of all of these rectangular prisms were measured by using an interferometer. As a result, the profile irregularity of all of the faces were within Newton ±0.5 in all rectangular prisms. The angular accuracy of the angle corresponding to the angle 02 was within ±0.1°.

A rectangular prisms were produced by the same method as described above, except that a glass material having the same composition as the glass material used in Example 2, Example 3, Example 4, Example 5, Example 6, Example 7 or Example 8 was used. The same results as described above were obtained with respect to the variance of the overall dimensional accuracy, profile irregularity and angular accuracy of the rectangular prism.

Rectangular prisms were produced by the same method as described above, except that the height between the top and bottom faces of the glass shaping preform was variously changed in the glass shaping preform and, in harmony with the ratio of the height, the height between the bottom end of the incline face and the bottom face was also variously changed. It was confirmed from the results above that a rectangular prism with the same degree of variance of the overall dimensional accuracy among the molded articles, profile irregularity and angular accuracy could be obtained when the height of the glass shaping preform (the height between the top and bottom faces) is within 1.1 to 2.4 times of the height of the desired rectangular prism (the height between the top and bottom faces).

The changes of the dimensional and form accuracies against the temperature variations are small because each rectangular prism described above is made of a glass with a specified composition having a small thermal expansion coefficient. A high adhesive strength can be obtained in adhering the prism to other member using an ultraviolet curing type adhesive since the prism has a high ultraviolet ray transmittance.

A rectangular prism with the same degree of variance of the overall dimensional accuracy among the molded articles, profile irregularity and angular accuracy could be obtained even when the foregoing glass shaping preform was made of lanthanum glass M-LaF81 (a glass made by HOYA Co.)or barium glass M-BaCD12 (a glass made by HOYA Co.)

What is claimed is:

1. An optical fiber fixing member comprising a thin-plate-shaped molded article made of a glass and formed by a shaping mold having shaping surfaces;
   the thin-plate-shaped molded article having a plurality of side surfaces extending from and along circumferential lines of said article when viewed in plan view and having edges surrounding said side surfaces;
   at least one of said edges surrounding said side surfaces being formed of a free surface;
   wherein two formed surfaces adjoining each other through said free surface are surfaces formed with differing shaping surfaces of the shaping mold, and at least one of said two formed surfaces comprising one of said side surfaces;
   said thin-plate-shaped molded article further comprising at least one fitting portion for fixing at least one optical fiber.

2. The optical fiber fixing member according to claim 1 wherein the at least one fitting portion comprises a positional tolerance of 1/1 of a core diameter of the at least one optical fiber fitted in said at least one optical fiber fitting portion, measured for the positional tolerance of a center of vertical cross-section thereof from a reference side surface which is formed with one of the shaping surfaces of the shaping mold, said reference surface comprising one of said side surfaces.

3. The optical fiber fixing member according to claim 2, wherein all of said side surfaces are surfaces shaped with different shaping surfaces of the shaping mold.

4. An optical fiber fixing member as recited in claim 1 wherein said article comprises a plurality of said free surfaces, each of said free surfaces comprising two formed surfaces adjoining each other through said free surface, and at least one of said formed surfaces comprising said side surface.

5. The optical fiber fixing member according to claim 1 wherein said article has a substantially rectangular form when viewed in plan, and comprises left and right side surfaces when positioned on an optical interconnection side surface when said optical fiber fixing member is assembled into an optical fiber array; and wherein said left and right side surfaces are shaped with different shaping surfaces of the shaping mold.

6. The optical fiber fixing member according to claim 1, wherein said article has a backside surface opposite to one of said side surfaces positioned on an optical interconnection side surface when assembled into an optical fiber array, and a plurality of edges surrounding said backside surface, including an edge comprising a free surface which is positioned on an optical fiber side or a coated optical fiber side when said optical fiber fixing member is assembled into the optical fiber.

7. The optical fiber fixing member according to claim 1 wherein said article has a dimensional accuracy of within ±1/10 of a core diameter of a fixed optical fiber when said fixed optical fiber is a single mode optical fiber; or a dimensional accuracy of within ±1/5 of a core diameter of a fixed optical fiber when said fixed optical fiber is a multi-mode optical fiber; and wherein said article has a form accuracy of within 1/1 of the core diameter of a fixed optical fiber.

8. The optical fiber fixing member according to claim 1 wherein said article comprises, as glass components, 1 to 30% by weight of $SiO_2$, 15 to 40% by weight of $B_2O_3$, over 40% up to 60% by weight of ZnO, 0 to 15% by weight of MgO, 0 to 10% by weight of CaO, 0 to 10% by weight of SrO, 0 to 10% by weight of BaO and 0 to 20% by weight of PbO, the total content of ZnO, MgO, CaO, SrO, BaO and PbO being more than 40% up to 60% by weight; and which further comprises more than 0 to 10% by weight of $Al_2O_3$; and wherein the total content of said glass components is 75% by weight or more.

9. The optical fiber fixing member according to claim 1 wherein said article has at least one groove-shaped guide pin engagement portion for engaging one or more guide pins for use in an optical interconnection of optical fibers with each other or optical interconnection of an optical fiber array with at least the optical element and wherein said at least one groove-shaped guide pin engagement portion has a center of vertical cross section thereof, which center is aligned in a straight line with one or more centers of vertical cross sections of optical fibers after the optical fibers are engaged with said optical fiber fixing engagement portion.

10. An optical fiber fixing member according to claim 1 wherein said article has at least one convex or concave shaped alignment mark formed simultaneously and integrally with other portions thereof in the shaping mold; and wherein at least one edge of a plurality of edges surrounding a surface having said at least one formed alignment mark comprises a free surface.

11. An optical fiber array comprising the optical fiber fixing member recited in claim 1 and at least one optical fiber fixed in said at least one fitting portion.

12. An optical module having the optical fiber array recited in claim 11 and further comprising at least one optical element or optical fiber optically connected to said at least one optical fiber fixed in said optical fiber array.

* * * * *